United States Patent [19]

Caswell et al.

[11] 4,136,400

[45] Jan. 23, 1979

[54] MICRO-PROGRAMMABLE DATA TERMINAL

[75] Inventors: Robert L. Caswell, Placentia; Glen R. Griffith, Westminster, both of Calif.

[73] Assignee: Rockwell International Corporation, El Segundo, Calif.

[21] Appl. No.: 822,769

[22] Filed: Aug. 8, 1977

[51] Int. Cl.² ............................................. G06F 1/00
[52] U.S. Cl. ................................................... 364/900
[58] Field of Search ........................ 364/900 MS File

[56] References Cited

U.S. PATENT DOCUMENTS 3,978,454 8/1976 Willard ................................ 364/900

Primary Examiner—Raulfe B. Zache
Attorney, Agent, or Firm—H. Fredrick Hamann; G. Donald Weber, Jr.; Leonard Tachner

[57] ABSTRACT

A microprocessor based apparatus for use as a bus controller and as a remote terminal in a time-division multiplex serial data bus system. The apparatus comprises a single chip which, in a preferred embodiment, is in the form of radiation hardened LSI/CMOS/SOS. It operates on a one bit per instruction basis and includes program control of output signals and word length. The described embodiment is program adapted to satisfy the performance requirements of the applicable military standard, but is easily modified, by changing the contents of an external expandable instruction storage device, to accommodate alternative requirements such as different word lengths, different message formats, and even different bus protocols. A data format encoder and data format decoder provide means to convert from Manchester bi-phase data to NRZ data for receiving data from the data bus and to make the opposite conversion for transmitting data over the data bus.

12 Claims, 42 Drawing Figures

MICRO-PROGRAMMABLE DATA TERMINAL

BACKGROUND OF THE INVENTION

FIELD OF THE INVENTION

This invention relates generally to data transmission in an avionics system primarily for aircraft and the like. More specifically, this invention relates to a programmable digital circuit device for use in conjunction with a time-division multiplexed data bus system.

Increasing avionics system complexity in modern military aircraft is demanding an increasing proportion of the resources available for aircraft weapon systems. Although greater sophistication in avionics provides increased capability and accuracy for an aircraft weapon system, is also a substantial cause of decreased reliability in the overall weapons system. Digital avionics, by being more orderly and systematic and by permitting growth and improvement without major hardware modification, provides the desired improvement in capabilities and performance without the usual concomitant decrease in reliability and increase in cost. Time-division multiplexed data bus techniques permit standard equipment interfaces and a standard approach to avionic data intercommunication thereby maximizing the advantages derived from a digital avionics system.

Time-division multiplex is the transmission of information from several signal channel subsystems through one communication bus with different channel samples staggered in time to form a composite pulse train. A remote terminal is the name commonly given the electronics necessary to provide an interface between the bus and a subsystem. A bus controller is the electronics that serves the function of commanding, scanning and monitoring bus "traffic" to prevent overlap and erroneous communications. In a typical aircraft avionics system that utilizes a time-division multiplexed data bus configuration, the subsystems might include: an inertial navigation unit, a fire control radar, a central air data computer, a fire control computer, a target identification set, a fire control navigation panel and one or more associated displays.

SUMMARY OF THE INVENTION

The present invention is a micro-programmable data terminal (MPDT) in the form of a single, large-scale integrated (LSI) CMOS/SOS circuit chip designed to operate either as a remote terminal or as a bus controller for a time-division multiplexed data bus. No other micro-programmable single chip device capable of remote terminal and bus controller functions is known to the applicants. Although others have disclosed remote terminal devices and/or bus controller devices that may employ microcircuit technology and still others have even disclosed LSI chips that contain a portion of the circuits needed for either remote terminal or bus controller capabilities, none known to the applicants provides the complete dual function capability of remote terminal and bus controller in a single micro-programmable integrated circuit chip operating in conjunction with an external read only memory device.

The micro-programmable data terminal (MPDT) of the present invention is designed to satisfy the requirements of the military standard entitled "Aircraft Internal Time Division Command-Response Multiplex Data Bus" MIL-STD 1553A, dated April 30, 1975. The contents of that military standard which are well-known in the art are hereby incorporated herein by reference.

The MPDT is capable of performing at least the following operations:

1. Convert for both transmission and reception between a Manchester data format used on the data bus and a NRZ (Non-return to zero) data format used by digital avionics subsystems.
2. Recognize and distinguish between signals representing data and signals representing command, status, and synchronization information.
3. Initialize a system clock upon detection of a synchronization signal and generate a clock signal that is in synchronism with received data signals.
4. Function in a remote terminal mode by responding to commands transmitted by a bus controller and by transmitting status signals and data signals, responding to appropriate terminal addresses, tracking word count, and receiving data for use by the subsystem.
5. Function in a bus controller mode by responding to computer signals to issue commands, data, synchronization and parity signals to remote terminals, and to receive status and data signals from the remote terminals.

BRIEF DESCRIPTION OF THE DRAWINGS

FIG. 20 comprising

DESCRIPTION OF A PREFERRED EMBODIMENT

Figure 1:
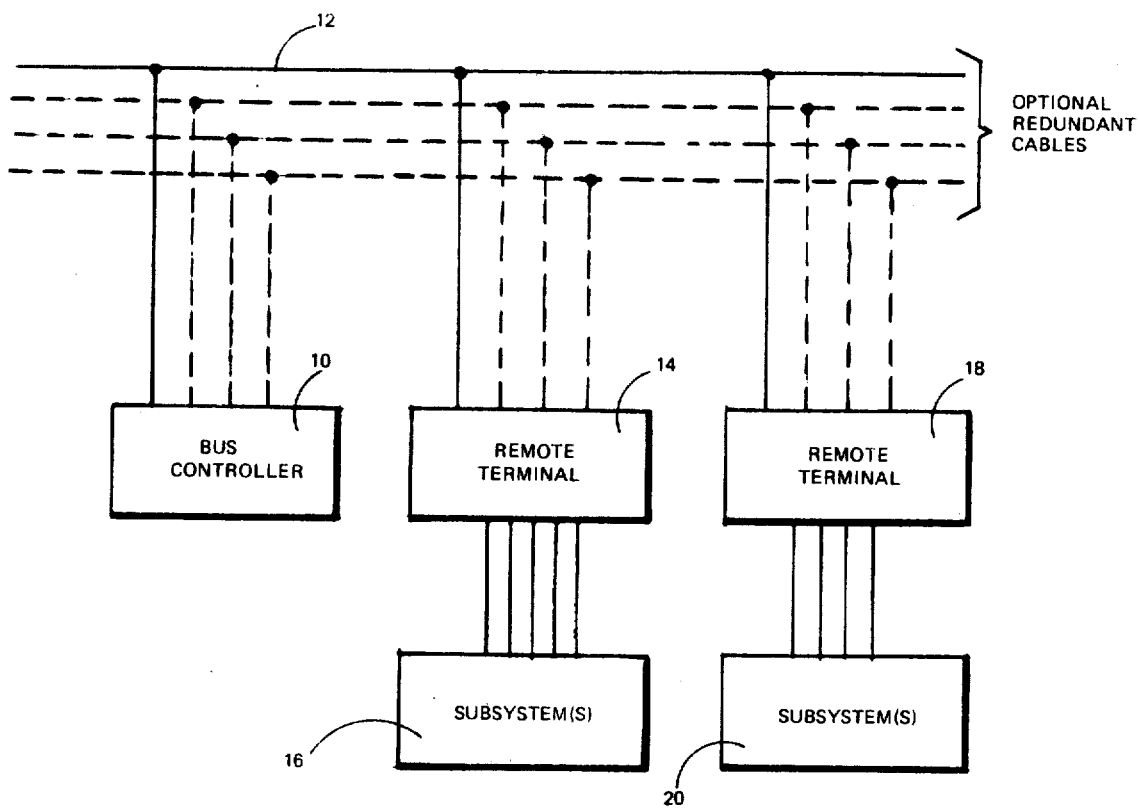
FIG. 1 is a block diagram illustration of a typical multiplex data bus architecture.

Referring now to FIG. 1, there is shown a general block diagram of a typical multiplex data bus architecture including a bus controller 10 connected to the serial data bus 12. Also shown in FIG. 1 are remote terminals 14 and 18 connected respectively to subsystems 16 and 20 and to the serial data bus 12. The bus controller 10 is the sole source of control of information transmission on the bus and initiates all transmissions. Data on the buses is transmitted asynchronously in a command/response mode and in a half-duplex manner. As further indicated in FIG. 1 a time-division multiplex serial data bus may have additional optional cables. However, for purposes of discussion herein it will be assumed that the serial data bus with which the present invention operates comprises a single data bus composed of a pair of data bus wires.

There are three possible modes of information transfer in the multiplex data bus of the current invention, namely, information transfer from a bus controller to a remote terminal, information transfer from a remote terminal to a bus controller and information transfer between two remote terminals.

Information is transmitted over the serial data bus in a digital pulse modulation form at a transmission rate of approximately 1.0 megabits per second. Accordingly, one bit time of data transfer is approximately one microsecond. The data format used on the serial data bus is, according to the MIL-STD, Manchester bi-phase level where a logic 1 is transmitted as a bi-polar coded signal having a positive pulse followed by a negative pulse and a logic 0 is a bi-polar coded signal having a negative pulse followed by a positive pulse. The transmissions through 0 occur at the midpoint of each bit time.

Figure 2:
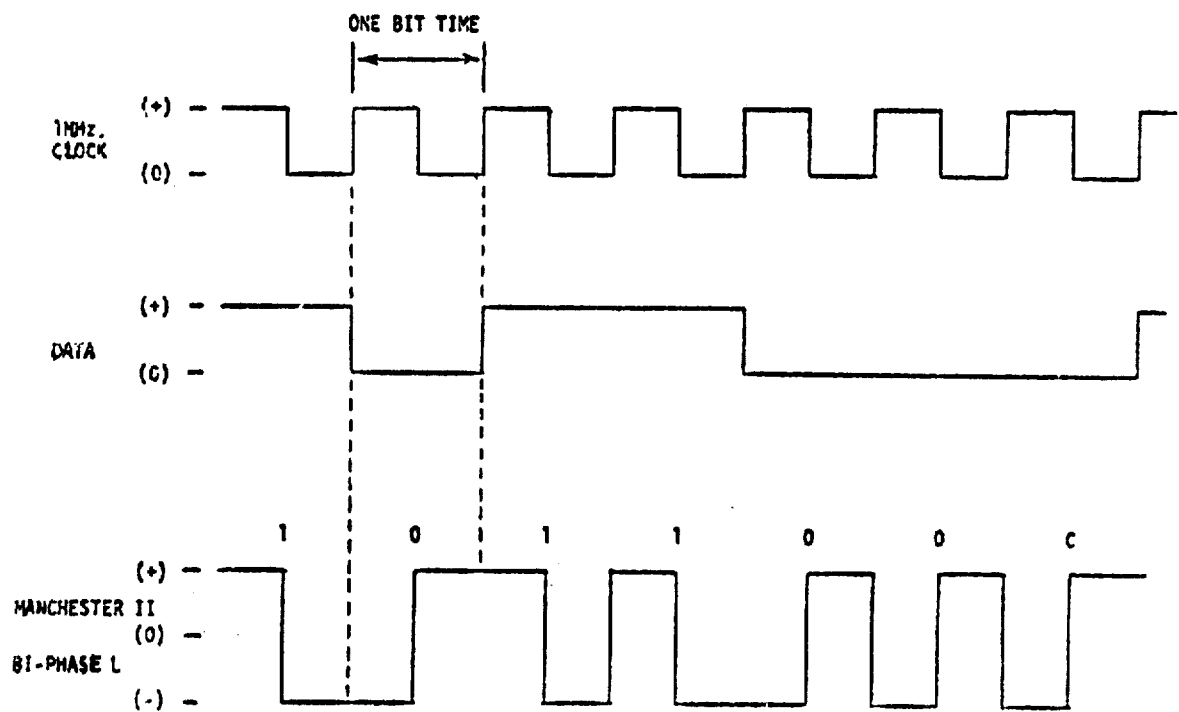
FIG. 2 is a graph-like illustration used to explain the data formats used in the invention.

FIG. 2 illustrates the relationship between the Manchester code format and the one megacycle clock signal. FIG. 2 also shows the relationship between the bit time, the Manchester code and the non-return-to-zero data (NRZ) that is used in the micro-programmable data terminal of the invention for data transfer to and from the subsystem to which it is connected. As indicated in FIG. 2, in the NRZ data format, a logical one is a high level or positive amplitude signal and a logical zero is a low level or negative amplitude signal. Furthermore, the amplitude of the NRZ data remains fixed unless there is a logic change in the data. Accordingly, as shown in FIG. 2, the NRZ data signal remains positive for two full bit times for the corresponding two logical ONES and then changes to a negative signal for three full bit times corresponding to the three contiguous ZEROS in the Manchester bi-phase signal.

Figure 3:
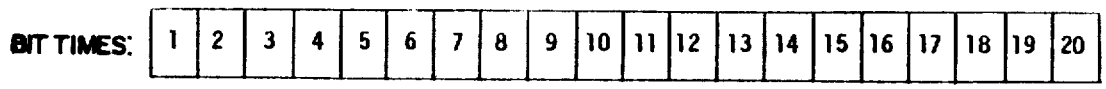
FIG. 3 is a graph-like illustration used to explain the word formats used in the invention.
Figure 3:
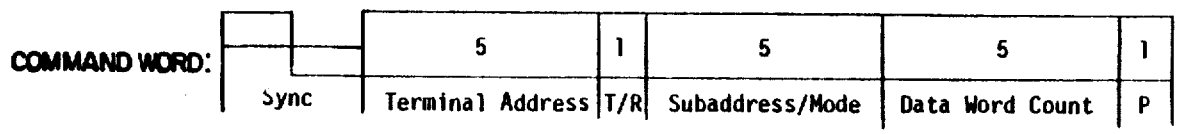
Figure 3:
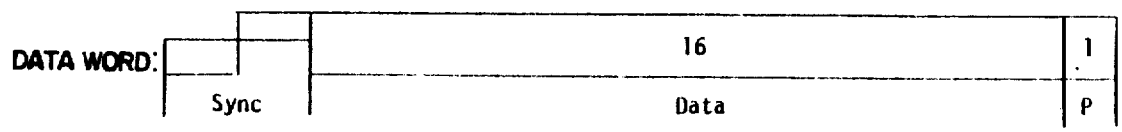
Figure 3:
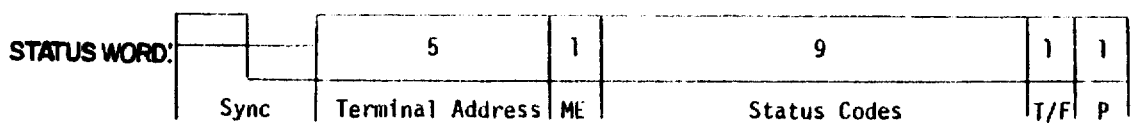

FIG. 3 indicates that there are three types of words used in data transfer on a time division multiplex serial data bus, namely, a command word, a data word and a status word. The size of each word is the same, namely twenty bits. The twenty bit times include three bit times devoted to the synchronization waveform (Sync) and one bit time devoted to parity (P). The remaining formats for the respective types of words transmitted depend upon the type of word. A command word includes a five-bit terminal address thus permitting a maximum of 32 remote terminals to be interconnected by means of a single data bus. The transmit receive bit (T/R) is utilized to indicate the action required of the remote terminal with a logic 0 indicating that the remote terminal is to receive data and a logic 1 indicating that the remote terminal is to transmit data. The next five bits of the command word are designated sub-address/mode bits and they are used for either addressing sub-portions of each subsystem and/or controlling the mode of operation of the subsystem. The next 5 bits, designated data word count bits, indicate the number of data words to be transmitted or received by a remote terminal. Accordingly, a maximum of 32 data words may be transmitted or received in a single message block.

The 16 bits following the synchronization waveform in a data word are all devoted to the transmission of data.

In a status word the first 5 bits after the synchronization waveform are devoted to an indication of the address of the terminal which is transmitting a status word. The first bit (ME) after the terminal address is used as message error status information indicating whether the preceding message failed to pass the validity tests of the remote terminal. A logic 1 indicates the presence of a message error in the previously transmitted message and a logic 0 indicates that no such error occurred. The next 9 bits of the status word following the message error bit may be used to indicate the status of a remote terminal function and the 19th bit in the status word is a terminal flag (T/F) which is used to indicate to the bus controller the need for examination of certain test data available from the remote terminal. The parity bit P has already been discussed.

For each of the three types of information transmitted in a time-division multiplex system, namely, command, data and status words, a synchronization signal is employed so that the beginning of a word may be recognized by the receiving system. As shown in FIG. 3, the synchronization waveforms of the command word and status word are different from the synchronization waveform for data word. In the synchronization waveform for a command word and status word the waveform is an invalid Manchester waveform of three bit times width, the waveform being positive for the initial one and one-half bit times and negative for the final one and one-half bit times. The synchronization waveform for a data word is also an invalid Manchester waveform of 3 bit times in width but with the waveform being negative for the initial one and one-half bit times and then positive for the final one and one-half bit times.

Figure 4:
FIG. 4 is a graph-like illustration used to explain the message formats used in the invention.
Figure 4:
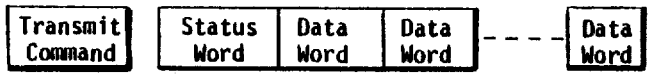
Figure 4:
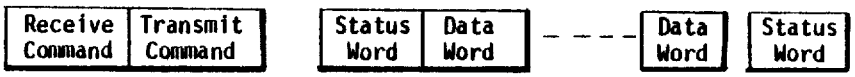

FIG. 4 illustrates the message formats required by the MIL-STD for the three types of information transfer, namely, controller to terminal, terminal to controller and terminal to terminal. As shown at the top of FIG. 4, for a controller to remote terminal transfer, a controller first issues the receive command followed by a specified number of data words. Subsequent to the transmission of the last data word in the controller to terminal transfer the remote terminal validates the message and transmits a status word back to the controller.

In a terminal to controller transfer the bus controller issues a transmit command to the appropriately addressed remote terminal. The remote terminal verifies the command and transmits a status word back to the bus controller followed by a specified number of data words.

In information transfers between remote terminals the bus controller first issues a receive command to the remote terminal designated for receiving the information and follows that by a transmit command to the remote terminal designated to transmit the information. The transmitting remote terminal validates the transmit command, transmits a status word and then transmits the appropriate number of specified data words after which the receiving remote terminal validates the received message and transmits a status word to the controller to verify that a valid message has been transferred.

Figure 5:
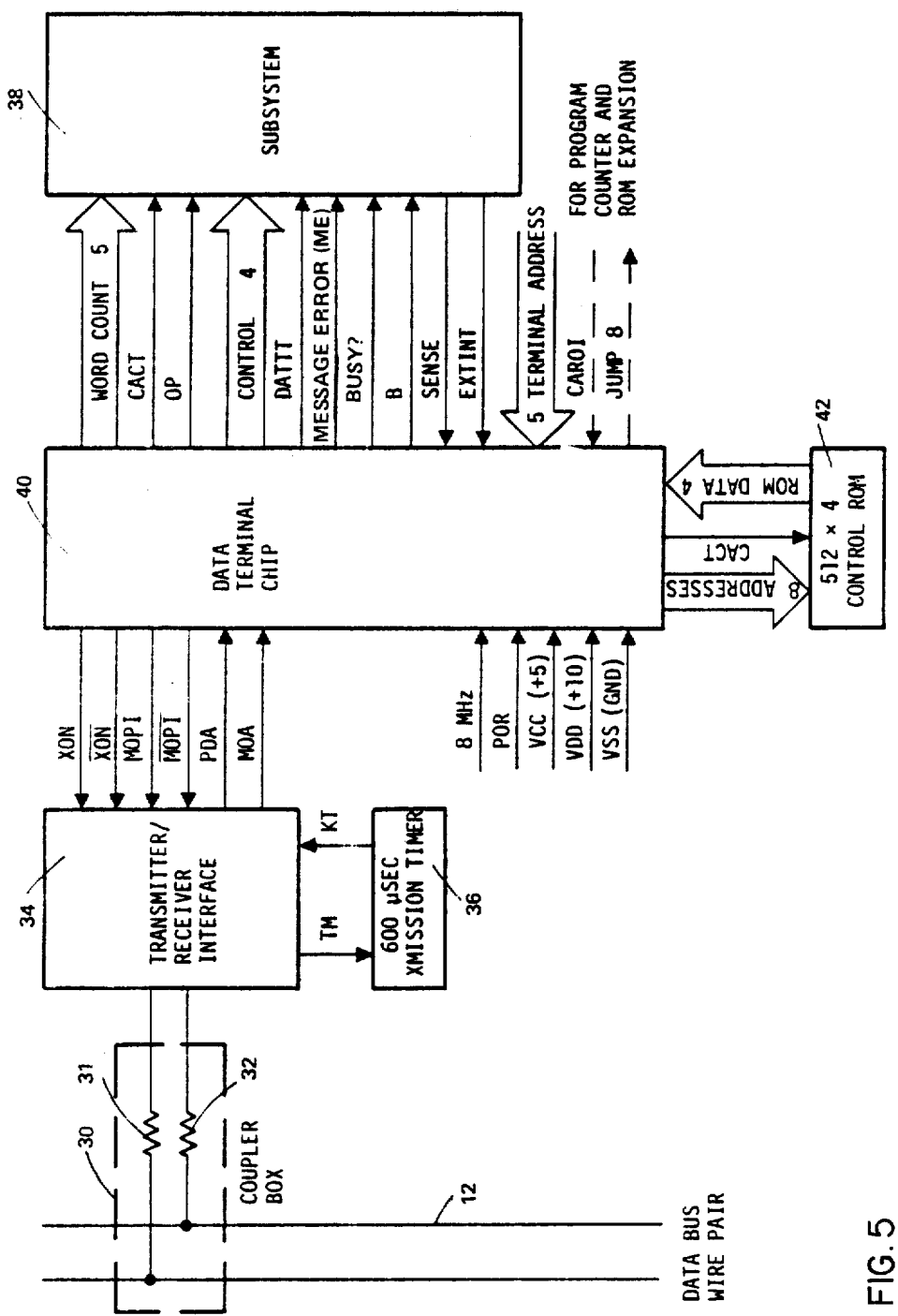
FIG. 5 is a block diagram illustrating the manner in which the invention interfaces with a subsystem, with an external read-only memory device, and with a time-division multiplex data bus.

Referring now to FIG. 5, there is shown therein a block diagram representation of a micro-programmable data terminal chip 40 connected to a subsystem 38 and to a data bus wire pair of a time-division multiplex serial data bus 12. The physical connection to the data bus 12 is accomplished by means of a coupler box 30 which includes a pair of isolation resistors 31 and 32 as required by the military standard. A transmitter/receiver interface circuit 34 as is well known, includes a coupling transformer tuned to act as an analog filter, a transmitter having two grounded emitter transistors for applying a bi-polar signal to the respective sides of the balanced data bus 12, and a receiver in the form of a level detector for the differential voltage of the balanced bus wire pair 12 for detecting voltages above and below established threshholds that correspond to the logic ONE and logic ZERO signals of the Manchester code.

A transmission timer 36 is connected to the transmitter/receiver interface circuit to prevent continuous transmission for greater than 600 microseconds in accordance with the MIL-STD requirements. The transmit signal TM indicates the start time of transmission to the transmission timer and a kill transmitter signal KT terminates transmission if the 600 microsecond transmission time is surpassed. The detailed components of the coupler box 30, transmitter/receiver interface 34, and transmission timer 36, are not shown since these devices are well known in the art and do not constitute elements of the present invention.

As further shown in FIG. 5, the micro-programmable data terminal chip 40 is connected to interface the transmitter/receiver interface circuit 34, the subsystem 38, and an external control ROM 42.

As indicated in FIG. 5, there are six lines between the micro-programmable data terminal MPDT 40 and the transmitter/receiver interface circuit 34. These lines carry the following signals: Transmitter ON and the complement of Transmitter ON, XON and $\overline{\text{XON}}$, indicate the state of the data flow namely whether it's a transmitting or receiving mode of operation. When XON is ONE, the system is transmitting and when $\overline{\text{XON}}$ is ONE the system is receiving and the transmitter is off. The next two lines carry the signals MOPI and $\overline{\text{MOPI}}$ which constitute Manchester encoded data for transmission, MOPI and $\overline{\text{MOPI}}$ being complements of each other. The two lower-most lines between chip 40 and transmitter/receiver interface circuit 34, carry data detected by the receiver portion of chip 40. The signals of these two lines are respectively PDA, the positive detected level signal, and MDA the minus detected level signals.

On the lower left-hand portion of the chip in FIG. 5, the following additional signals are indicated as input signals to data terminal 40: An 8 MHz external clock signal, a power on reset (POR) signal, a 5V DC signal VCC, a 10V DC signal VDD and electrical ground, designated VSS.

On the right side of data terminal chip 40 in FIG. 5, are shown the various signals and lines that are used as an interface to the subsystem 38. In the uppermost portion of FIG. 5, on the right side of terminal chip 40, is shown a multi-line word count signal which indicates to the subsystem the number of words remaining to be transmitted or received in a particular message block. The signal CACT, is a 1 MHz synchronizing signal sent to the subsystem. The next signal is the output signal OP which indicates to the subsystem that data is being sent to it. The next signal is a multi-line control signal which serves the function of indicating status to the subsystem and also controlling various functions in the subsystem depending upon the type of subsystem to which the micro-programmable data terminal chip 40 is connected. The signal, DATTT, is a tri-state bi-directional data signal which comprises data being transferred to the subsystem that has been received by the chip 40 and data being transferred from the subsystem for transmission on the serial data bus 12.

The next signal is message error signal ME which indicates to the subsystem that the previously handled message contrains an error of some type. The busy signal indicates to the subsystem that the data bus is presently being used. The B signal is a mode indicator to the subsystem indicating whether the current information transfer is a transmission or reception with respect to the serial data bus. The sense signal may be used to cause the micro-programmable data chip to execute a branch instruction resulting from an external stimulus. The external interrupt signal EXTINT is used by the subsystem to indicate its readiness to receive data or transmit data. The next signal is a five-line terminal address signal which is usually hard-wired into the data terminal chip 40 when it is operating in a remote terminal mode. The terminal address represents the fixed address for the subsystem to which the data terminal chip 40 is connected and selects the data terminal chip 40 which is to be operational. The carry input CAROI and Jump 8 signals are used in conjunction with an external register which may optionally be connected to the data terminal chip for program counter expansion.

At the bottom portion of FIG. 5 are shown the signals that are transferred between chip 40 and external control ROM 42. As indicated, eight address signals are employed to address external ROM 42 which in response returns four data signals derived from the address location within the read-only memory device. In addition, a clock signal CACT is transferred to the ROM for synchronization.

Figure 6:
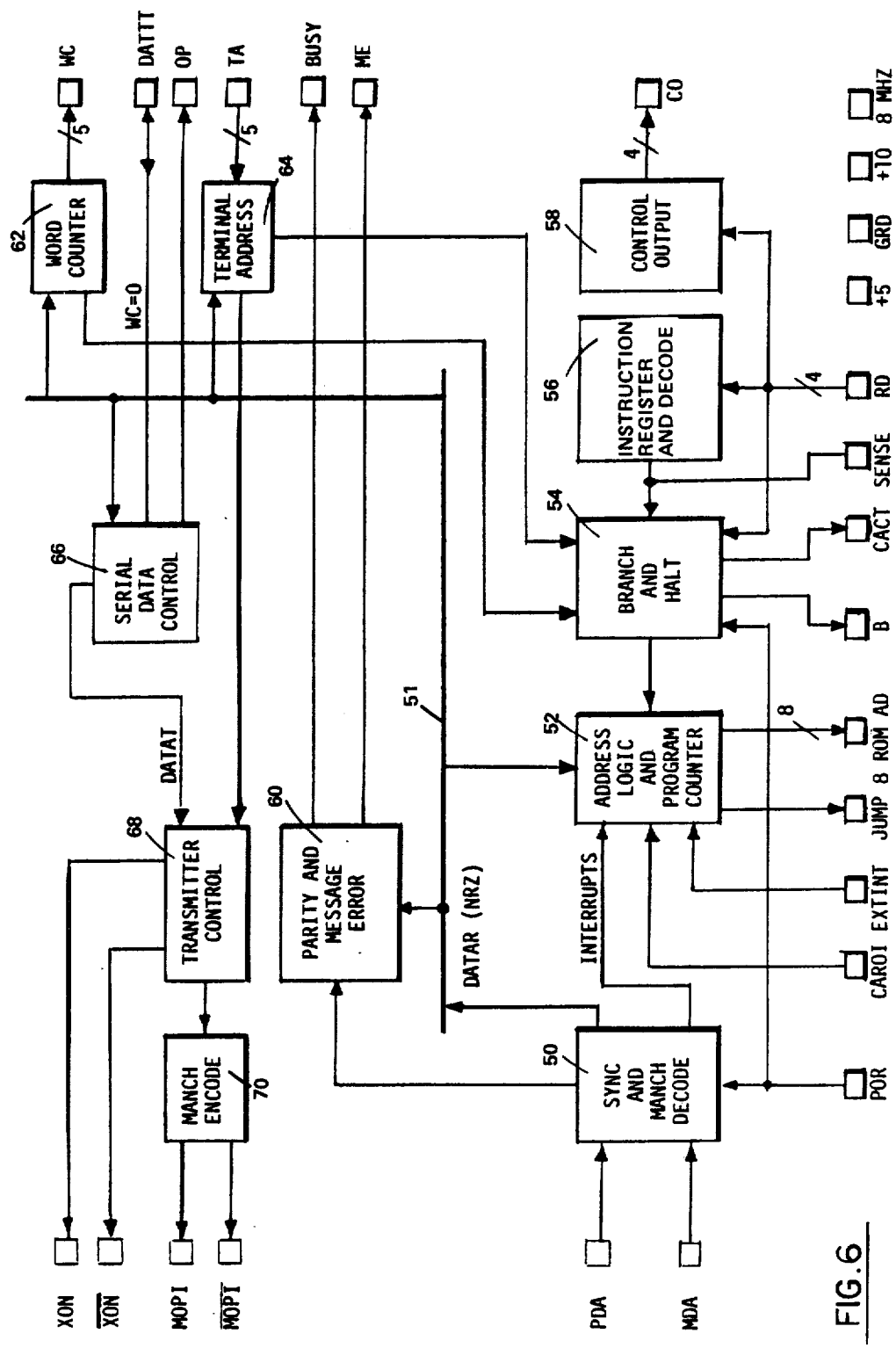
FIG. 6 is a simplified block diagram of the invention.

Referring now to FIG. 6, there is shown therein a block diagram representation of the micro-programmable data terminal of the invention. As indicated, the MPDT comprises the following functional blocks: a synchronization and Manchester decoder circuit 50, an address logic and program counter 52, a branch and halt logic circuit 54, an instruction register and decoder 56, a control output circuit 58, a parity and message error circuit 60, a word counter 62, terminal address logic 64, serial data control circuit 66, transmitter control circuit 68, and Manchester encoder 70. Also shown is an internal data bus 51, upon which the decoded Manchester data is transferred by means of serial data control circuit 66 to the subsystem in a non-return to zero format (DATAR).

The synchronization and Manchester decoder circuit 50, receives complementary data from the transmit/receive unit 34 in the form of the signals designated PDA and MDA, respectively. It then conditions, synchronizes and processes this data to derive synchronizing clock signals, to generate program interrupt signals from command/status and data synchronizing pedestals, and decodes the Manchester encoded signals generating data in a non-return to zero (NRZ) data format.

Figure 7:
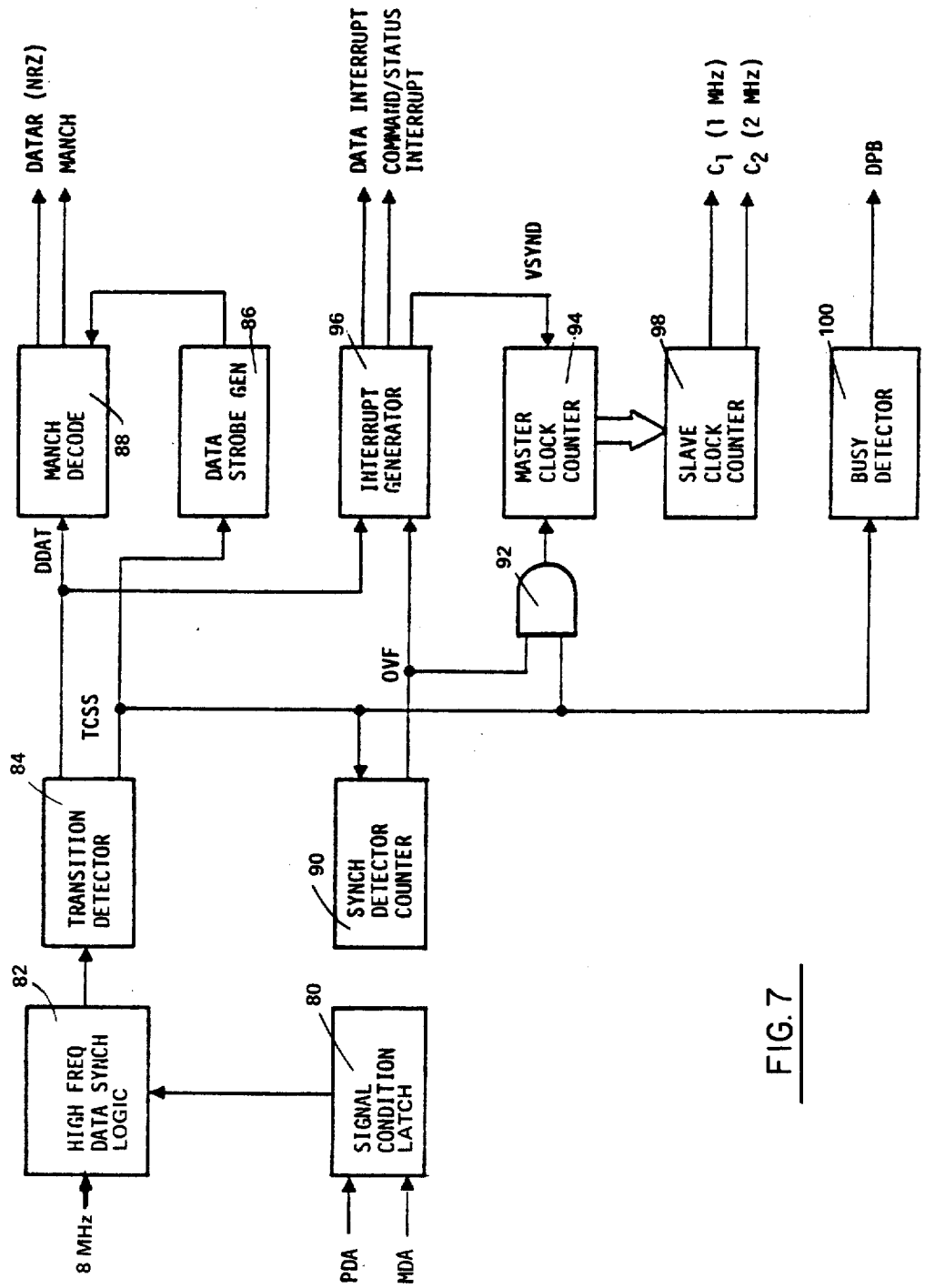
FIG. 7 is a simplified block diagram of the synchronization and Manchester data format decode logic of the invention.

FIG. 7 is a more detailed block diagram of the synchronization and Manchester decoder circuit 50. Input signals PDA and MDA pass through a signal conditioning latch 80 which prevents the signals from being logically TRUE simultaneously. The signals PDA and MDA are then synchronized with an external 8 MHz high frequency clock in the high frequency data synchronizing logic 82. Synchronization to the 8 MHz clock allows clocked logic to be used in the remaining portions of the micro-programmable data terminal.

The high frequency synchronized signal is then applied to a transition detector 84 which generates pulses designated TCSS that are coincident with changes of state, that is a change from a high level to a low level and a change from a low level to a high level of the input signals PDA and MDA. A transition pulse TCSS is generated only if the input signal PDA (or MDA) remains high for at least two consecutive cycles of the 8 MHz clock. The transition pulse TCSS is then conditioned in the data strobe generator logic 86 which in turn strobes the data received (DATAR) out of the Manchester decoder logic circuit 88. The Manchester decoder logic circuit 88 also generates a signal designated MANCH which is a logic low signal if the detected signal is not a valid Manchester encoded signal. A Manchester encoded signal is valid only if the signal PDA before the occurence of transition pulse TCSS is the complement of signal PDA after the occurence of transition pulse TCSS. The transition detector circuit 84, Manchester decode logic circuit 88 and data strobe generator 86, comprise, in combination, a bit detector which performs the following operation on the incoming signal: a Manchester logic ONE (ZERO) is detected if PDA is high (low) and then low (high) for at least two consecutive 8 MHz clock times.

A synchronization detector counter 90, which in the present embodiment is a 9-state counter, is reset by the transition pulse TCSS. If the signal PDA (or MDA) is high for at least 10 consecutive 8 MHZ clock periods, the counter generates an overflow pulse designated OVF. The first occurring overflow pulse OVF enables AND-gate 92 allowing the transition pulse TCSS to synchronize a master clock counter 94 with the transition of the command/status and/or data synchronizing pedestals (See FIG. 3). The overflow pulses OVF are also applied to an interrupt generator 96 which includes a plurality of clocked flip-flops. The output states of these flip-flops within interrupt generator 96 are decoded to develop command/status and/or data interrupt signals. Interrupt generator logic 96 also generates a valid synchronizing signal VSYND. This signal indicates that two overflow signals OVF have occurred and that a valid synchronizing pedestal has been detected. The valid synchronizing signal VSYND is applied to master clock counter 94 which, in response thereto, sets slave clock counter 98 to the same state as master clock counter 94. Slave clock counter 98 develops two clock signals, a 1 MHz synchronizing clock signal C1 and a 2 MHz clock signal C2. By using the master/slave clock configuration, the 1 MHz clock signal C1 which is used for synchronizing operation of the micro-programmable data terminal, will not be interrupted even if the synchronization detector counter 90 generates a single spurious overflow pulse due to system noise.

A busy detector circuit 100 senses the presence of signals PDA and MDA and generates a signal designated DPB which is used in the parity and message error logic circuit 60 to generate a bus busy signal BUSY.

As shown in FIG. 3, a command/status or data synchronization signal is determined to be valid if the signal is high (low) and then low (high) for 10 consecutive cycles of the 8 MHz clock. Transition detector 84 also generates a delayed signal DDAT which is the signal PDA delayed by two 8 MHz clock cycles. Delayed signal DDAT is used to determine which synchronizing signal has been detected, i.e., command/status or data.

If a command/status synchronization signal is detected, synchronization and Manchester decode logic circuit 50 (See FIG. 6) sets the program counter 52 to a hexadecimal location 80. It also sets a T/R flip-flop in transmitter control unit 68 to the receive mode and resets the flip-flop designated OP in the serial data control unit 66. Detection of a data synchronization signal sets the program counter to a hexadecimal location 40, sets the T/R flip-flop in the transmitter control unit 68 to the receive mode and resets the flip-flop OP in the serial data control unit 66. It also resets a flag flip-flop designated F1 in the branch and hold logic 54. The purpose of setting these various flip-flops and the like in other units within the microprogrammable data terminal in response to detection of command/status synchronization signals and data synchronization signals, will become evident below in conjunction with the descriptions of those other units.

Figure 8A:
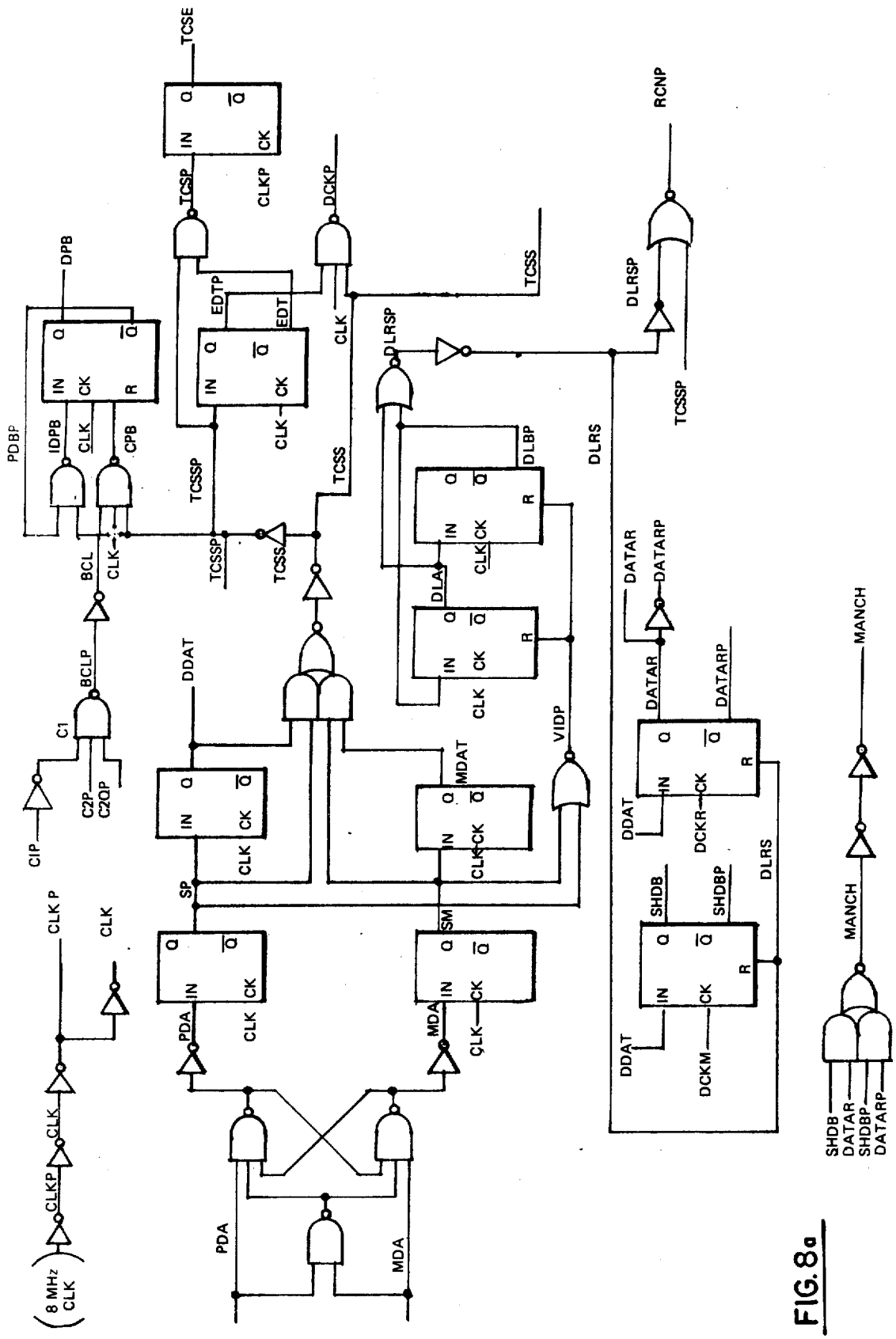
FIG. 8 is a detailed logic schematic of the synchronization and Manchester data format decode logic of the invention.
Figure 8B:
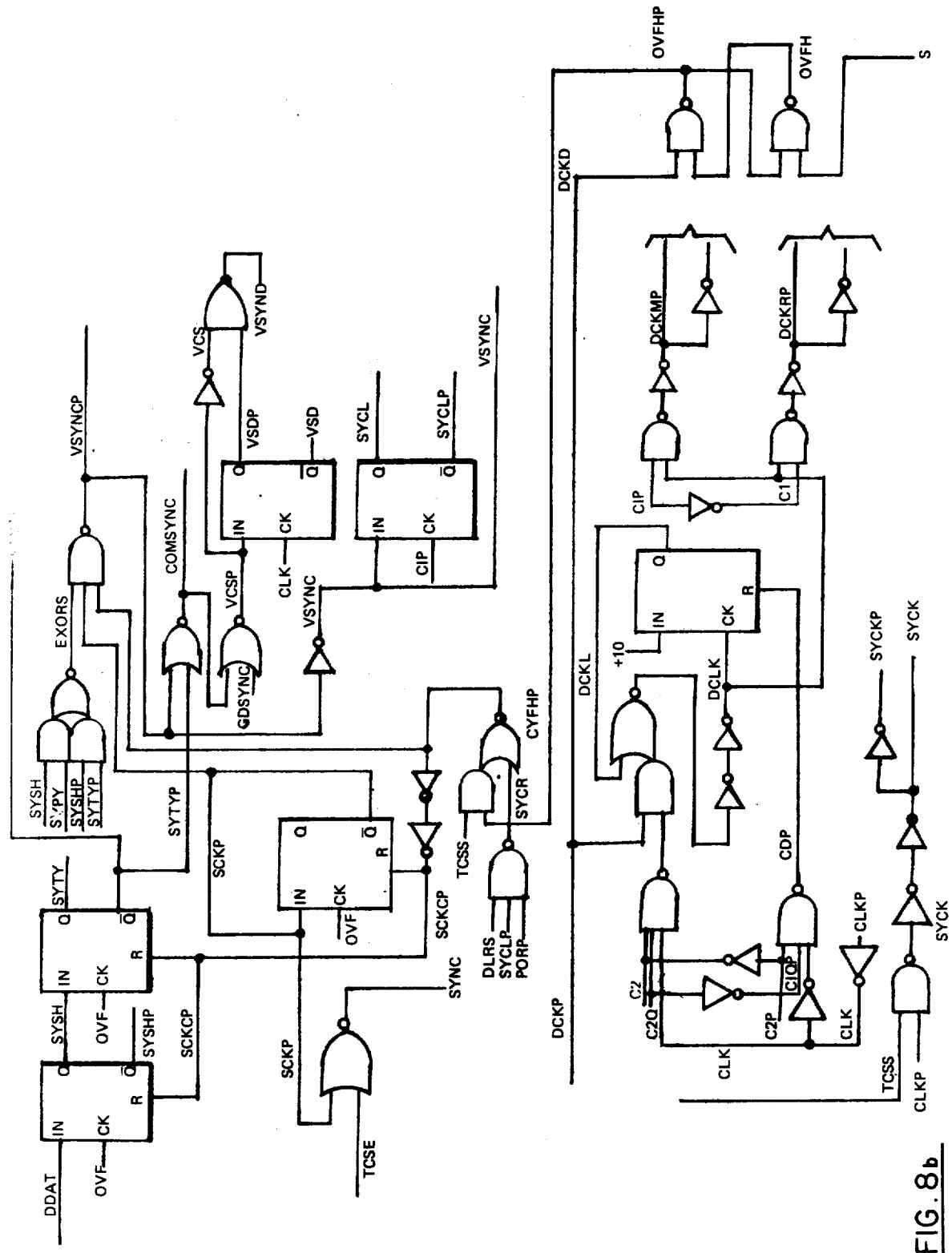
Figure 8C:
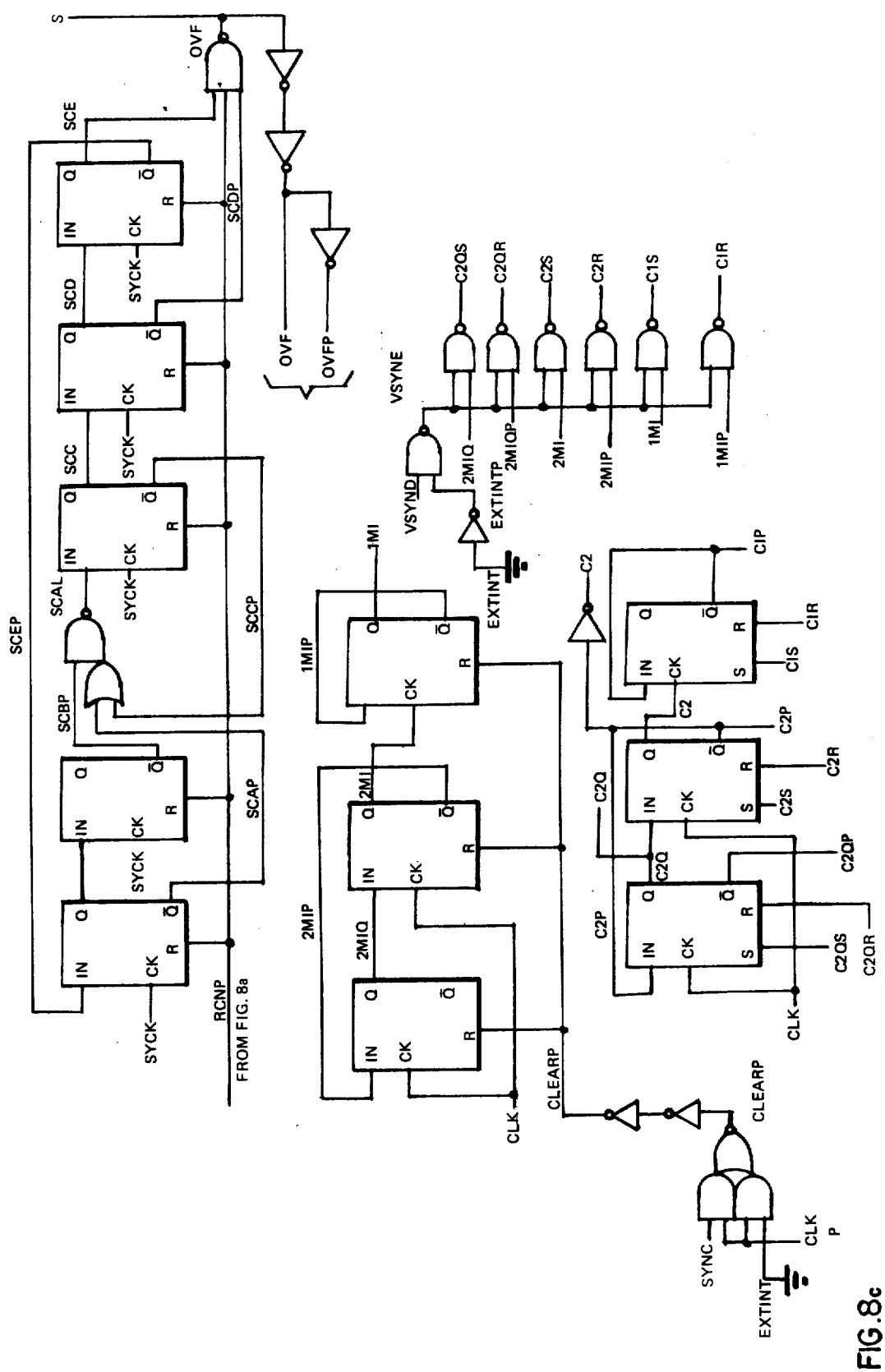

FIGS. 8a, 8b and 8c comprise a detailed logic schematic of the conventional digital logic elements including flip-flops, logic gates and inverters that are used to accomplish the functions of the synchronization and Manchester decoder logic 50.

Figure 9:
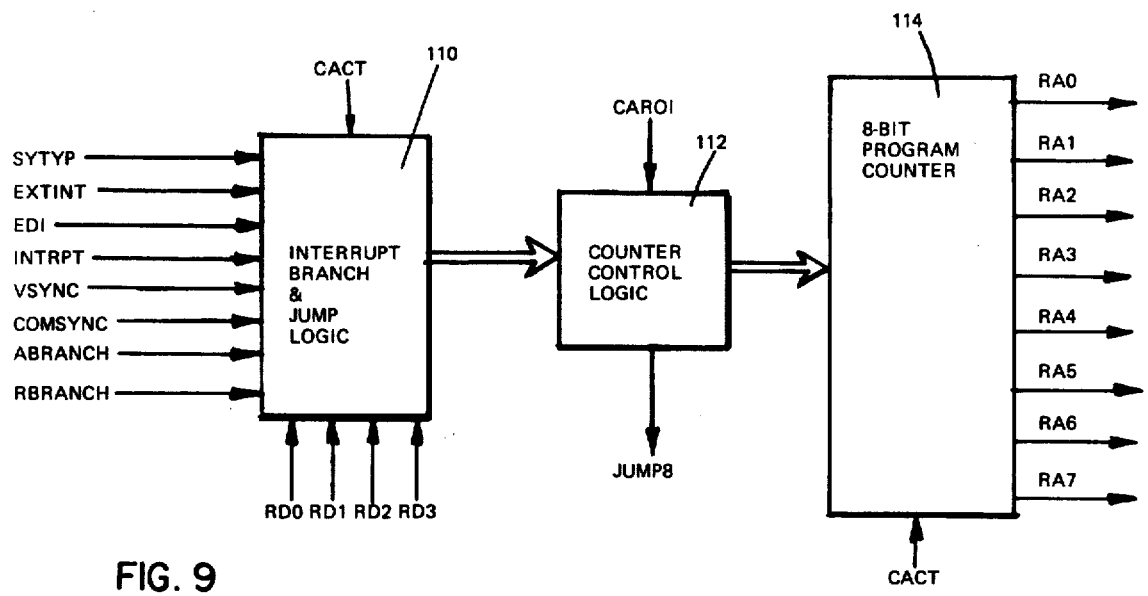
FIG. 9 is a simplified block diagram of the address logic and program counter portion of the invention.

Referring now to FIG. 9, there is shown a more detailed block diagram of the address logic and program counter 52 which comprises an interrupt branch and jump logic circuit 110, a counter control logic circuit 112 and an 8 bit program counter 114. The 8 bit program counter 114 is used to address the external read only memory device 42. Interrupt and jump logic circuit 110 and counter control logic circuit 112 are used to preset the counter as required by interrupt or branch input signals.

The eight ROM address lines RA0 through RA7 of FIG. 9 are brought off the micro-programmable data terminal to the external read only memory 42. The program counter can be extended to any number of bits by using the Jump 8 and CAROI lines with the addition of an external counter. The external counter if used, would constitute the least significant bits of the extended counter. The CAROI line carries the overflow signal from optional external counter (not shown) to the counter logic 112 in the address logic and program counter 52 and the Jump 8 line would be used to reset the external counter. The Jump 8 line is set to a logic high by either an interrupt signal or an absolute branch signal ABRANCH.

An interrupt or branch signal presets the program counter to a given state. The counter then sequences through its instruction set one bit at a time in synchronism with the clock rate determined by the clock signal CACT until it is sent to a new location by a branch instruction or another interrupt signal. When a command/status synchronization signal is detected, an unconditional command interrupt signal is generated within interrupt branch and jump logic circuit 110. An unconditional command interrupt signal sets the program counter to a hexadecimal location 80. An external interrupt signal EXTINT also unconditionally sets the counter to a hexadecimal location, in this case 00. When a data synchronization signal is detected, a conditional interrupt signal is generated and in response thereto the program counter 114 is set to a hexadecimal location 40, on the condition that data synchronization has been enabled by an EDI instruction generated by instruction register and decode circuit 56, subsequent to the last occurring interrupt signal or DDI instruction.

An absolute branch instruction ABRANCH transfers the counter output to a hexadecimal location XO where X is the four least significant bits of the 8 bit branch instruction. When an absolute branch instruction occurs, these four least significant bits of the branch instruction are the ROM data signals RD0 through RD3. A relative branch instruction RBRANCH does not set the four least significant bits of the counter to zero but leaves them at the value they would have if the counter had sequenced normally to the next location. Accordingly, the counter is transferred to hexadecimal location XY where X is the four least significant bits of the 8 bit branch instruction and Y is the four least significant bits of the address of the next instruction in the counter sequence.

Figure 10:
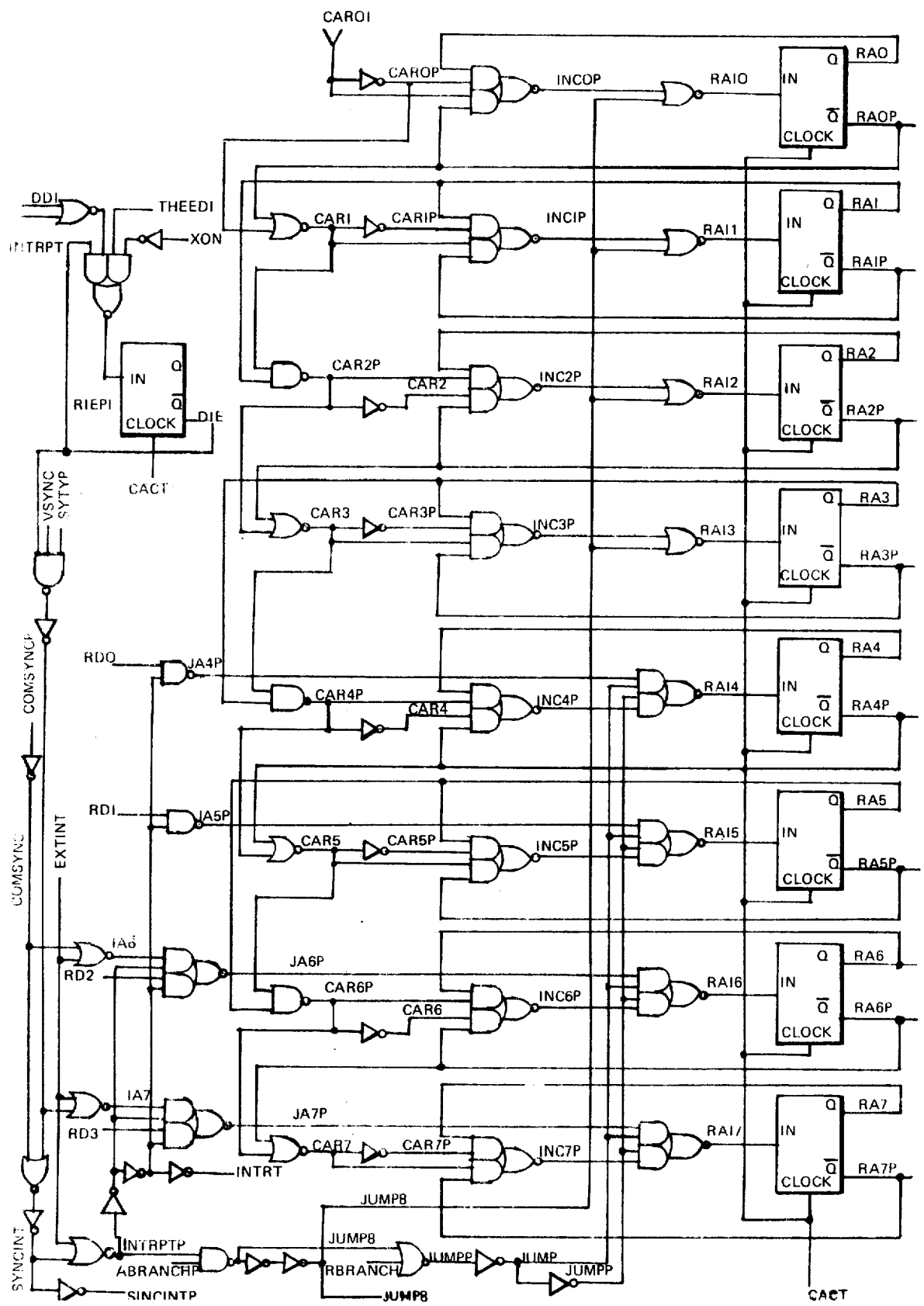
FIG. 10 is a detailed logic schematic of the address logic and program counter portion of the invention.

FIG. 10 is a detailed logic schematic of the conventional digital logic elements including counters, flip-flops, logic gates, and inverters that are used to accomplish the functions of the address and program counter 52.

Figure 11:
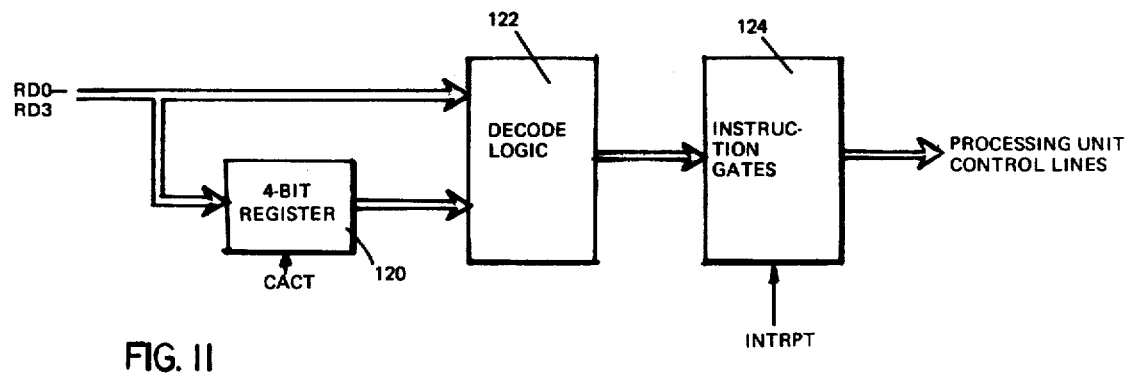
FIG. 11 is a simplified block diagram of the instruction register and decoder portion of the invention.

Referring now to FIG. 11 there is shown therein a simplified block diagram of the instruction register and decoder circuit 56 which comprises a 4-bit register 120, decode logic circuit 122 and instruction gate circuit 124. Instruction register and decoder circuit 56 is used by the micro-programmable data terminal to derive an 8-bit instruction from two 4-bit words sequencially read over the four data lines RD0 through RD3 from the external read only memory 42. The system clock signal CACT is used to strobe the two 4-bit words from the read only memory. On the first half cycle of the signal CACT, the first 4-bit word, called the most significant position word (MSPW), is loaded into the 4-bit register 120. On the second half cycle of the signal CACT the 4-bit least significant position word (LSPW) and the temporarily stored most significant position word (MSPW) are simultaneously clocked into decode logic circuit 122 to form 8-bit instruction signals. The 8-bit instruction signals are transferred through instruction gate circuit 124 where the instruction signals may be controlled in accordance with the logic state of the interrupt signal INTRPT. The output program instructions are then made available to circuits throughout the micro-programmable data terminal for control thereof.

Figure 12:
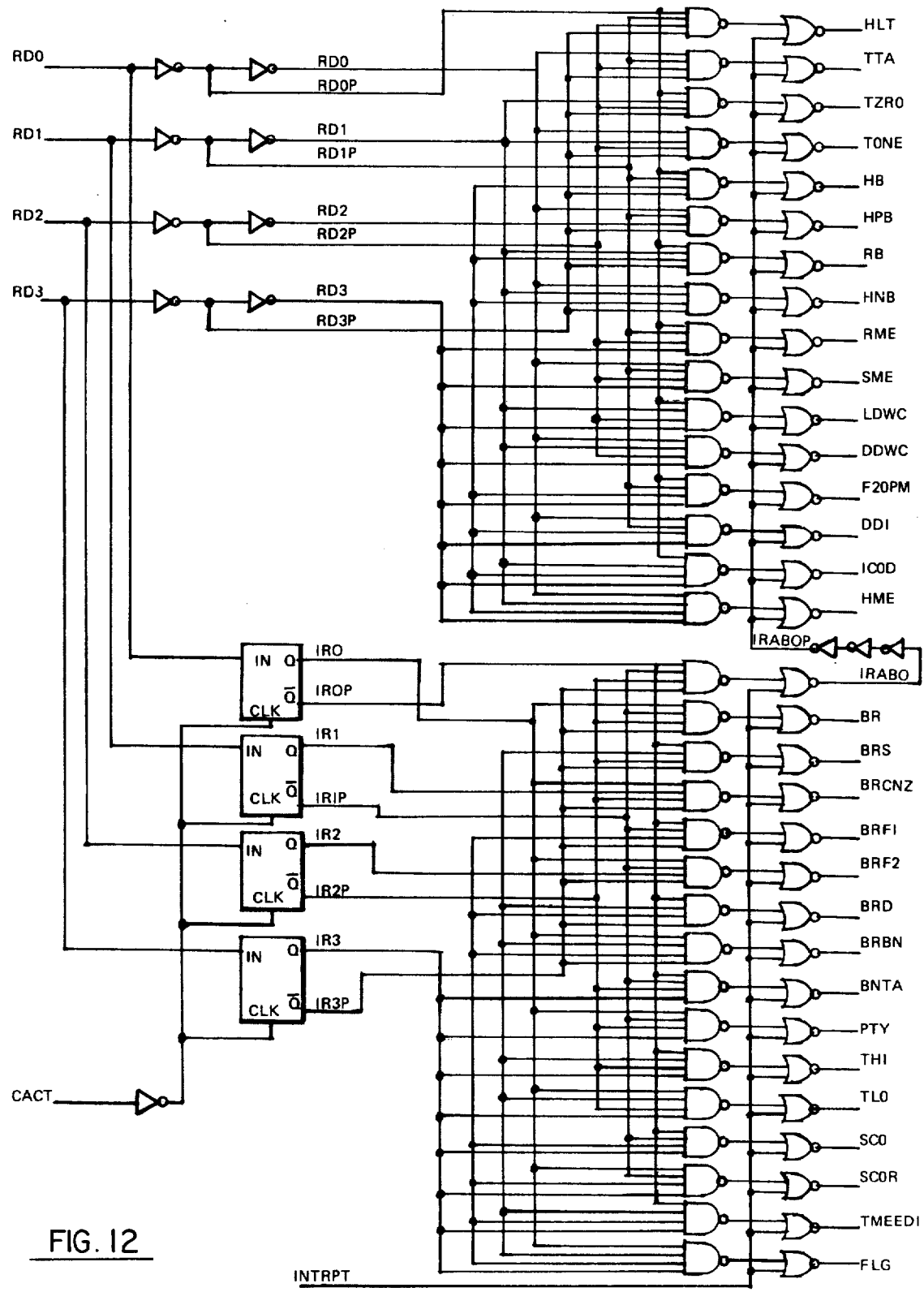
FIG. 12 is a detailed logic schematic of the instruction register and decoder portion of the invention.

FIG. 12 is a detailed logic schematic of the conventional digital logic elements including flip-flops, logic gates and inverters that are used to accomplish the functions of the address logic and program counter 52.

Figure 13:
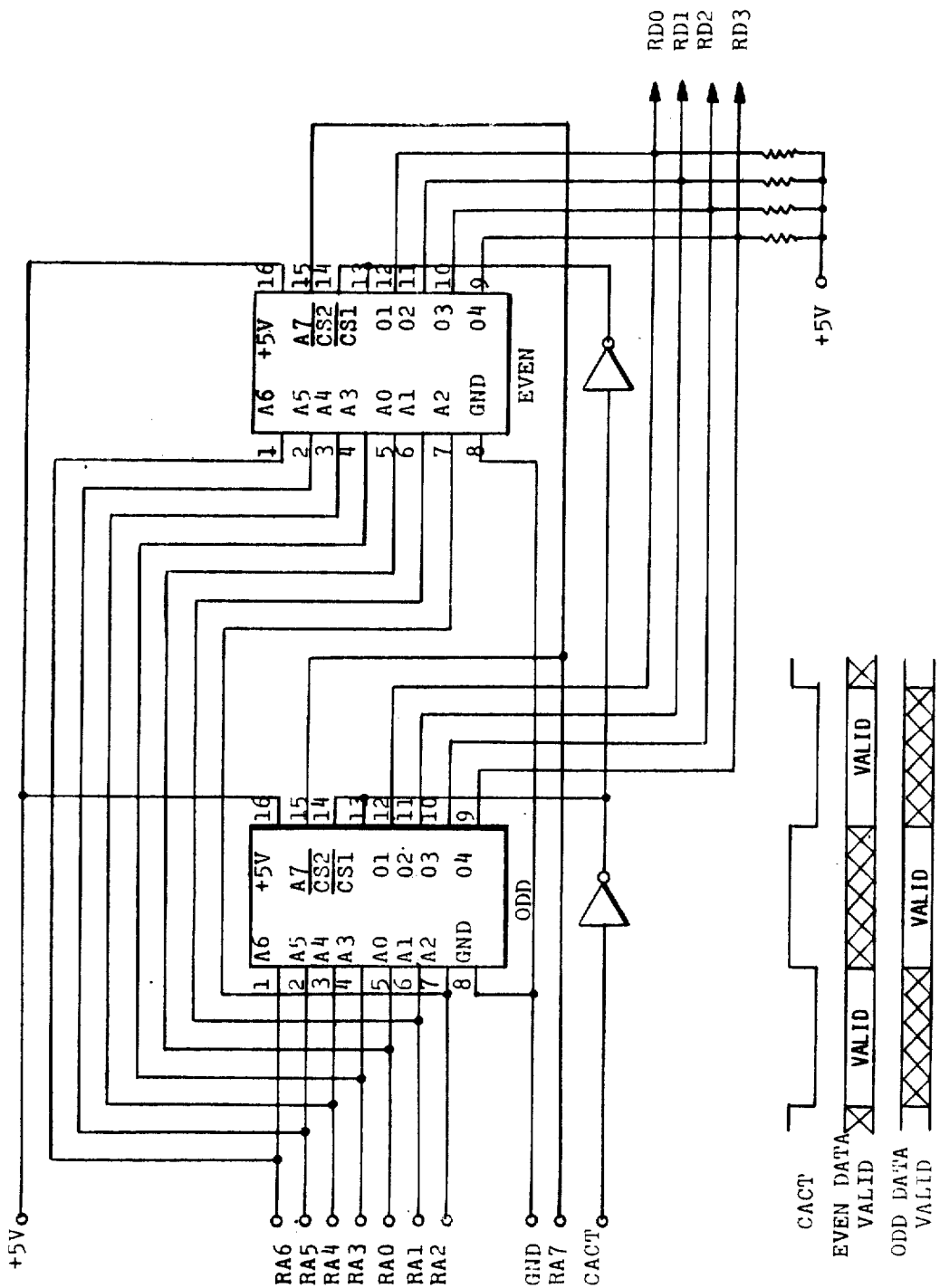
FIG. 13 is a block diagram illustrating typical read-only memory device mechanization for use with the invention.

Referring now to FIG. 13, there is shown therein a simplified block diagram illustrating a typical read only memory device mechanization for use with the invention. The instruction words stored in the read only memory are composed of two 4-bit words which are read sequentially from the program stored in the read only memory unit over lines RD0 through RD3 as discussed above in conjunction with FIGS. 11 and 12. The program stored in the read only memory unit is addressed with eight address signals RA0 through RA7 respectively and with the clock signals CACT. Each instruction occupies two 4-bit words in sequence. The most significant position word (MSPW) of each instruction occupies an even numbered memory location. The MSPW is read from memory during the first half cycle of the system clock CACT and then loaded into the instruction register that is the 4-bit register 120 of FIG. 11. The least significant position work (LSPW) is read from the memory on the second half cycle of CACT. The size of the read only memory unit, that is the number of 4-bit words that may be stored in the memory unit, is actually unlimited as is the number of bits that may be used to form an instruction address. Instruction address bits are defined as Z YYYY XXXX W where W is the LSB of the instruction address. The LSB is the CACT signal with W = 0 during the first half cycle for the even memory location of the MSPW and with W = 1 during the second half cycle for the odd memory location of LSPW. The number of bits in the field XXXX is variable and unlimited, although 4 bits are sufficient for satisfying the requirements of the MIL-STD. More X field bits would be used for a data format with words longer than 16 bits. An external extension to the program counter 114 of the address/logic and program counter circuit 52 (see FIG. 9) would be used if this field is longer than 4 bits. Field YYYY is 4 bits. These are the 4 bits specified in the branch instructions and by interrupt signals. Z is a page bit. The number of page bits is variable, however for a remote terminal or a bus controller individually meeting the appropriate requirements of the MIL-STD, none is required. For a device which in combination is a remote terminal and bus controller, 1 bit is required. In this case the bit is controlled from an external source which switches the micro-programmable data terminal between a remote terminal mode and a bus controller mode.

FIG. 13 indicates the manner in which two read only memory devices may be connected for operation as an external read only memory device for use in conjunction with the invention. As indicated, the read only memory address signals RA0 through RA7 are connected to the appropriate identical address terminals of the two read only memory devices 130 and 132. The clock signal CACT is applied to the read only memory device 130 through a single inverter 134, but is applied to the read only memory device 132 through two inverters in series, namely, 134 and 136. Accordingly, the clock signals applied to the chip select terminals of the respective memory devices are 180° out of phase so that only one of the two read only memory devices is enabled during each half cycle of the clock signal CACT.

Figure 14:
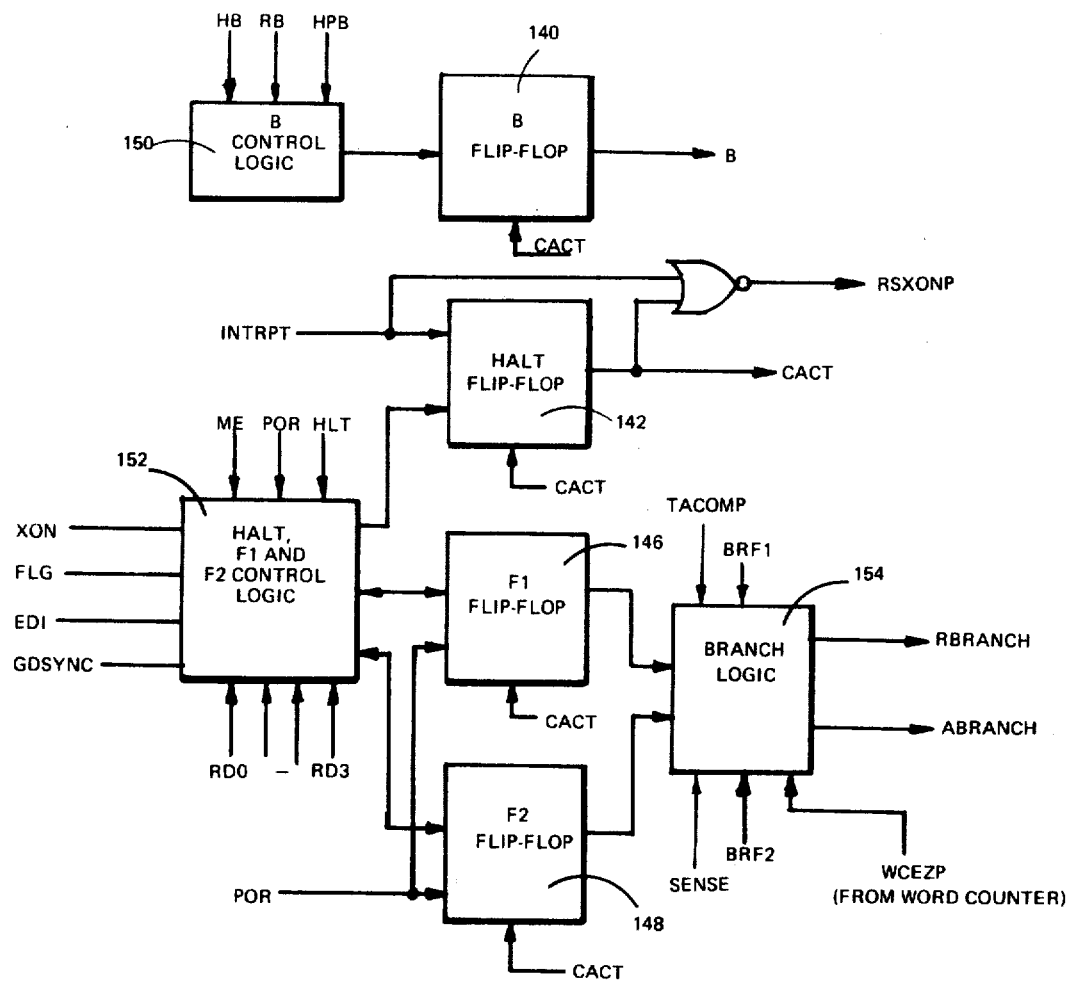
FIG. 14 is a simplified block diagram of the branch and halt logic portion of the invention.

Referring now to FIG. 14, there is shown therein a more detailed block diagram of the branch and halt logic circuit 54 which comprises a B flip-flop 140, a halt flip-flop 142, an F1 flip-flop 146 and an F2 flip-flop 148, B control logic 150, Halt, F1, and F2 control logic 52 and branch logic 154.

The output signal of the B flip-flop is brought off the micro-programmable data terminal chip 40 for use in the subsystem. The primary purpose of the B flip-flop is to store the transmit/receive bit in the command word, however any data bit can be stored as programmed. The bit stored is selected by the instructions HB and HBP.

The two flag flip-flops F1 and F2 are used to develop branch and halt conditions. Absolute branches occur when the appropriate flip-flop is set and the BRF1 or a BRF2 instruction is executed. The F1 and F2 flip-flops 146 and 148 respectively, are controlled by the FLG and EDI instructions. A conditional halt, set, reset or no action (NO-OP) is initiated in accordance with the contents of the LSPW of the EDI or FLG instruction. If LSPW equals $(X_1, Y_1, X_2, Y_2)$ where the subscripts pertain to the appropriate flag, then control of the F1 flip-flop and F2 flip-flop is defined as follows:

$X_i Y_i$
0 0 Halt if Flag $F_i$ is reset
0 1 Set Flag $F_i$
1 0 Reset Flag $F_i$
1 1 No Action Flag F1 is reset by a data synchronization interrupt signal. Halt flip-flop 142 controls the system clock signal CACT. When halt flip-flop 142 is set, the system clock signal CACT is inhibited so that the micro-programmable data terminal is inactive. Any interrupt signal resets halt flip-flop 142.

The power-on-reset signal POR sets and holds the halt flip-flop in a set condition whenever the power-on-reset signal is in a low condition. The power-on-reset signal also resets the F1 flip-flop 146 and the F2 flip-flop 148. As indicated in FIG. 14 a halt, F1 and F2 control logic circuit 152 receives the previously mentioned instruction signals as well as the message error signal ME, the transmission signal XON, and the read only memory data signals RD0 through RD3 for control of the three flip-flops 142, 146 and 148 respectively.

Figure 15:
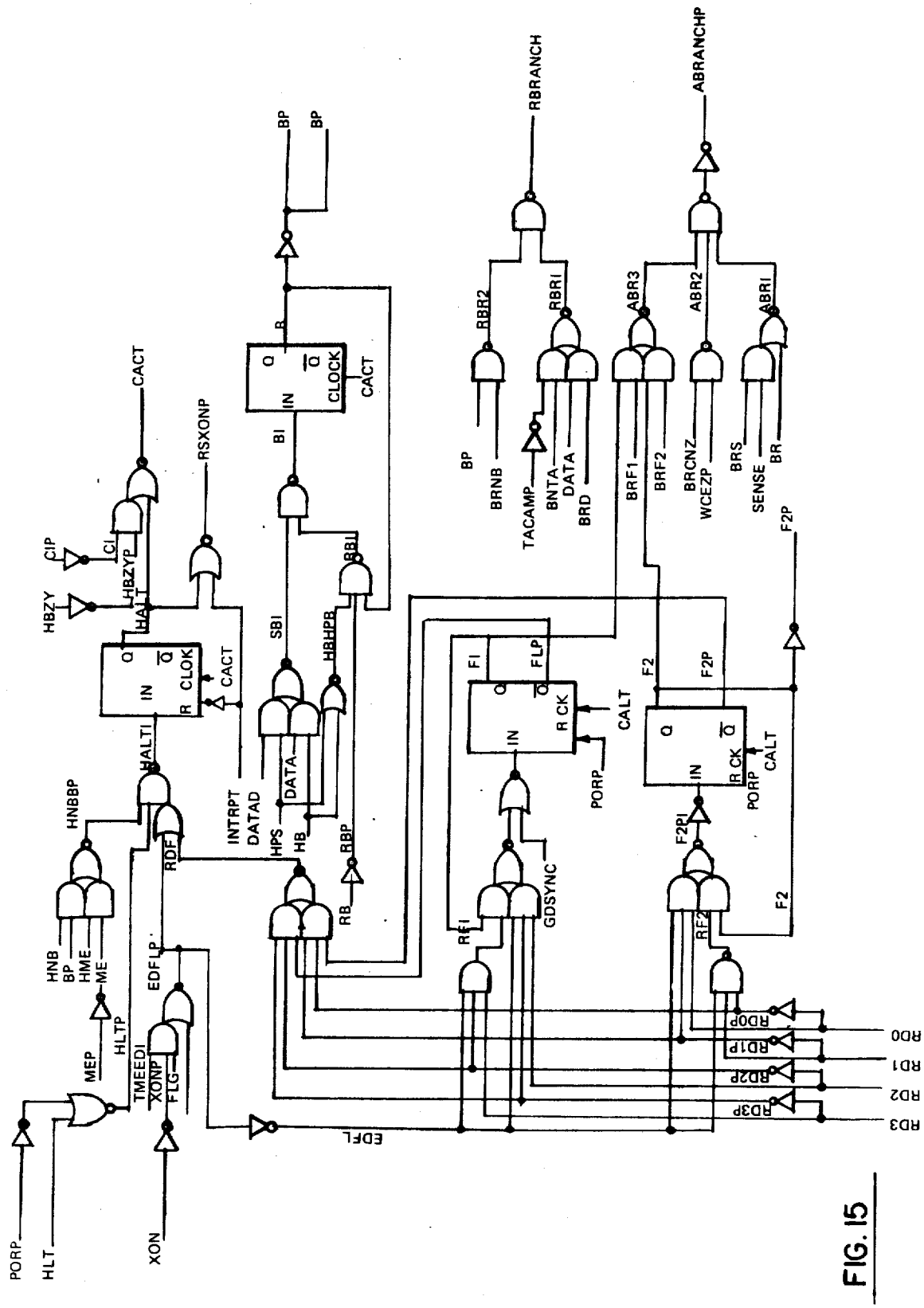
FIG. 15 is a detailed logic schematic of the branch and halt logic portion of the invention.

FIG. 15 is a detailed logic schematic of the conventional digital logic elements including logic gates, flip-flops and inverters that are used to accomplish the functions of the branch and halt logic circuit 54.

Figure 16:
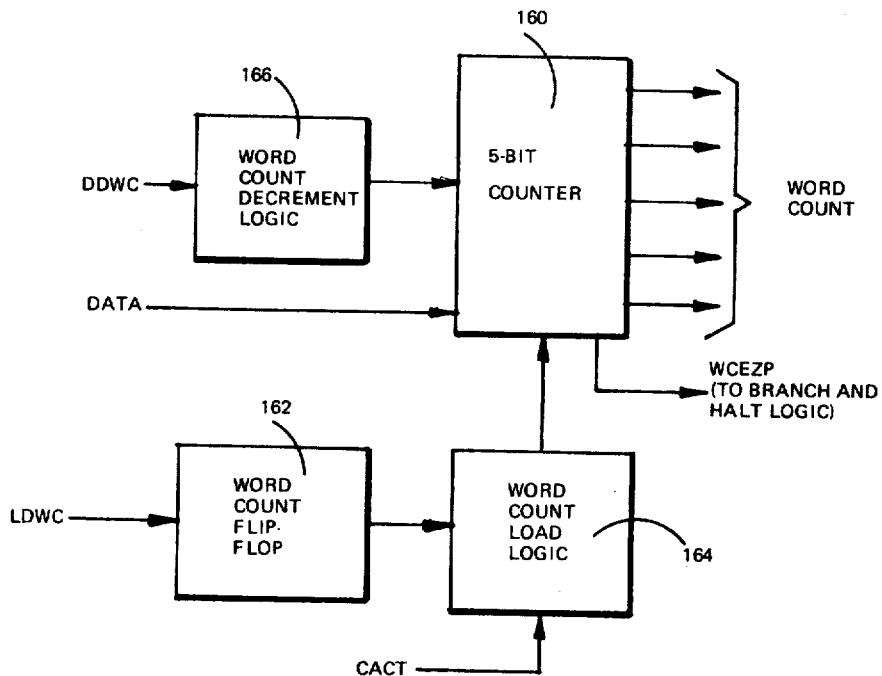
FIG. 16 is a simplified block diagram of the word counter portion of the invention.

Referring now to FIG. 16, there is shown therein, a more detailed block diagram of the word counter 62 which comprises a 5-bit counter 160, a word count flip-flop 162, a word count load logic circuit 164 and a word count decrement logic circuit 166. Word counter 62 contains the logic to serially load a 5-bit counter. The loading of the counter is initiated by the instruction Load Data Word Counter (LDWC). The LDWC instruction sets the word count WC flip-flop 162 causing the received data to be loaded into the counter. A subsequent LDWC instruction toggles the WC flip-flop and disables the counting action. To load a 5-bit word into the counter the instruction sequence could be LDWC, no-op, no-op, no-op, LDWC. Other instructions may be substituted for the no-ops if needed, but there must be three such instructions and no halt may occur during the instruction sequence. The 5-bit counter 160 is decremented by the decrement data word counter instruction DDWC which is applied to word decrement logic circuit 166. The word counter is decremented each time the DDWC instruction is executed.

The contents of the word counter 62 are monitored and used in the branch and halt logic circuit 64 to cause a program branch operation when the counter is not equal to zero and when a branch on counter not zero instruction (BRCNZ) is executed.

Figure 17:
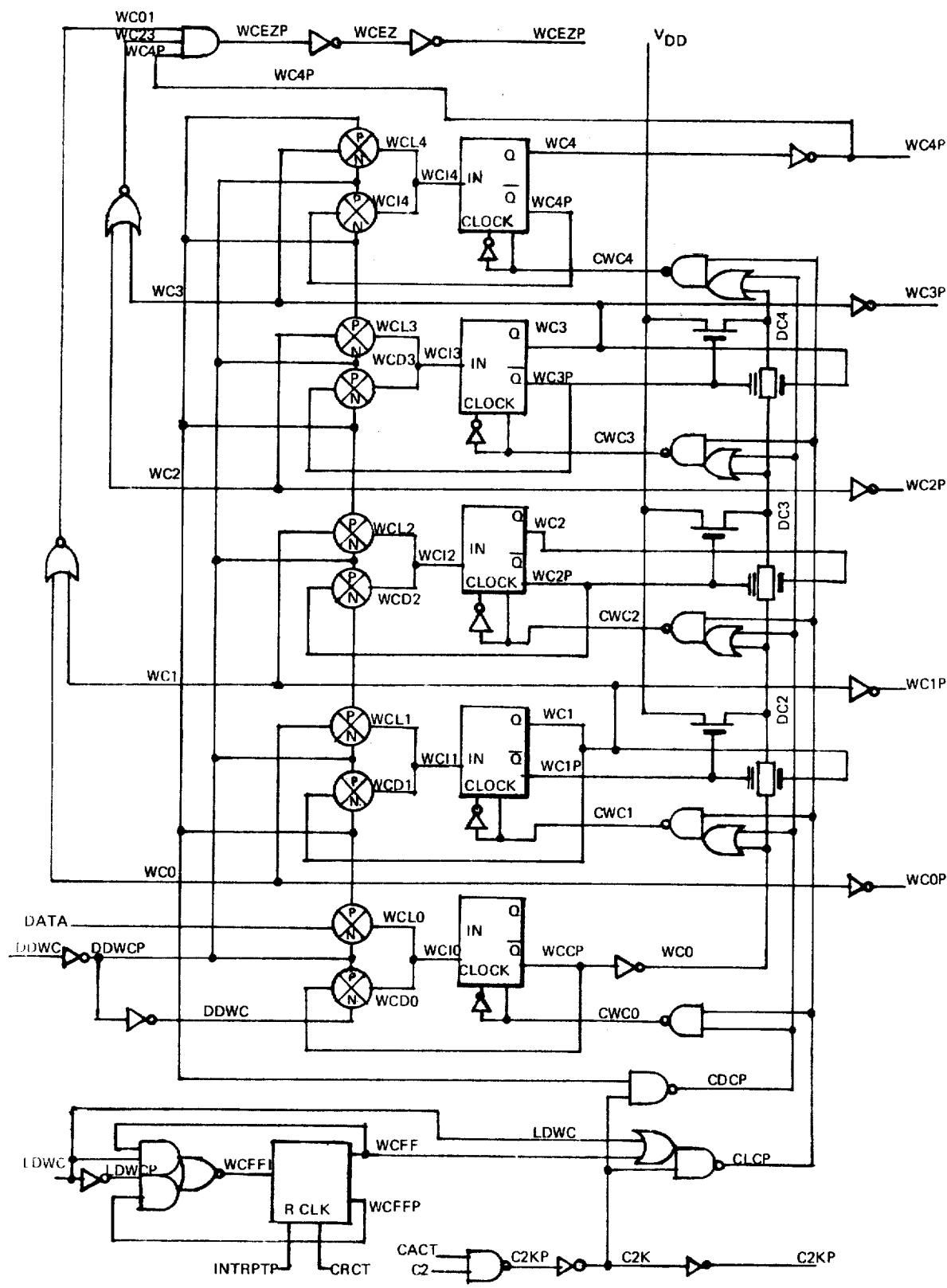
FIG. 17 is a detailed logic schematic of the word counter portion of the invention.

FIG. 17 is a detailed logic schematic of the conventional digital logic elements including flip-flops, logic gates, inverters and transistor switches that are used to accomplish the functions of the word counter 62.

Figure 18:
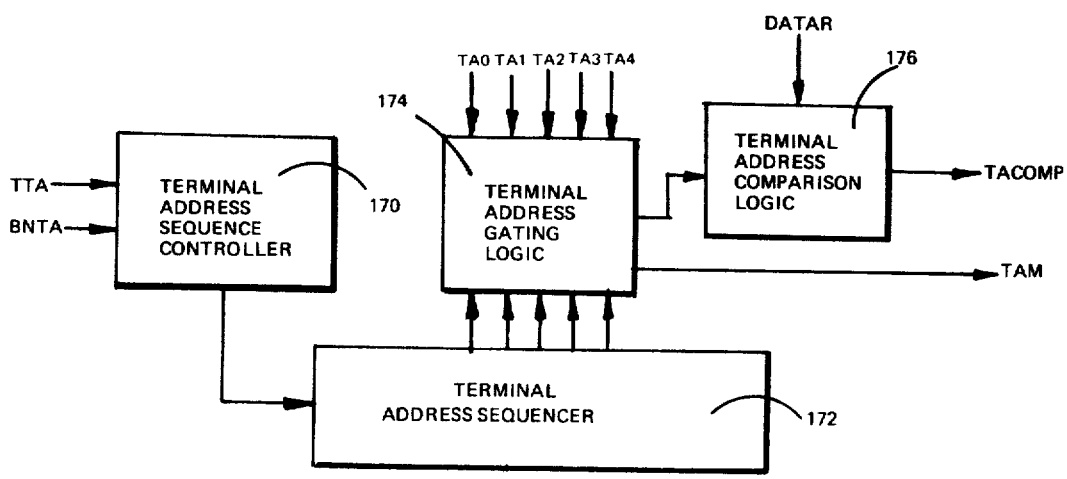
FIG. 18 is a simplified block diagram of the terminal address logic portion of the invention.

Referring now to FIG. 18, there is shown therein, a more detailed block diagram of the terminal address circuit 64 which comprises a terminal address sequence controller 170, a terminal address sequencer 172, terminal address gating logic 174, and terminal address comparison logic 176. Five terminal address signals TA0 through TA4, at either ground or a logic one potential, are applied to the corresponding terminals of micro-programmable data chip 40 (which are externally accessible) to permit identification of up to 32 different data terminals. The terminal address is typically strapped in a remote terminal mode of operation.

In the receive mode the terminal address logic compares the states of the five terminal address signals with the decoded serial Manchester data (DATAR). The comparison is accomplished one bit at a time whenever a BNTA instruction is executed. If the address of the incoming signal is equal to the strapped, permanent address of the terminal, the program continues. If they are not equal, the terminal address logic circuit sends a signal to the branch and halt logic circuit 54 causing the micro-programmable data terminal to branch to an alternative subroutine.

In the transmit mode terminal address logic 64 generates bit patterns for transmitting the terminal address by means of the transmitter control logic circuit 68 discussed below. Transmission of the terminal address is initiated by the transmit terminal address instruction TTA. The instruction TTA toggles the terminal address flip-flop in terminal address sequence controller 170. Each time the terminal address flip-flop is set, one bit of the terminal address is transmitted until all five bits of the terminal address are transmitted.

Figure 19:
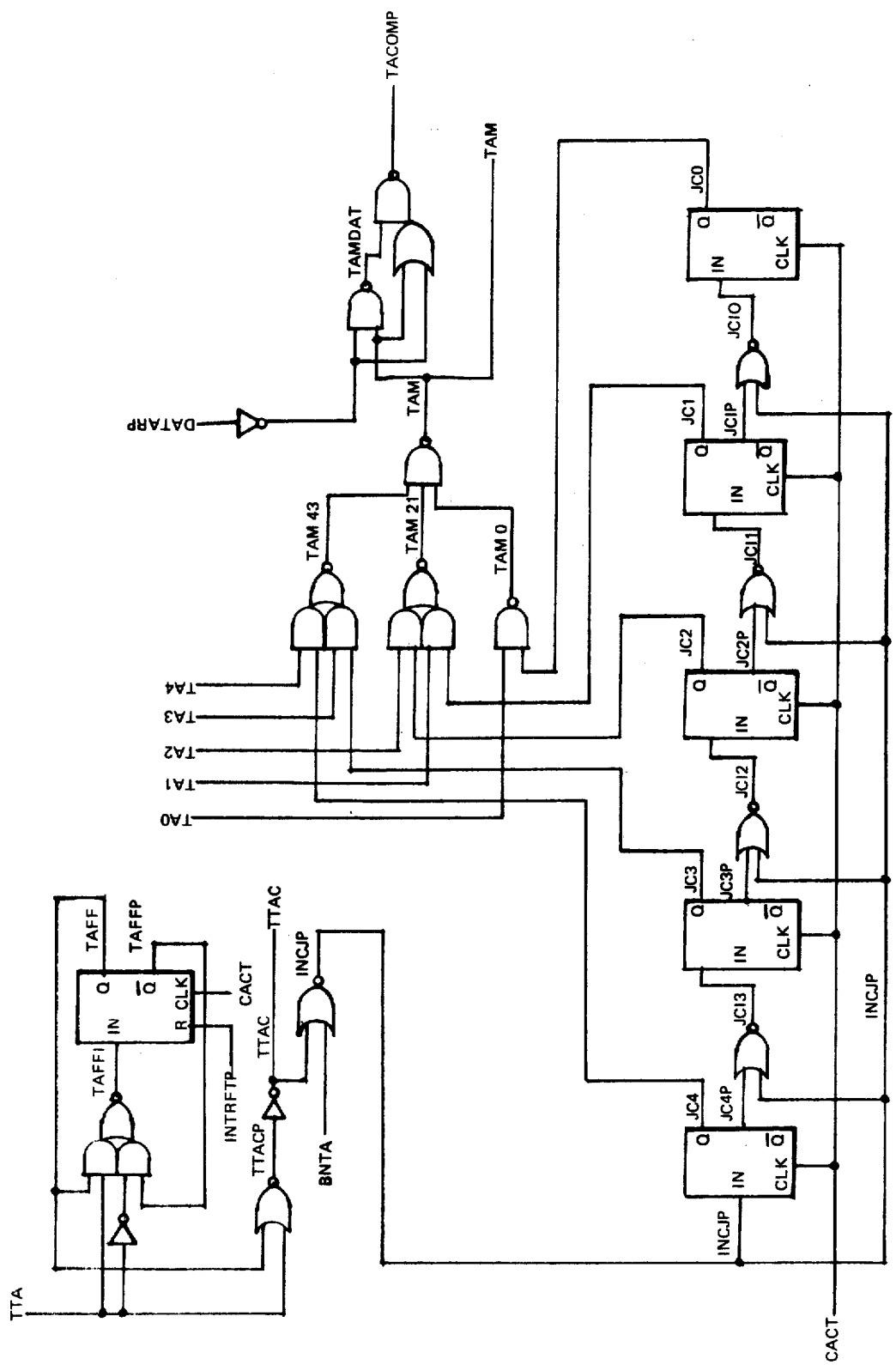
FIG. 19 is a detailed logic schematic of the terminal address logic portion of the invention.

FIG. 19 is a detailed logic schematic of the conventional digital logic elements including flip-flops, logic gates and inverters that are used to accomplish the function of the terminal address logic circuit 64.

Figure 20A:
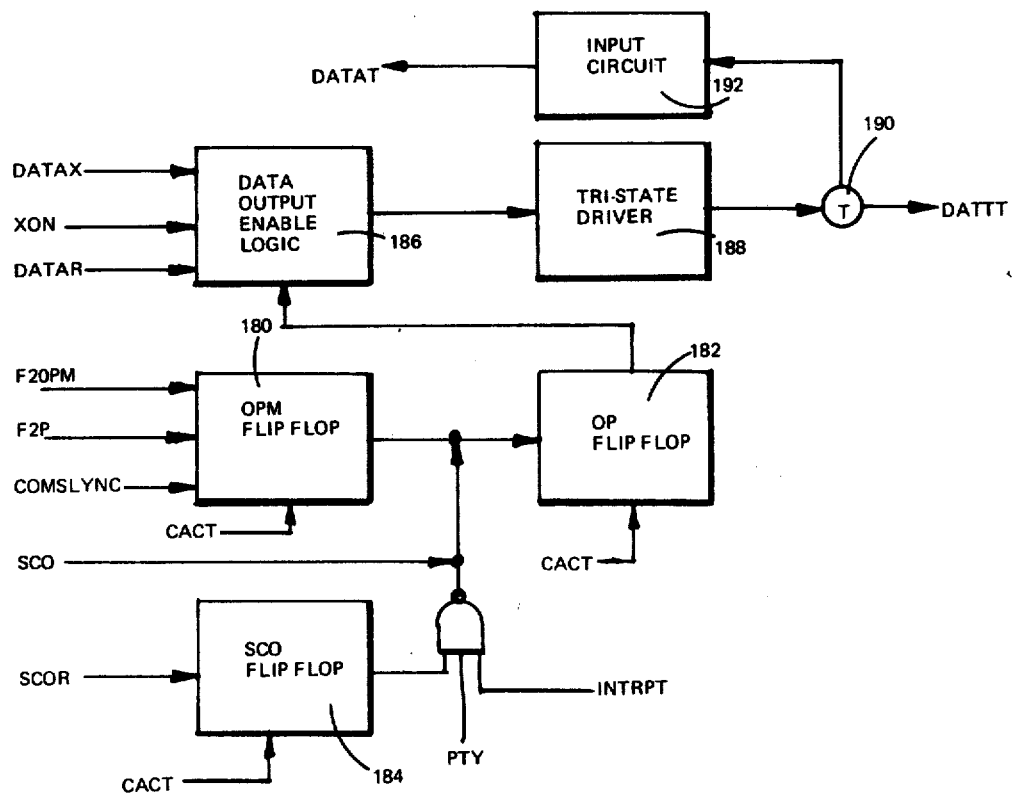
FIGS. 20a and 20b, is a simplified block diagram of the serial data control circuit of the invention.

Referring now to FIG. 20a there is shown therein a more detailed block diagram of the serial data control circuit 66 which comprises OPM flip-flop 180 and OP flip-flop 182 and SCO flip-flop 184, a data output enable logic circuit 186, a tri-state driver 188, a signal Tee 190, and an input circuit 192.

Serial data control circuit 66 controls the tri-state output circuit which drives the bi-directional data line DATTT. Data is transmitted to the subsystem when the output flip-flop OP is set. When OP is reset, the output tri-state driver 188 is disabled. The state of the OP flip-flop 182 is controlled by instructions, interrupt signals, and by the state of OPM flip-flop 180. If the OPM flip-flop is in a reset state, OP flip-flop 182 is set by an SCO instruction and is reset by an SCOR instruction. The OP flip-flop cannot be set if the OPM flip-flop is in a set state but if the OP flop-flop is set before the OPM flip-flop is set, it will stay set until normal OP reset conditions occur. OP flop-flop 182 is reset by any interrupt signal and by a parity instruction PTY.

The OPM flip-flop is controlled by the F20PM instruction. The OPM flip-flop is set by the F20PM instruction when the F2 flip-flop is in a set state and is reset when F2 is in a reset state. It will be recalled that the F2 flip-flop is in the branch and halt circuit 54. The OPM flip-flop is always reset by a command status interrupt signal. When OPM is set, it prevents the OP flip-flop 182 from being set but it does not reset the OP flip-flop nor does it prevent resetting of the OP flip-flop.

Figure 20B:
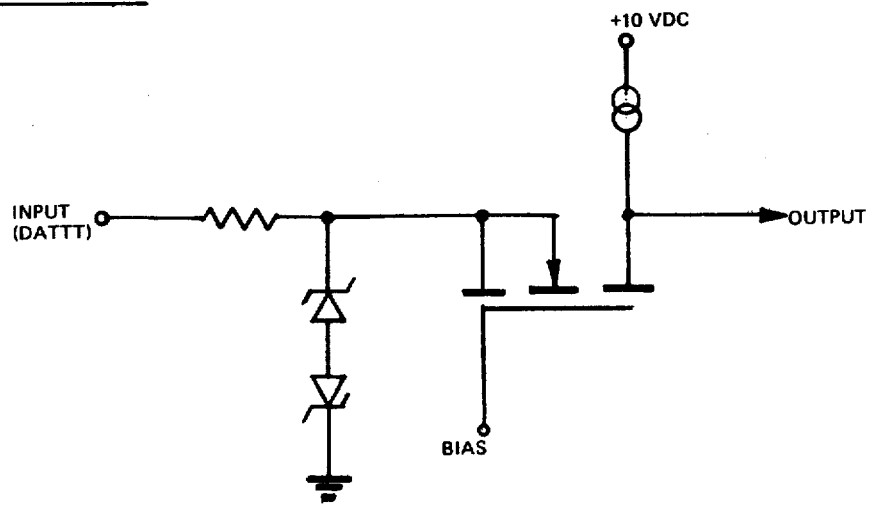

In the transmit mode, the signal XON disables the output circuit. Data transferred to the micro-programmable data terminal from the subsystem is routed by means of signal Tee 190 to an input circuit 192 which comprises a basic TTL compatible input circuit as shown in FIG. 20b.

Figure 21:
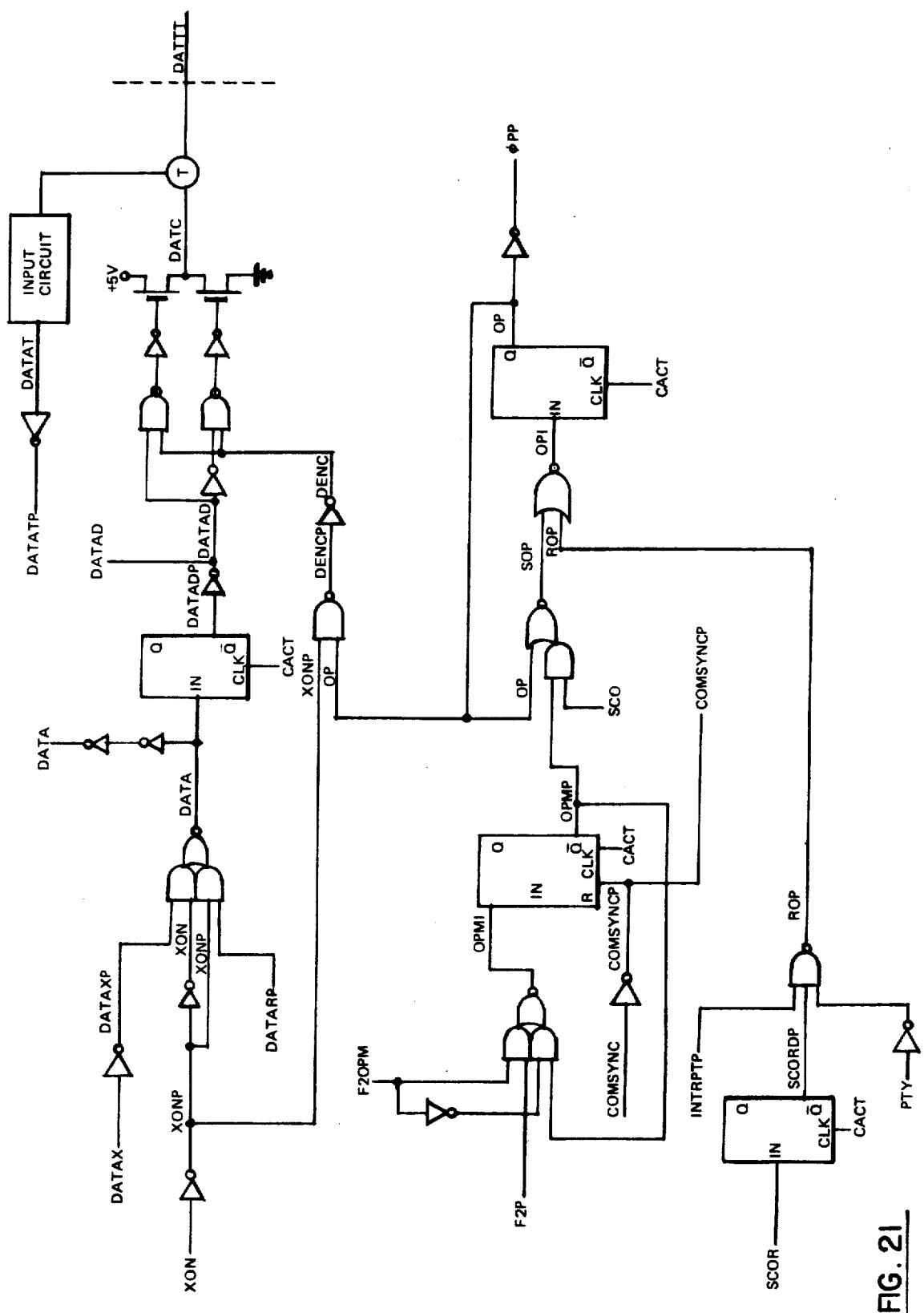
FIG. 21 is a detailed logic schematic of the serial data control circuit of the invention.

FIG. 21 is a detailed logic schematic of the conventional digital logic elements including flip-flops, logic gates, and inverters that are used to accomplish the functions of the serial data control circuit 66.

Figure 22:
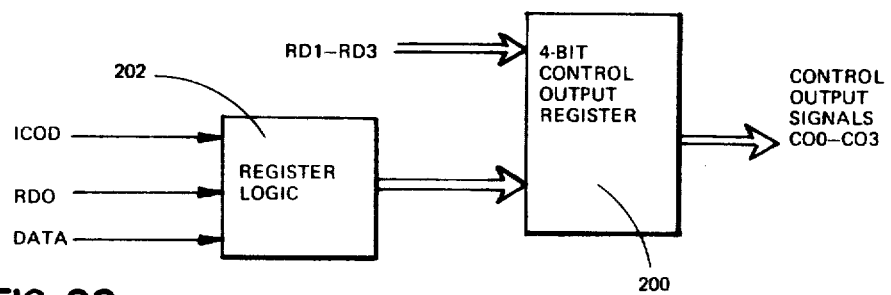
FIG. 22 is a simplified block diagram of the control output logic portion of the invention.

Referring now to FIG. 22, there is shown therein a more detailed block diagram of the control output logic circuit 58 which comprises a 4-bit control output register 200 and register logic circuit 202.

Four control output signals (CO) are brought off the micro-programmable data terminal chip to provide the subsystem to which the MPDT is connected with a 4-bit control word. This 4-bit control word is used to transmit the status or state of the micro-programmable data terminal chip to the subsystem and it may also be used to control external functions using data stored in the read-only memory 42. Status information transmitted to the subsystem by use of the control output logic circuit 58 may include, by way of example, an end of receive command, a begin receive command, an end transmit data word, and the like. When instructions THI, TLO, PTY, SCO, SCOL, and TME are decoded, the control output register 200 is loaded with the least significant position word LSPW from the instruction read-only memory 42. When the ICOD instruction is decoded and the data is a logic ONE, the least significant bit (LSB) of the control ouput word is inverted. This instruction is used to simplify instructions involving branch on data program.

Figure 23:
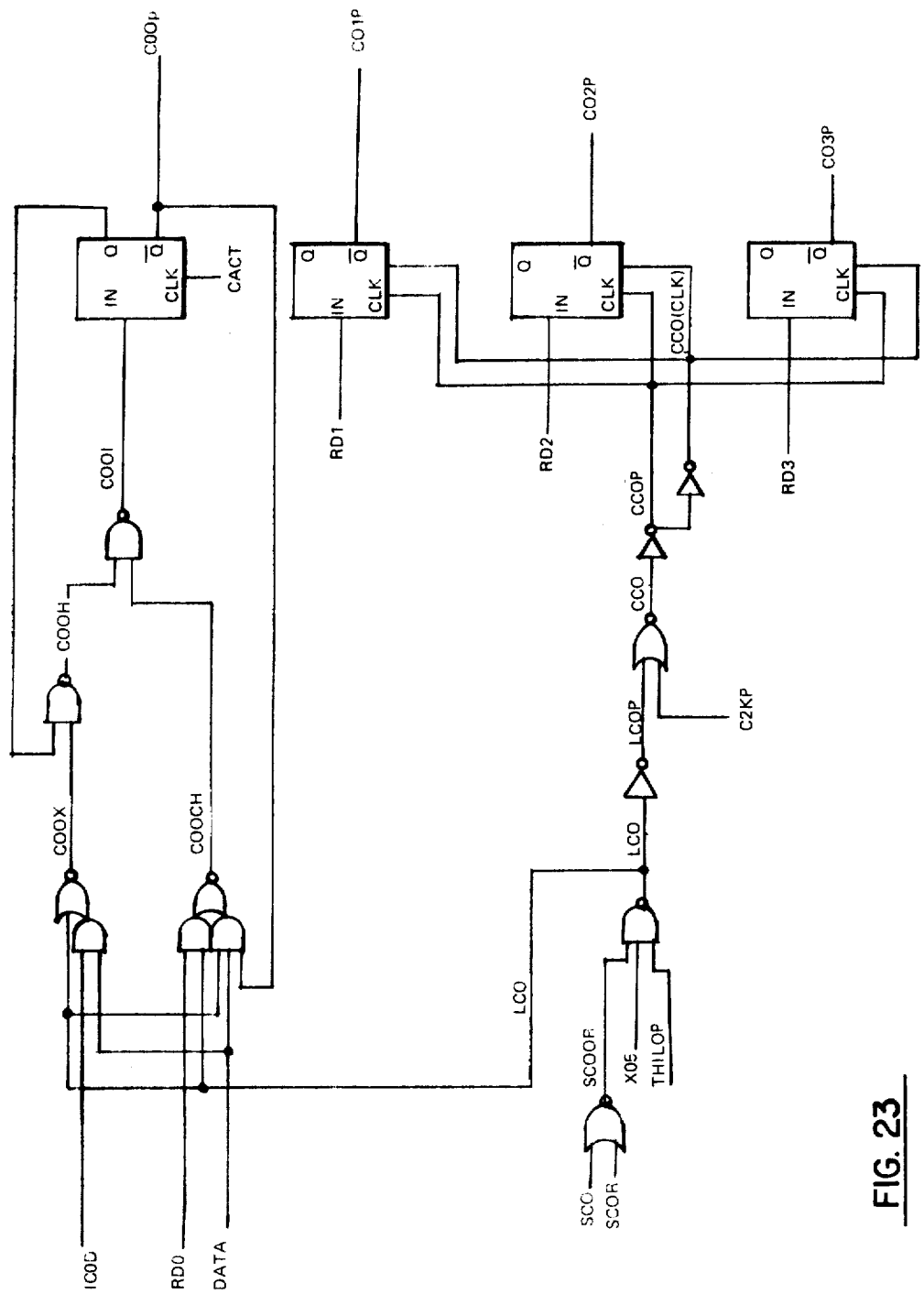
FIG. 23 is a detailed logic schematic of the control output logic portion of the invention.

FIG. 23 is a detailed logic schematic of the conventional digital logic elements including flip-flops, logic gates, and inverters that are used to accomplish functions for the control output logic circuit 58.

Figure 24:
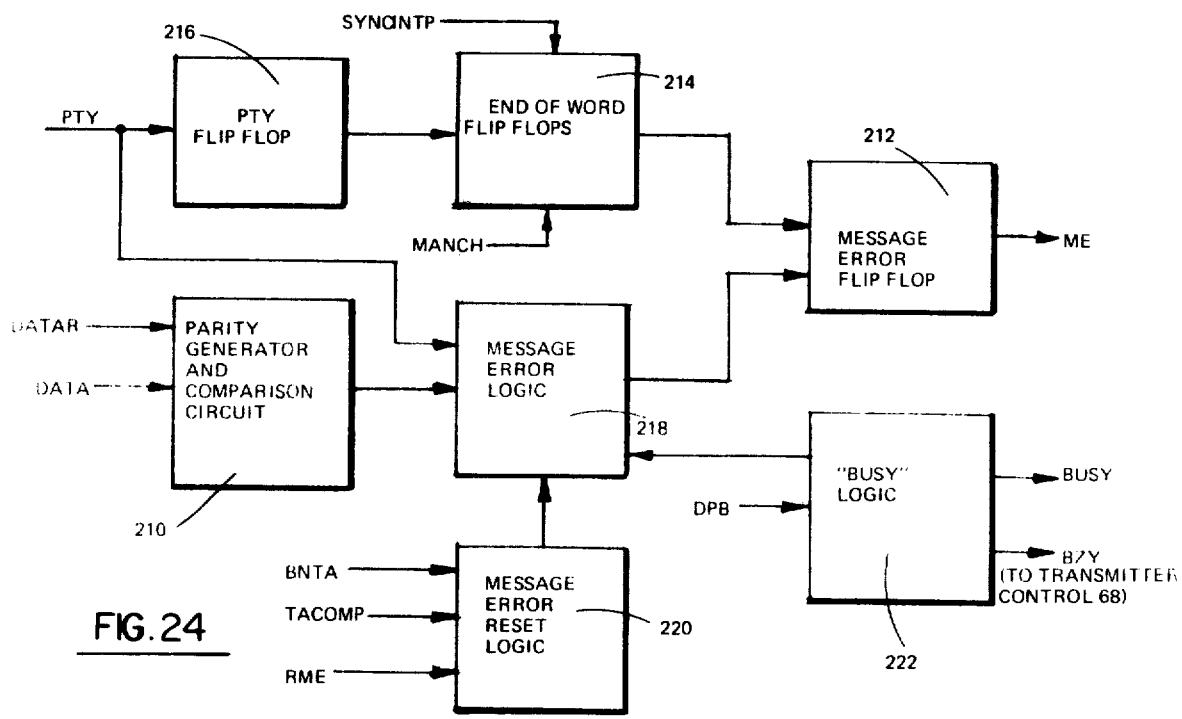
FIG. 24 is a simplified block diagram of the parity and message error logic portion of the invention.

Referring now to FIG. 24, there is shown therein a more detailed block diagram of the parity and message error logic circuits 60 which comprise a parity generator and comparison circuit 210, a message error flip-flop 212, end of word flip-flops 214, parity flip-flop 216, message error logic 218, message error reset logic 220 and busy logic 222.

In the receive mode, a parity signal is generated locally and is based upon the input data signal. The locally generated parity signal is compared with the parity bit of the received word upon execution of the parity instruction PTY. If the parity bits are not equal, the message error flip-flop 212 is set. In the transmit mode the parity signal is generated and a parity bit is inserted into the transmitted data word upon execution of the PTY instruction.

The end of word flip-flops are set by the parity instruction PTY. The end of word flip-flops are set 3-bit times after the parity instruction occurs. This delay disables the message error flip-flop for 3 bit times so that a data synchronizing signal will not inadvertently set the message error flip-flop. All interrupt signals reset the end of word flip-flops.

The message error flip-flop is set only in the receive mode when not in the halt mode and when any of the following conditions occur:

1. The locally generated parity bit is not equal to the received bit at the occurrence of the PTY instruction.
2. Data is received and the end of word flip-flop is set.
3. A set message error instruction SME is executed.
4. An invalid Manchester signal occurs.

If synchronizing signals do not result in the generation of interrupt signals, that is considered an invalid Manchester signal.

The message error flip-flop is reset upon execution of the reset message error instruction RME and upon a sequential transition from a branch-on-not-terminal-address instruction BNTA to any other instruction. This latter condition implies that the terminal address equals the received terminal address.

The busy signal BUSY generated in the busy logic circuit 222 indicates the detection of data on the bus. The busy line will be high if there has been data on the bus in the last two bit-times, otherwise the signal will be low.

Figure 25:
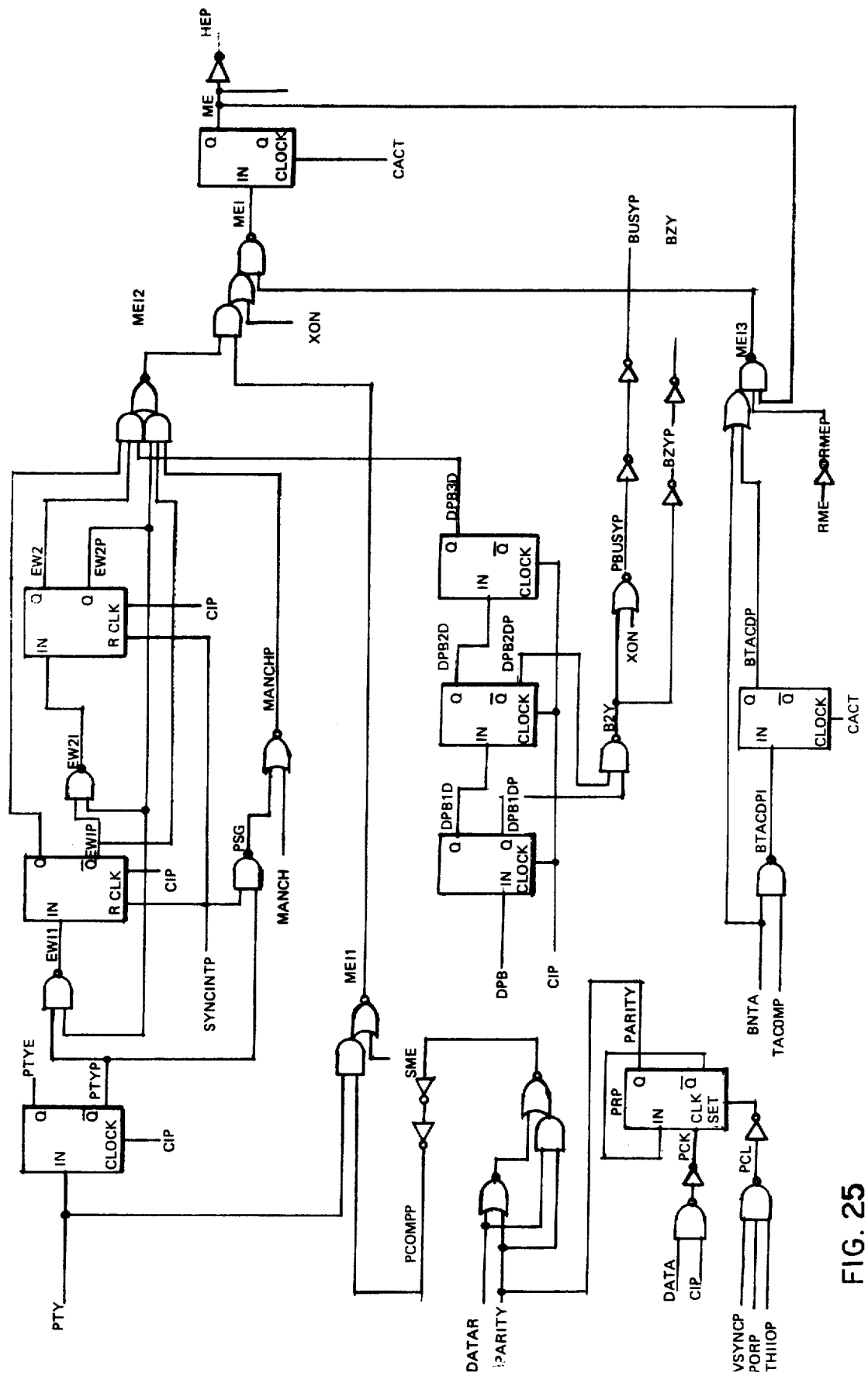
FIG. 25 is a detailed logic schematic of the parity and message error logic portion of the invention.

FIG. 25 is a detailed logic schematic of the conventional digital logic element including flip-flops, logic gates, and inverters that are used to accomplish the functions of the parity and message error logic circuits 60.

Figure 26:
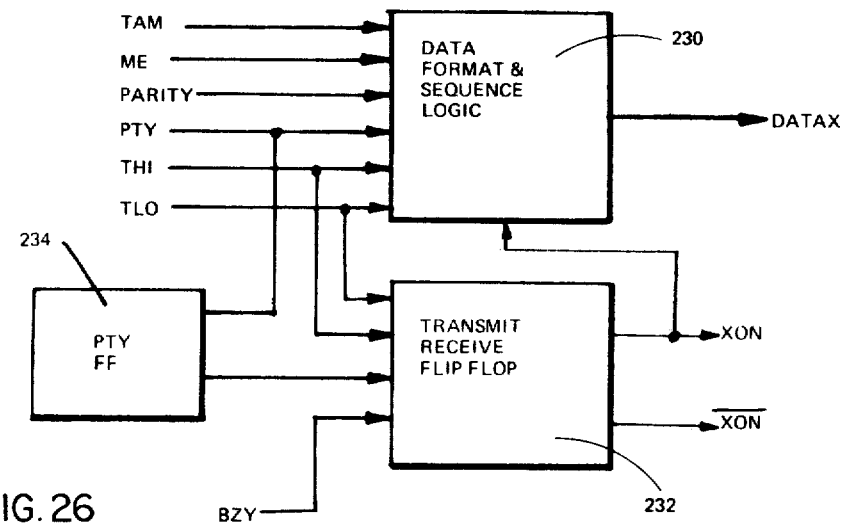
FIG. 26 is a simplified block diagram of the transmitter control portion of the invention.

Referring now to FIG. 26, there is shown therein a more detailed block diagram of the transmitter control logic circuit 68 which comprises a data format and sequence logic circuit 230, a transmit receive flip-flop 232 and a parity flip-flop 234. Transmitter control logic circuit 68 formats and sequences the data to be encoded and transmitted onto the time-division miltiplex data bus, synchronizing pedestals, terminal addresses, message errors, data and parity signals are all sequenced through the transmitter control logic circuit 68.

The transmit/receive flip-flop 232 is set (transmit or T mode) by the THI and TLO instructions. It is reset (receive or R mode) by the PTY instruction or by any interrupt signal. In the T mode data is sequence one bit at a time through the data format sequence logic 230 and then applied to the Manchester encoder 70 for transmission. A change to the T mode is not permitted if the bus is busy or has been busy in the last two bit times (i.e. if the busy flip-flop is set; see FIG. 24). If a change to the T mode is attempted while the bus is busy the system clock signal CACT is halted by the branch and halt logic circuit 54 until the busy line returns to a logic low state.

The busy line does not block transmission of subsequent words in a sequence, where each word begins with a synchronizing pedestal and ends with a parity instruction provided there is no delay between the PTY instruction terminating one word and the synchronization signal initiating the next word. The state of the transmit/receive flip-flop 232 is indicated by two complementary signals XON and $\overline{\text{XON}}$, each of which is brought off the chip and made externally accessible.

Figure 27:
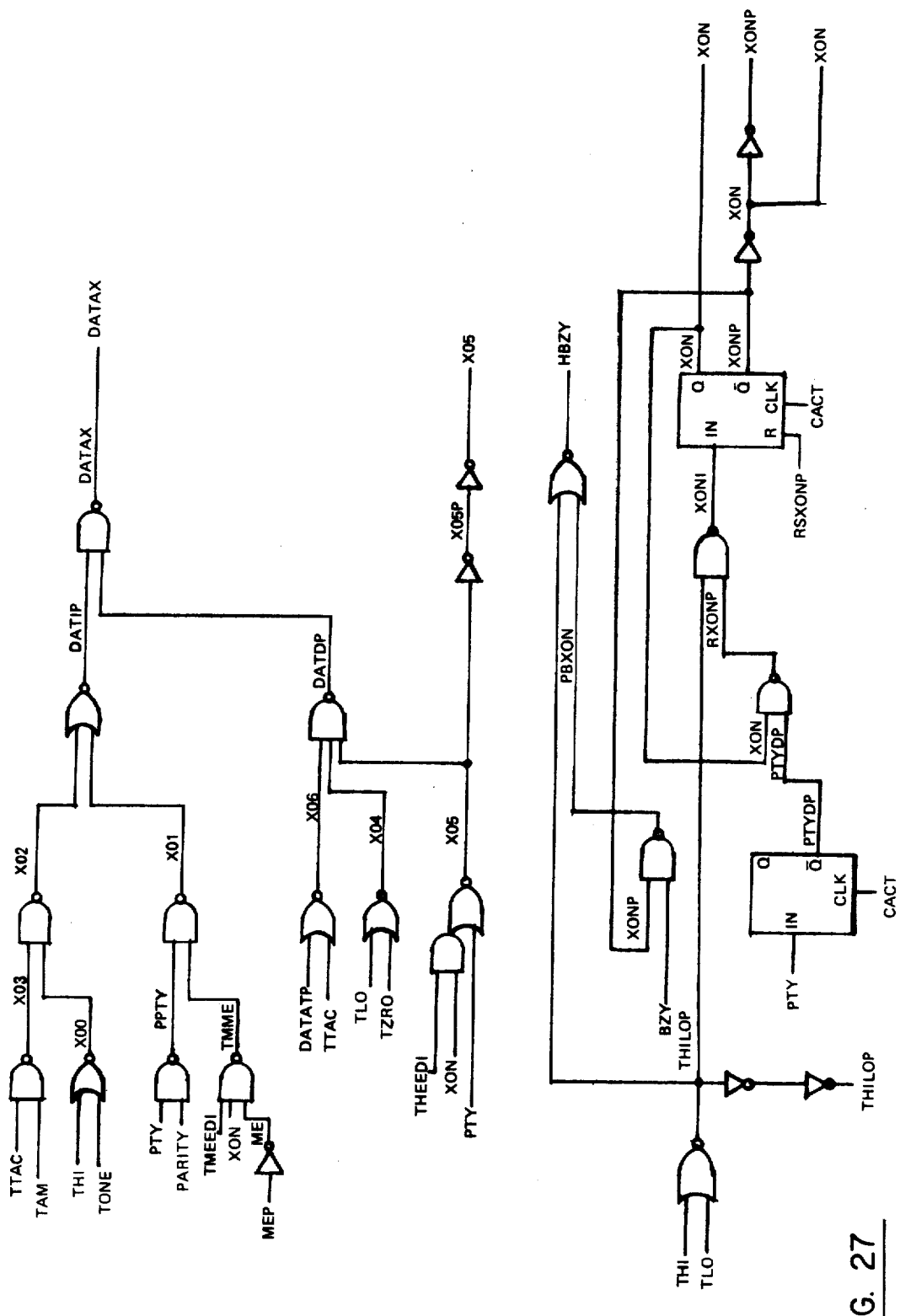
FIG. 27 is a detailed logic schematic of the transmitter control portion of the invention.

FIG. 27 is a detailed logic schematic of the conventional digital logic elements including flip-flops, logic gates, and inverters that are used to accomplish the functions of the transmitter control logic circuit 68.

Figure 28:
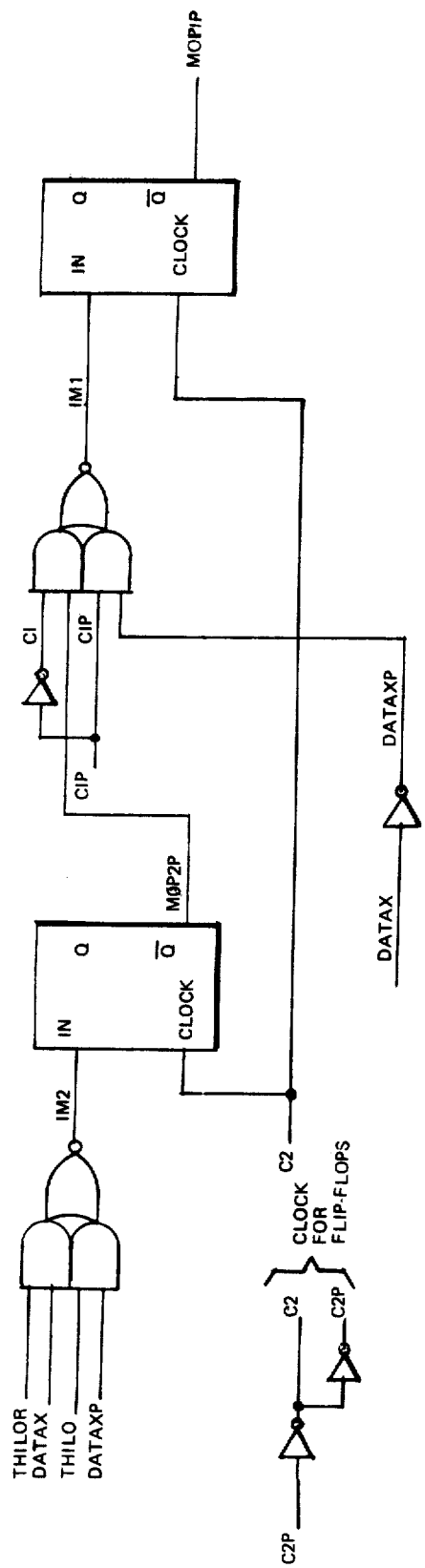
FIG. 28 is a detailed logic schematic of a Manchester data format encoder portion of the invention.

FIG. 28 is a detailed logic schematic of the conventional digital logic elements including flip-flops, logic gates, and inverters that are used to accomplish the functions of the Manchester encoder 70. As indicated in FIG. 28, the Manchester encoder 70 employs two flip-flops and the 1 MHz and 2 MHz clock signals to convert the NRZ DATAX signal into a Manchester encoded format MOPI. Also utilized, is the signal THILO which is developed in the transmitter control logic circuit 68 from the instruction signals THI and TLO.

Figure 29A:
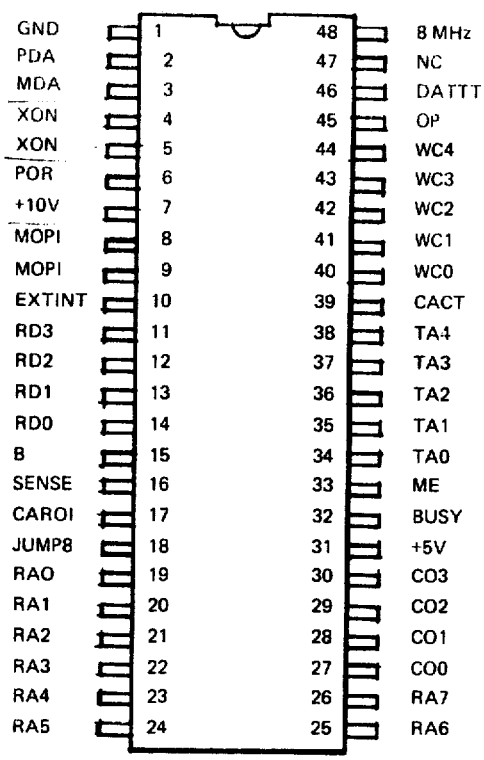
FIG. 29 comprising FIGS. 29a, 29b, 29c and 29d comprises a drawing of one embodiment of the invention and is used to describe pin assignments and chip geometry.
Figure 29B:
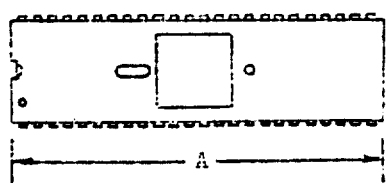
Figure 29C:
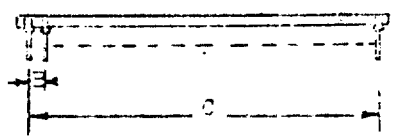
Figure 29D:

The pin assignments and mechanical characteristics of a preferred embodiment of a micro-programmable data terminal are indicated in FIGS. 29a, 29b, 29c and 29d. As shown in FIG. 29a, the micro-programmable data terminal is embodied in a 48-pin package. Table 1 indicates the function of the signal on each of the 48 pins. In the aforesaid preferred embodiment of the micro-programmable data terminal, the dimensions represented by symbols A, B, C, D and E of FIGS. 29b, 29c and 29d are: A = 2.4", B = 0.1", C = 2.3", D = 0.625" and E = 0.7".

TABLE I

| Pin | | |
|---|---|---|
| Pin 1 - GND | Circuit ground | |
| Pin 2 - PDA | Positive detected TTL level data from T/R interface to MPDT, (Manchester encoded). | |
| Pin 3 - MDA | Minus detected TTL data from T/R interface to MPDT. (Manchester encoded). | |
| Pin 4 - $\overline{\text{XON}}$ | Transmitter off. Indicated by a logic high. | |
| Pin 5 - XON | Transmitter on. Indicated by a logic high. | |
| Pin 6 - $\overline{\text{POR}}$ | Power on reset. Active when a logic low. | |
| Pin 7 - ±10V | Circuit operating voltage. | |
| Pin 8 - $\overline{\text{MOPI}}$ | Complemented Manchester encoded data from MPDT to T/R interface. | |
| Pin 9 - MOPI | Manchester encoded data from MPDT to T/R interface. | |
| Pin 10 - EXTINT | External interrupt. Active when a logic high. | |
| Pin 11 - RD3 | ROM data Bit 3 (MSB). | |
| Pin 12 - RD2 | ROM data Bit 2. | |
| Pin 13 - RD1 | ROM data Bit 1. | |
| Pin 14 - RO0 | ROM data Bit 0 (LSB). | |
| Pin 15 - B | Mode indicator from MPDT to subsystem. Receive mode is logic low; transmit mode is logic high. | |
| Pin 16 - SENSE | A logic high on this input causes branch if branch on sense (BRS) instruction is executed. Sense is most frequently used when the MPDT is functioning in the bus controller mode. | |
| Pin 17 - CAROI | Carry input. Used in conjunction with JUMP 8 for program counter and ROM expansion. | |
| Pin 18 - JUMP 8 | Used to reset chip program counter extension. | |
| Pin 19 - RA0 | ROM address 0 (LSB) from ROM program counter and address register. | |
| Pin 20 - RA1 | ROM address 1. | |
| Pin 21 - RA2 | ROM address 2. | |
| Pin 22 - RA3 | ROM address 3. | |
| Pin 23 - RA4 | ROM address 4. | |
| Pin 24 - RA5 | ROM address 5. | |
| Pin 25 - RA6 | ROM address 6. | |
| Pin 26 - RA7 | ROM address 7 (MSB). | |
| Pin 27 - CO0 | Control logic output 0 (LSB). Control outputs indicate status during various phases of receiving or transmitting data. They can also control external registers, page ROM, or perform any other external function for which ROM control is desired. | |
| Pin 28 - CO1 | Control logic output 1. | |
| Pin 29 - CO2 | Control logic output 2. | |
| Pin 30 - CO3 | Control logic output 3 (MSB). | |
| Pin 31 - +5V | Used for TTL compatible output circuits | |
| Pin 32 - BUSY | Logic high indicates data bus is busy. Transmit or receive mode. | |
| Pin 33 - ME | Message error indicated by a logic high. | |
| Pin 34 - TA0 | Terminal address 0 (LSB). Usually hard wired for logic high or low in remote terminal mode. | |

TABLE I-continued

| Pin 35 - TA1 | Terminal address 1. |
|---|---|
| Pin 36 - TA2 | Terminal address 2. |
| Pin 37 - TA3 | Terminal address 3. |
| Pin 38 - TA4 | Terminal address 4 (MSB). |
| Pin 39 - CACT | Output clock; gated clock synchronized to receive data. |
| Pin 40 - WC0 | Word count 0 (LSB) output from word counter which is set to number of words to be received or transmitted. |
| Pin 41 - WC1 | Word count 1. |
| Pin 42 - WC2 | Word count 2. |
| Pin 43 - WC3 | Word count 3. |
| Pin 44 - WC4 | Word count 4 (MSB) |
| Pin 45 - OP | Output; controls output of received data thru I/O port DATTT. Data is output when OP is high. |
| Pin 46 - DATTT | Tri-state I/O bus between MPDT and subsystem. |
| Pin 47 - NC | No connection. |
| Pin 48 - 8 MHZ | External 8 MHz clock used by circuit for proper data sync at 1 MHz data rate. |

The micro-programmable data terminal is programmed on a one bit per instruction basis. For example, the following sequence of instructions will transmit a 4-bit data word.

TABLE II

| | |
|---|---|
| TLO $3_{16}$ | Sets transmit (T) mode, transmits a data sync, and sets the CO's to $3_{16}$ (0011), which notifies the subsystem of the impending requirement for it to input data. |
| TZRO | |
| THI $3_{16}$ | |
| FLG F | Inputs and transmits four bits (one for each instruction; these are No-Ops, but any instruction could be used which does not interfere with the data operation). For a longer data field more instructions are used. |
| FLG F | |
| FLG F | |
| FLG F | |
| PTY $2_{16}$ | Transmits an odd parity bit; sets the CO's to $2_{16}$ (0010), which notifies the subsystem that data entry from it is complete. |
| HLT | Halts; awaits an interrupt to begin action. |

Instructions are composed of two 4-bit words and are read out of the ROM as follows: on the first half cycle of the clock signal CACT the most significant positioned word MSPW is clocked into a 4-bit instruction holding register. A 4-bit least significant position word LSPW is next clocked into the instruction decoding logic and on the second half of the clock cycle, the two words MSPW and LSPW are decoded to form the instruction.

There are two types of instruction signals, namely sequence instructions and branch instructions. The sequence instructions are summarized in Table III and described more fully below.

When a sequence instruction is executed, the program counter sequences to the next location. On the other hand, branch instructions, if a branch occurs, cause the program counter to jump to a location out of sequence.

Table III

| Instructions | | |
|---|---|---|
| MSPW (IR) | LSPW (RD) | Mnemonic |
| Sequence Instruction | | |
| 0 0 0 0 | 0 0 0 0 | HLT |
| | 0 0 0 1 | TTA |
| | 0 0 1 0 | TZRO |
| | 0 0 1 1 | TONE |
| | 0 1 0 0 | HB |
| | 0 1 0 1 | HBP |
| | 0 1 1 0 | RB |
| | 0 1 1 1 | HNB |
| | 1 0 0 0 | RME |
| | 1 0 0 1 | SME |
| | 1 0 1 0 | LDWC |
| | 1 0 1 1 | DDWC |
| | 1 1 0 0 | F20PM |
| | 1 1 0 1 | DDI |
| | 1 1 1 0 | ICOD |

Table III-continued

| MSPW (IR) | Instructions LSPW (RD) | Mnemonic |
|---|---|---|
| | 1 1 1 1 | HME |
| | Absolute Branch Instructions | |
| 0 0 0 1 | ($A_7 A_6 A_5 A_4$) | BR |
| 0 0 1 0 | | BRS |
| 0 0 1 1 | | BRCNZ |
| 0 1 0 0 | | BRF1 |
| 0 1 0 1 | | BRF2 |
| | Relative Branch Instructions | |
| 0 1 1 0 | ($A_7 A_6 A_5 A_4$) | BRD |
| 0 1 1 1 | | BRNB |
| 1 0 0 0 | | BNTA |
| | Sequence Instructions With Control Word | |
| 1 0 0 1 | CO's | PTY |
| 1 0 1 0 | | THI |
| 1 0 1 1 | ⇕ | TCO |
| 1 1 0 0 | | SCO |
| 1 1 0 1 | ( CO's ) | SCOR |
| 1 1 1 0 | CO's/flag control | TME/EDI* |
| 1 1 1 1 | flag control | FLG |

*TME if in transmit mode, EDI in receive mode

In the following paragraphs, the various sequence instructions including their mnemonic names and a hexadecimal listing of their most significant position word and least significant position word and the function of the instruction are discussed.

The halt instruction, HLT (00) stops transmission, reception, input/output and instruction execution. It also stops the system clock signal CACT and resets the transmit receive flip-flop. Recovery from the halt instruction is by an interrupt signal. The halt instruction is used in both the transmit and receive modes.

The transmit terminal address instruction TTA (01) is used in only the transmit mode. It starts transmission of the terminal address which continues until another transmit terminal address instruction is executed. This instruction toggles the terminal address flip-flop. When the terminal address flip-flop is set bit J ($0 \leq J \leq 4$) of the terminal address is transmitted and J is incremented by one. J is reset to zero by the combination of a TA flip-flop reset and any instruction other than transmit terminal address or branch-on-not-terminal-address, the latter being a branch instruction. The J = 0 bit is the most significant bit of the terminal address.

Transmit a ZERO instruction TZRO (02) is effective in only the transmit mode.

Transmit a ONE instruction TONE (03) is also effective in only the transmit mode.

The hold bit instruction HB (04) stores the received or transmitted bit in the B flip-flop.

The hold bit past instruction HBP (05) stores the preceding received or transmitted bit in the B flip-flop.

The reset B flip-flop instruction RB (06) is effective in both the transmit and receive modes to reset the B flip-flop. The halt-if-not-B instruction HNB (07) is effective in both transmit and receive modes to generate a halt condition if the B flip-flop is in a logic ZERO state.

The reset message error instruction RME (08) is effective in either the transmit or receive mode to reset the message error flip-flop.

The set message error instruction SME (09) is effective in only the receive mode to set the message error flip-flop.

The load data word counter instruction LDWC (A) is used to toggle the word counter flip-flop. If the word counter flip-flop is set, this instruction shifts the word counter and loads the current data bit into the low order bit position of the word counter. The high order bit of the word counter is thereby lost. This instruction is used in both the transmit and receive modes.

The decrement data word counter instruction DDWC (OB) decrements the word counter by one in both the transmit and receive mode.

The transfer-of-the-state-of-F2-flip-flop-to-the-OPM-flip-flop instruction is designated F2 OPM (OC) and is used for that purpose in both the transmit and receive mode.

The disable data interrupt instruction DDI (OD) precludes the generation of a data interrupt signal if the causing data synchronization signal ends later than one bit time preceding this instruction. This instruction is used by only the receive mode.

The invert control output data instruction ICOD (OE) inverts the control output line COO if the data is logic ONE It is used in both the transmit and receive mode.

The halt message error instruction HME (OF) halts the micro-programmable data terminal operation if the message error flip-flop is in a set condition. It is used in the transmit and receive mode.

The parity instruction PTY (9X) is used in the transmit mode to transmit a parity bit based upon the data transmitted since the previous synchronization signal. In the receive mode the parity instruction checks the parity of the incoming data word based on all the data received since the last synchronization interrupt signal. If no parity match exists, the instruction results in the setting of the message error flip-flop otherwise the message error flip-flop does not change. It also resets the OP flip-flop. The least significant position word X of this instruction is loaded into the control output register.

The transmit high instruction THI (AX) transmits a 1-bit time high signal and sets the transmit receive flip-flop. The least significant position word X is loaded into the control output register.

The transmit low instruction TLO (BX) transmits a 1-bit time low signal and sets the transmit receive flip-flop. The least significant position word X is loaded into the control output register. The sequence of instructions THI, TONE, TLO, sends a command or status synchronization signal onto the data bus. The sequence of instructions TLO, TZRO, THI, sends a data synchronization signal onto the data bus.

The set control output instruction SCO (CX) loads the least significant position word X into the control output register and sets the OP flip-flop effectively on the current bit time. This instruction is used in both transmit and receive mode.

The set control output reset instruction SCOR (DX) resets the OP flip-flop thereby disabling the DATTT output signal and loads the least significant position word X into the control output register. The OP flip-flop is reset effective on the following bit time. This instruction is used only in the receive mode.

The transmit message error instruction TME (EX) transmits the message error bit and loads the control output register with the least significant position word X. This instruction is used only in the transmit mode.

The enable data interrupt instruction EDI (EX) is used only in the receive mode. A data synchronization signal will result in the generation of an interrupt signal, if and only if, it begins no more than 2-bit times before the occurrence of this instruction, where data interrupt signals were previously disabled. The least significant position word X controls the F1 and F2 flags.

The flag instruction FLG (FX) is used in both transmit and receive modes in conjunction with a conditional halt operation and flags F1 and F2. The least significant position word X of this instruction controls the F1 and F2 flags. If word X is also F, in other words, if the flag instruction is FF, it is a NO-OP instruction.

When a branch instruction is decoded, the program counter is set to a new state out of sequence if the branch instruction is unconditional or if it is a conditional branch and the conditions for branching are satisfied. The new state depends upon whether the instruction is an absolute branch or a relative branch. Absolute branches result in the setting of the four high order bits of the program counter to X where X is the least significant position word of the branch instruction. The low order bits of the program counter are set to zero. The following are absolute branch instructions.

The branch unconditionally instruction BR (1X) is used in both the transmit and receive modes and always results in a branch to the location XO.

The branch on sense instruction BRS (2X) is also used in the transmit and receive modes and branches to the same location XO, but only if the sense line is high.

The branch-if-word-count-is-not-zero instruction BRCNZ (3X), the branch-if-flip-flop F1-is-set instruction BRF1 (4X) and the branch-if-flip-flop-F2-is-set instruction BRF2 (5X) are each used in both the transmit and receive mode to branch on those conditions.

Relative branches set the state of the program counter to location XY where X is the least significant position word of the branch instruction and Y is the value of the lower order bits of the program counter for the next instruction in sequence. The following are relative branch instructions.

The branch-on-data instruction BRD (6X) is used in the transmit and receive modes to branch if the data signal is a logic ONE.

The branch-if-B-flip-flop-is-reset instruction BRNB (7X) is used in both the transmit and receive mode to branch if the condition is met.

Branch-on-not-terminal-address instruction BNTA (8X) is used in only the receive mode. This instruction compares bit J ($0 \leq J \leq 4$) of the terminal address with the received bit. The branch occurrs if there is no match, but proceeds to the next instruction if a match does occur. A branch always occurs if the receive bit is an invalid Manchester signal. The instruction increments J by one and all other instructions except TTA resets J to zero.

Interrupt signals used in the micro-programmable data terminal will now be described. There are three types of interrupt signals that preset the program counter to a specified location. The program counter then counts sequentially from this location at a rate determined by the clock signal CACT until a branch or halt instruction is executed or until another interrupt signal occurs. The three types of interrupt signals include interrupt signals generated as a result of the command/status synchronization signal, interrupt signals generated as a result of a data synchronization signal and external interrupt signals.

When a command/status synchronization is detected, an unconditional interrupt signal is generated and sets the program counter to hexadecimal location 80. The interrupt signal also sets the transmit/receive flip-flop in transmitter control logic circuit 68 to the receive mode and it also resets the OP flip-flop in the serial data control logic circuit 66.

When a data synchronization signal is detected, the interrupt signal sets the program counter to hexadecimal location 40 if the data synchronization window is open. The data synchronization window is opened by an EDI instruction and closed by a DDI instruction or by an interrupt signal. The data interrupt signal resets the T/R, OP, and F1, flip-flops.

When the external interrupt signal is at a logic ONE state, the program counter is unconditionally set to hexadecimal location 00.

The micro-programmable data terminal operates in numerous modes as determined by the status of various flip-flops each of which has been discussed more fully in conjunction with FIGS. 5 through 28. However, for purposes of convenience the modes and flip-flops are discussed briefly herein before a description of the programming.

TRANSMIT RECEIVE MODE

The T/R flip-flop located in the transmitter control logic circuit 68 determines whether the micro-programmable data terminal is in the transmit mode (T) or the receive mode (R). The TR flip-flop is set to the T mode by instructions THI or TLO. It is reset to the R mode by PTY instruction or by any interrupt signal. In the T mode (given the absence of contrary instructions), one bit of data is serially transmitted for each cycle of the clock signal CACT. A change in the T mode is not permitted if the bus is busy or if it has been busy in the last two bit times (equivalent to busy flip-flop being set). If a change to the T mode is attempted with the busy flip-flop in a set condition, the system clock signal CACT is inhibited until the flip-flop is reset. A set busy flip-flop does not halt transmission of subsequent words in a sequence of words, each beginning with a synchronization pedestal and ending with a PTY instruction, provided there is no delay between each such word.

END OF WORD

The end of word flip-flop (EW) is set by the PTY instruction and is reset by any interrupt signal.

DATA BUSY

The busy flip-flop indicates whether there is any data on the bus, and whether there has been data on the bus in the last two bit times. If either of these conditions exits the flip-flop is set, otherwise it is reset.

FLAGS

The two flag flip-flops F1 and F2 are used to develop branch and halt conditions and thus provide program access memory capacity for two bits of internal control data. Absolute branches occur when these flip-flops are set and when either a BRF1 or a BRF2 instruction is executed. Flip-flops F1 and F2 are controlled by the FLG and EDI instructions. A conditional halt, set, reset, or no operation (NO-OP) is initiated in accordance with the contents of the least significant position wrod of the EDI or flag instruction.

OPM FLIP-FLOP

The OPM flip-flop is set by the instruction F2OPM if F2 is set. It is reset by F2 OPM if F2 is reset. It is always reset by a command/status interrupt signal. If OPM is set it prevents the OP flip-flop from being set but it does not reset the OP flip-flop or prevent the OP flip-flop from being reset.

OP FLIP-FLOP

If the OPM flip-flop is reset, the output flip-flop OP is set by the instruction SCO and is reset by the instruction SCOR. The OP flip-flop cannot be set if the OPM flip-flop is set but if OP is set before OPM is set then OP stays set until normal OP reset conditions occur. When OP is set, received data is available to the subsystem. When OP is reset the output is inhibited. The OP flip-flop is not effective in the transmit mode. It is reset by any interrupt signal or by a PTY instruction.

TERMINAL ADDRESS

The terminal address flip-flop TA is toggled by the instruction TTA and is effective only in the transmit mode. When TA is set, the terminal address is transmitted. It is reset by any interrupt signal.

WORD COUNT

The word count flip-flop WC is toggled by the LDWC instruction. When the word count flip-flop is set, the word count register is loaded. The word-count flip-flop is reset by any interrupt signal and is effective in either the transmit or receive mode.

MESSAGE ERROR

The message error flip-flop ME is set only in the receive mode when not in the halt mode and when:
1. The locally generated parity bit is not equal to the receive parity bit upon the execution of a PTY instruction.
2. Data is received and the end of word flip-flop EW is set.
3. A set message error instruction SME is executed.
4. An invalid Manchester signal occurs.

An invalid Manchester signal is considered to have occurred if a synchronizing signal occurs that does not produce an interrupt signal. The message error flip-flop ME is reset upon execution of a reset memory error instruction RME and on transition in sequence (that is no branch) from a BNTA instruction to any other instruction. This latter condition implies that the micro-programmable data terminal address is equal to the received address.

OPERATION

In the following discussion, illustrative sample programs for the remote terminal and bus controller modes of the micro-programmable data terminal of the invention will be described. The programs demonstrate how, in a preferred embodiment, the micro-programmable data terminal is programmed to accomodate the word and message formats in the previously referred to MIL-STD and the bus communications between bus controller and remote terminals.

In the following description instruction addresses are designated by hexadecimal characters on the flow charts of FIGS. 30 through 37 and on the program listing Tables V through XII. The following control output conventions are also used in the programs.

TABLE IV

| LSPW (Hexidecimal) | Action |
|---|---|
| 0 | End Receive Command (RT) |
| 1 | Begin Receive Command (RT) |
| 2 | End Transmit Data Word (RT) |
| 3 | Begin Transmit Data Word (RT) |
| 4 | End Transmit Status Word (RT) |
| 5 | Begin Transmit Status Word (RT) |
| 6 | "No Data" Exception (BC) |
| 7 | "No Status" Exception (BC) |
| 8 | End Receive Data Word (RT) |
| 9 | Begin Receive Data Word (RT) |
| 10 | Message Error Exception (BC) |
| 11 | Status Code or T/F Exception (BC) |
| 12 | Data Missing (BC) |
| 13 | "Terminal Status" Exception (BC) |
| 14 | Data Operation Complete (BC) |

Figure 30:
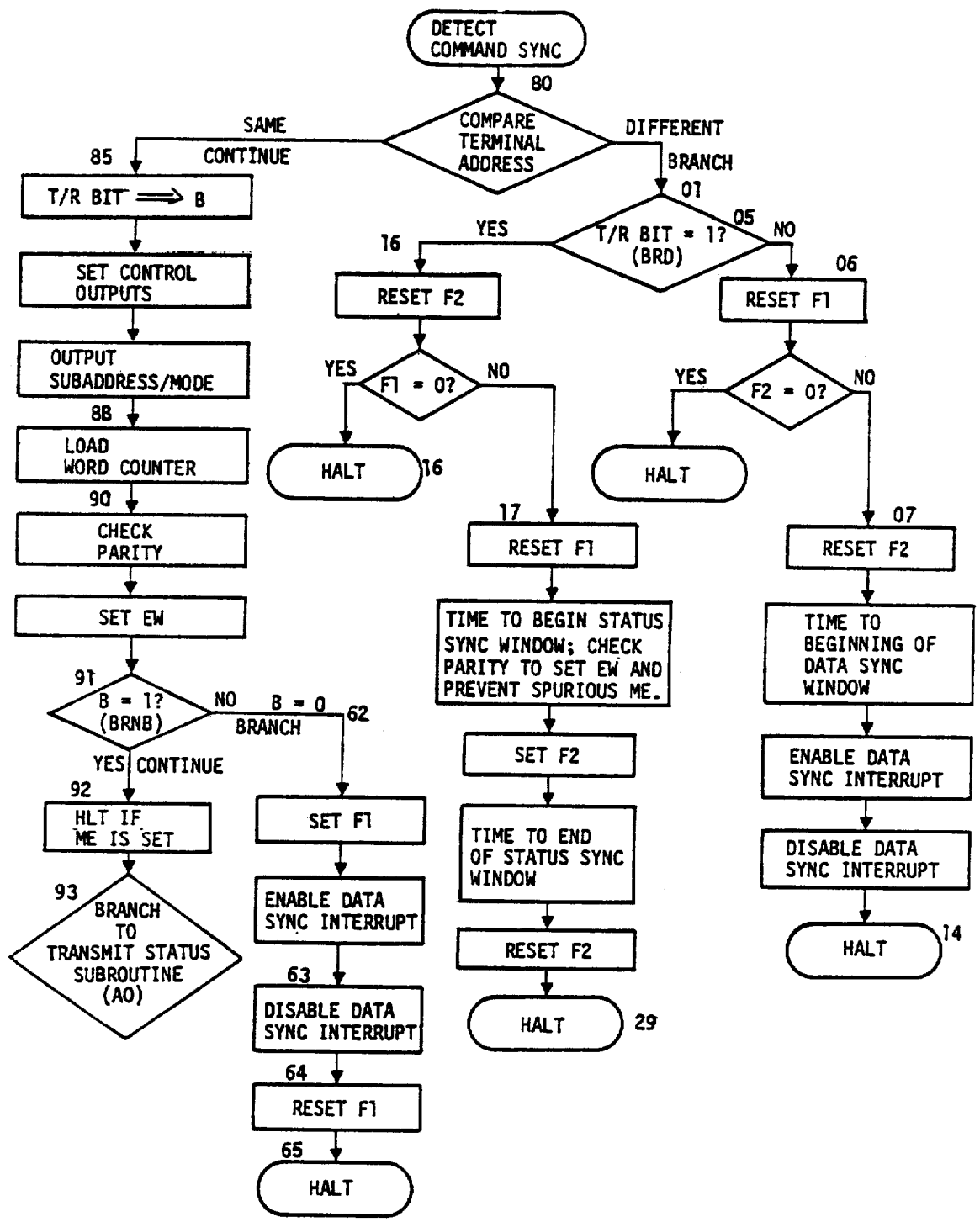
FIGS. 30 through 37 are flow chart drawings of typical program routines used in the invention.

FIG. 30 is a flow chart diagram of the operations performed by the micro-programmable data terminal in a remote terminal mode in response to the reception of a command synchronization signal. Table V lists the corresponding program steps including a hexadecimal representation of the instruction address, a mnemonic representing the instruction generated and a brief description of the operation being performed.

TABLE V

| IA | I | RT - Receive Command |
|---|---|---|
| — | — | Command Sync Interrupt |
| $80_{16}$ | BNTA $O_{16}$ | |
| 81 | BNTA O | Branch if the incoming data is not a command for this |
| 82 | BNTA O | |
| 83 | BNTA O | terminal. |
| 84 | BNTA O | |
| 85 | HB | |
| 86 | SCO 1 | Begin output of SA/Mode; Set CO's to begin receive command. |
| 87 | FLG F | |
| 88 | FLG F | Complete reception and output of SA/Mode. |
| 89 | FLG F | |
| 8A | SCOR 1 | Suppress output of DWC |
| 8B | LDWC | |
| 8C | FLG F | |
| 8D | FLG F | Load data word count |
| 8E | FLG F | |
| 8F | LDWC | |
| 90 | PTY O | Check parity; Set CO's to end receive command. |
| 91 | BRNB 6 | Branch if data is to be received; continue if it is to be transmitted. |
| 92 | HME | Suppress transmission if error on command reception |
| 93 | BR A | Branch to Transmit Status Routine (Loc AO) |
| 62 | EDI 7 | [Entry point from branch in Loc. 91] Enable data sync interrupt and set F1. |
| 63 | DDI | Disable data sync interrupt |

TABLE V-continued

| IA | I | RT - Receive Command |
|---|---|---|
| 64 | FLG B | Reset F1 |
| 65 | HLT | Anticipated data did not appear |
| 01 | FLG F | ⎫ |
| . | . | ⎬ Entry points for branches in 80-84 |
| 04 | FLG F | ⎭ |
| 05 | BRD 1 | Branch if the M/E or T/R Bit = 1 |
| 06 | FLG 8 | Reset F1 and Halt if F2 is reset (F2 set means this interrupt occurred in the time window for a status from an RT which has been commanded to transmit to this one) |
| 07 | FLG E | Reset F2 |
| 08 | FLG F | ⎫ |
| . | . | ⎬ Time to data sync window |
| 11 | FLG F | ⎭ |
| 12 | EDI F | ⎫ Enable data sync interrupt for the time window in which |
| 13 | DDI | ⎭ data from another RT to this one will appear. |
| 14 | HLT | Halt - data was not there |
|  |  | Enter by branch from location 05 |
| 16 | FLG 2 | Reset F2; Halt if F1 is reset (F1 set means the sync for the command now being received occurred immediately after a receive command to this RT and thus that this is probably a command for another RT to transmit to this RT). |
| 17 | FLG B | Reset F1 |
| 18 | FLG F | ⎫ |
| . | . | ⎬ Time to end of word; no output |
| 1F | FLG F | ⎭ |
| 20 | PTY O | Check parity (to set EW and prevent setting ME in the intermessage gap); leave CO's at End Receive Command |
| 21 | FLG F | ⎫ |
| 22 | FLG F | ⎬ Time to beginning of status sync window |
| 23 | FLG G | ⎭ |
| 24 | FLG D | Set F2 (begin status sync window) |
| 25 | FLG F | ⎫ |
| 26 | FLG F | ⎬ Time to end of status sync window |
| 27 | FLG F | ⎭ |
| 28 | FLG E | Reset F2 (status sync not received) |
| 29 | HLT | Operation terminated; status word did not arrive in its window |

As indicated at the top of FIG. 30 when a command synchronization signal is detected by a remote terminal, the first operation performed by the micro-programmable data terminal is a comparison of the terminal address with the strapped terminal address corresponding to the subsystem to which it is connected. The terminal addresses is compared bit by bit by means of instruction addresses 80 through 84 as indicated in Table V. If at any time during this comparison process the corresponding bit of the branch address is not equal to the strapped terminal address of the subsystem, the program branches to instruction address 01, 02, 03, 04, or 05, which will be discussed below. Assuming for the time being that the terminal address received by the remote terminal is equal to the strapped terminal address of the subsystem, the program continues in sequence to instruction address 85 which, as shown in the flow chart of FIG. 30, results in the storing of the T/R bit in the B register and a transfer of the information representing the receive mode of the terminal to the subsystem.

The micro-programmable data terminal then proceeds to perform operations corresponding to instructions 86 through 8A in which it sets the control output signals to begin the receive command and transfer subaddress/mode information to the subsystem. In the operation corresponding to instruction address 8A, the program prevents the data word count from being recognized by the subsystem by resetting the OP flip-flop.

The next operation corresponding to instruction addresses 8B through 8F correspond to a loading of the data word count into word counter 62. The parity of the incoming receive command is then checked in the operation corresponding to instruction address 90 and the end of word register EW is set.

In the next operation, which is a branch instruction, the program checks the B register to determine whether or not data is to be received. If data is not to be received, which is indicated by the B register being in a set condition, the program continues to instruction address 92 which tests the message error flip-flop so that transmission can be suppressed if an error occurred on the command reception. If an error has not occurred, the program branches to the transmit status subroutine at instruction address AO which will be discussed below.

Returning now to the branch instruction at instruction address 91, if data is to be received, the program branches to instruction address 62 to set the F1 flip-flop and enable the data synchronization interrupt window by means of an EDI instruction. The window is then closed in the operation corresponding to instruction address 63 which is the DDI instruction, disabling the data synchronization interrupt signal. Subsequently, the F1 flip-flop is reset and a HALT instruction is generated at instruction address 65 because anticipated data did not appear within the available time window during which the data synchronization interrupt signal was enabled.

Returning now to the compared terminal address operation at the top of FIG. 30 at instruction address 80, if the terminal address that has been received is not equal to the strapped terminal address of the subsystem, the program branches to one of the instructions in locations 01–05. If the terminal addresses are not equal, it could mean either that this remote terminal has no part to play in the information being transferred, or that a terminal-to-terminal transfer is about to take place in which this remote terminal is involved. Accordingly, the following routines in this receive command portion of the program are designed to make these tests.

In the first operation the transmit/receive bit is tested to determine whether this is a transmit or receive mode operation. If the transmit/receive bit is equal to ZERO, the program continues in sequence to instruction address 06 in which the F1 flip-flop is reset and the F2 flip-flop is tested. If the F2 flip-flop is also reset, the system halts because this indicates that this remote terminal has no part to play in the data communication taking place. On the other hand, if F2 flip-flop is set, this indicates that an interrupt signal occurred in the time window for a status to be transmitted from a remote terminal which has been commanded to transmit to this remote terminal. Accordingly, the program proceeds in sequence to instruction address 07 where it resets the F2 flip-flop and then performs the operations corresponding to instruction addresses 08 through 011 which impose the necessary delay until the beginning of a data synchronization window. Then the data synchronization window is opened by means of an EDI instruction at instruction address 12. The data synchronization time window is opened during the period in which data from another remote terminal being transferred to this remote terminal will appear. The data synchronization time window is closed by means of a DDI instruction at instruction address 13. Assuming there was no data on the data bus at the appropriate time window, the program then proceeds to HALT at instruction address 14.

Returning now to the T/R bit test at instruction address 01 through 05, if the transmit/receive bit is equal to ONE, the program branches to instruction address 16 where the F2 flip-flop is reset and the F1 flip-flop tested. If the F1 flip-flop is equal to ZERO, that indicates that this remote terminal is not involved in this information transfer and the system is halted. If, on the other hand, the F1 flip-flop is set, this indicates that the synchronization signal for the command now being received occurred immediately after a receive command to this remote terminal and thus the present command is probably being sent to another remote terminal for transmission of information to this remote terminal. Accordingly, the program proceeds in sequence to instruction address 17 to reset the F1 flip-flop. It then performs a sequence of instructions at instruction addresses 18 through 1F where it generates a sequence of flag instructions to impose the appropriate time delay until the end of the current word. The routine then proceeds to instruction address 20 to perform a parity check, to set the end of word flip-flop, and to prevent inadvertant setting of the message error flip-flop during the intermessage gap. The program next performs operations corresponding to instruction addresses 21 through 23 which constitutes a series of flag instructions to impose a time delay until the beginning of the status synchronization window. It then sets the F2 register to begin the status synchronization window at instruction address 24 and performs three additional flag instructions at instruction address 25 through 27 until the end of the status window. Finally, the program performs an additional flag instruction at instruction address 28 which resets the F2 flip-flop indicating the status synchronization signal was not received during the open window period and then performs a HALT instruction terminating operation.

Figure 31:
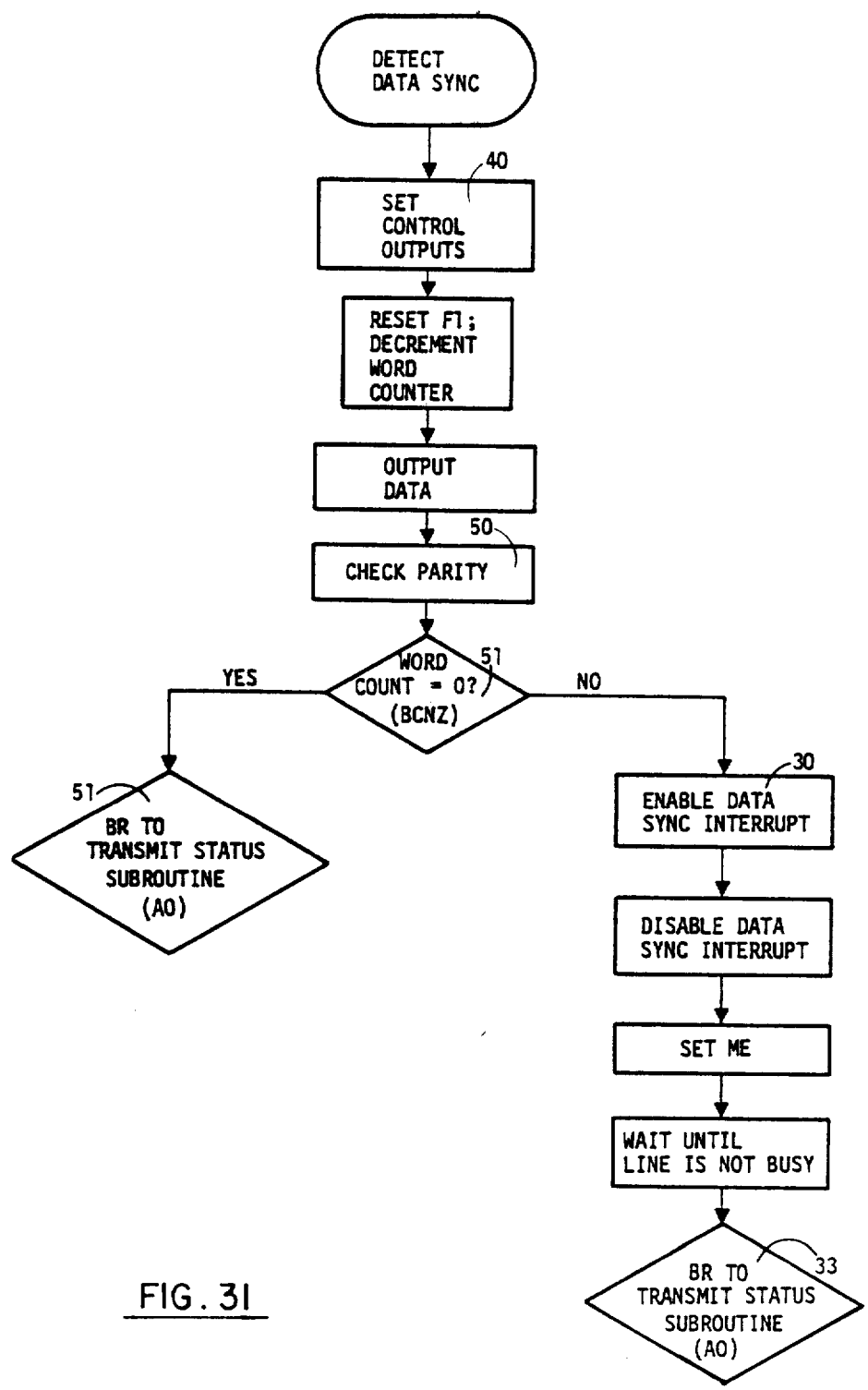

FIG. 31 and Table VI will now be referred to in conjunction with the description of the remote terminal receive data operation in response to detection of a data synchronization interrupt signal. The data synchronization interrupt signal causes processing to begin at instruction address 40. The micro-programmable data terminal first sets the control output signals to a code representing the information begin a data word. It then resets the F1 flip-flop and decrements the word counter at instruction address 41. It then generates a series of flag instructions at instruction address 42 through 4F during the time this actual data is received and transferred to the subsystem. A parity check is then performed at instruction address 50 and the control output signals are set for the end of data word format. A test of the word count is then made at instruction address 41. If the word count has reached zero, indicating that the entire message has been received, the program branches to location AO to transmit a status word in accordance with the message format for controller to terminal transfer. On the other hand, if the word count has not yet reached zero, the program branches to instruction address 30 to enable the data synchronization interrupt for its time period window. At the close of the time window, a DDI instruction is generated at instruction address 31 to terminate the data synchronization interrupt period. Assuming no data synchronizations were detected, the program then proceeds in sequence to instruction address 32 where it sets the message error flip-flop indicating that data is missing during the data synchronization interrupt period and branches to instruction address AO to transmit a status word.

TABLE VI

| IA | I | RT - Receive Data |
|---|---|---|
| — | — | Data sync interrupt (resets F1) |
| $40_{16}$ | SCO $9_{16}$ | Begin output: set CO's for begin data word (1001) |
| 41 | DDWC | Decrement DWC |
| 42 | FLG F | ⎫ |
| . | . | ⎬ No Ops for balance of reception and output |
| 4F | FLG F | ⎭ |

TABLE VI-continued

| IA | I | RT - Receive Data |
|---|---|---|
| 50 | PTY 8 | Check parity; set CO's for end data word (1000) |
| 51 | BCNZ 3 | Branch to location $30_{16}$ if more data expected |
| 52 | BR A | If no more data branch to location AO (transmit status) |
| 30 | EDI F | Enable data sync interrupt for its time window |
| 31 | DDI | Disable it at close of its time window |
| 32 | SME | Set ME (because data is missing) |
| 33 | BR A | Branch to AO (transmit status) |

Figure 32:
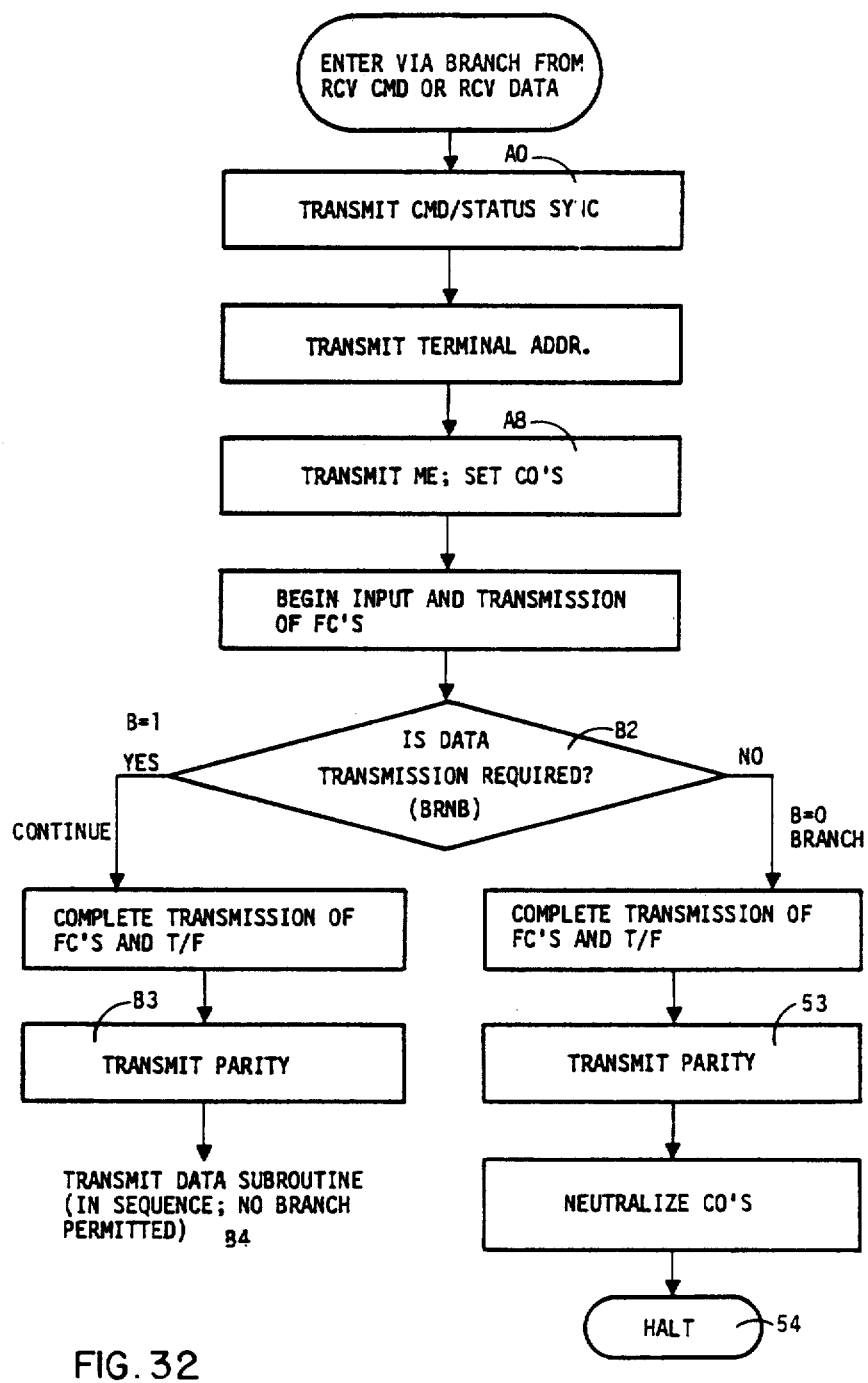

FIG. 32 and Table VII will now be referred to in a description of the means by which the micro-programmable data terminal of the invention, operating in a remote terminal mode, transmits a status word. As indicated at the top of FIG. 32, the routine for transmitting a status word is entered as a result of a branch instruction from either a routine in which a command word is received, or in which data is received. The first operation is at instruction addresses A0 through A2. The corresponding instructions generated are THI, TONE and TLO and result in a command/status synchronization signal being transmitted and the control output signals being set to begin the transmission of the status word.

Following the transmission of a command/status synchronization signal, the program proceeds in sequence to instruction addresses A3 through A7 which correspond respectively to a transmit terminal address instruction, three NO-OPS, and a transmit terminal address instruction and results in the transmission of the address of this remote terminal. The program then continues its operation at instruction address A8 which is a TME instruction resulting in the transmission of a message error signal (0 or 1, depending on the state of the ME flip-flop). The program then sequences to the instruction address A9 through B1 and the status information is input from the subsystem and transmitted over the data bus.

Upon completion of the transmission of status codes, the micro-programmable data terminal determines whether data transmission will be required by means of a BRNB instruction at instruction address B2. If data transmission is required, the program continues in sequence to transmit the parity signal, to set the control output signals to correspond to an end of status word indication, and to sequence to instruction address B4 which is the first instruction of the transmit data routine.

Returning now to the data transmission required check point in the flow chart of FIG. 32, it will be observed that if no data transmission is required, the program at the completion of the transmission of the status codes, branches to instruction address 53 where it transmits a parity bit and sets the control output signals for an end of transmit status indication. It then clears the control output signals and halts operation.

Figure 33:
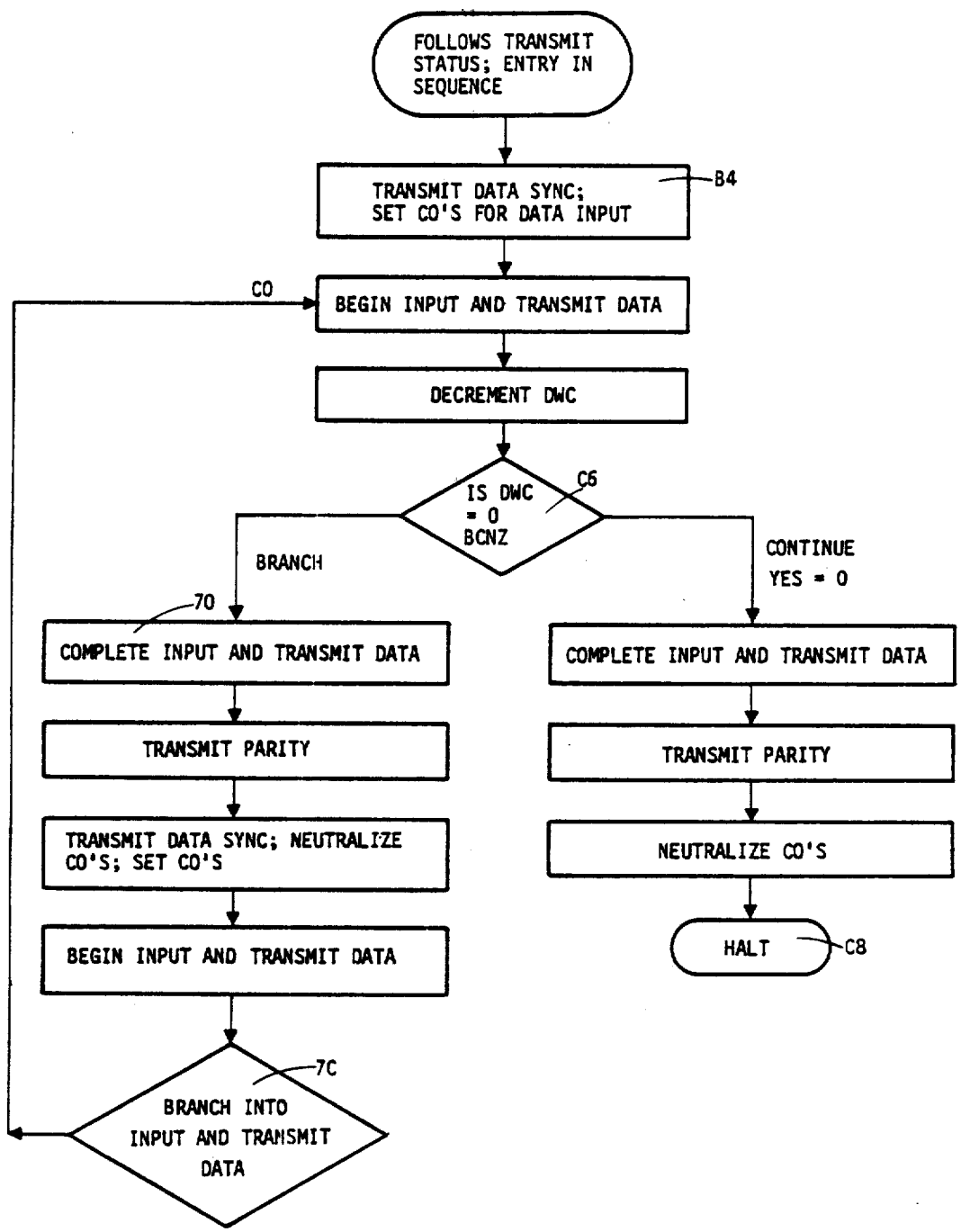

Proceeding now to a discussion of remote terminal transmission of data in which FIG. 33 and Table VIII are utilized, it will be observed that the first operation to be performed in the program for the transmission from a remote terminal, occurs at instruction addresses B4 through B6. In response, the instructions TLO, TZRO and THI are generated in that order to transmit a data synchronization signal and to set the control output signals for the beginning of the transmission data. The program then sequences to instruction addresses B7 through C4 in which it generates a series of flag signals which permits input from the subsystem of the first 14 bits of the data word and transmission of the same on the data bus. The program then decrements the data word counter by means of a DDWC instruction at instruction address C5. At this point, the program proceeds to a check of the data word counter to determine whether or not it has reached zero. This is accomplished at instruction address C6 which generates the BCNZ instruction corresponding to a branch-operation-if-the-data-word-counter-has-not-reached-zero.

TABLE VII

| IA | I | RT - Transmit Status |
|---|---|---|
| $AO_{16}$ | THI $5_{16}$ | Transmit a command/status sync; set CO's for begin |
| A1 | TONE | |
| A2 | TLO 5 | transmit status |
| A3 | TTA | |
| A4 | FLG F | |
| A5 | FLG F | Transmit the address of this terminal |
| A6 | FLG F | |
| A7 | TTA | |
| A8 | TME 5 | Transmit ME; do not change CO's |
| A9 | FLG F | |
| . | . | Input and transmit status codes |
| B1 | FLG F | |
| B2 | BRNB 5 | Branch if no data transmission required |
| B3 | PTY 4 | Transmit parity; set CO's for end status word |
| B4 | [1st Instruction of Transmit Data] | Begin transmit data routine at this point; no branch permitted. |
| | | [Entry here from Branch in B2 above] |
| 53 | PTY 4 | Transmit Parity; set CO's for end transmit status |
| 54 | HLT | Halt; operation complete |

TABLE VIII

| IA | I | RT - Transmit Data |
|---|---|---|
| B4$_{16}$ | TLO 3 | ⎫ |
| B5 | TZRO | ⎬ Transmit data sync and set CO's for begin transmit data |
| B6 | THI 3 | ⎭ |
| B7 | FLG F | ⎫ |
| . | . | |
| C0 | FLG F | ⎬ Branch in 7C entry point — Input and transmit first 14 bits of data word |
| . | . | |
| C4 | FLG F | ⎭ |
| C5 | DDWC | Decrement the data word count |
| C6 | BCNZ 7 | Branch if this is not the last data word |
| C7 | PTY 2 | Transmit parity; set CO's for end transmit data |
| C8 | HLT | Halt; operation complete |
| 70 | PTY 2 | Entry point for branch in C6; transmit parity; set CO's for end transmit data word |
| 71 | TLO 3 | ⎫ Transmit data sync for next data word; set CO's for |
| 72 | TZRO | ⎬ |
| 73 | THI 3 | ⎭ begin transmit data |
| 74 | FLG F | ⎫ |
| . | . | ⎬ Input and transmit first part of next data word |
| 7B | FLG F | ⎭ |
| 7C | BR C | Branch into corresponding point of original transmit data sequence (above) |

If the data word counter has reached zero, the program continues in sequence, completing the transmission of the current data word and then transmitting a parity bit and setting the control output signals for an end of transmit data status. It then clears the control output signals and halts operation at instruction address C8. On the other hand, if the test for a zero data word count indicates that the last data word of the current data block has not been transmitted, the program branches to instruction address 70 wherein the parity bit for the current word is transmitted and the control output signals are set to indicate an end of transmit data word status. Then at instruction addresses 71 through 73, by means of a TLO, TRZO and THI instruction, a data synchronization signal for the next data word is transmitted and the control output signals are set to begin the transmission of the following data word. The actual transmission occurs as the program sequences from instruction address 74 through 7B generating a series of flag signals during which time the first part of the subsequent data word is input from the subsystem and transmitted over the serial data bus. As the program branches at instruction address 7C back to the address C0 entry point, the remaining portion of the data word is transmitted and the program again decrements the word counter and tests for a zero word count. This process continues until the last data word in the current data block is transmitted, at which point the transmission is completed and the program comes to a halt.

The bus controller mode of the micro-programmable data terminal will now be discussed, beginning with a description of the transmit command program in conjunction with FIG. 34 and Table IX.

Figure 34:
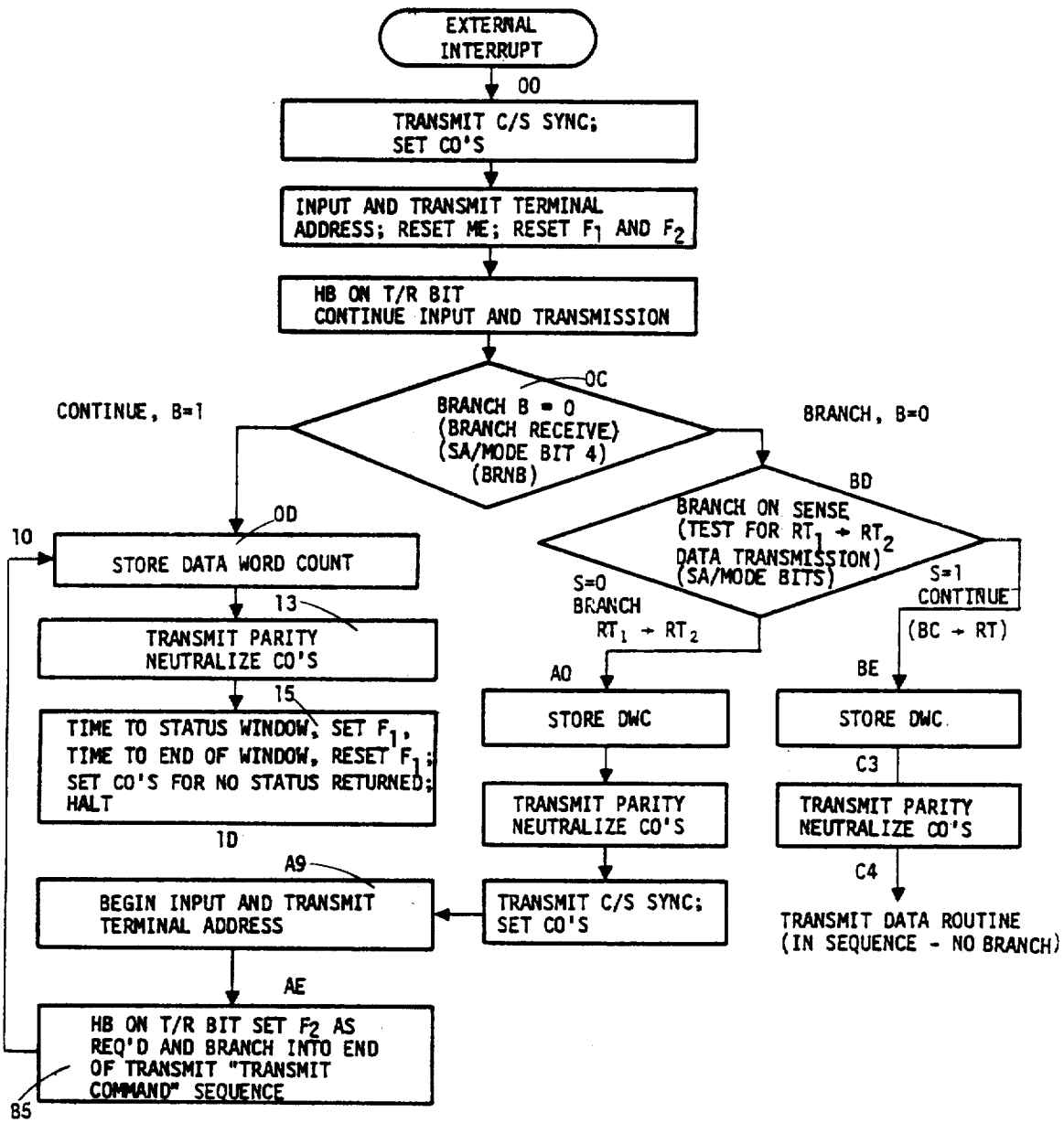

As indicated at the top of FIG. 34, the bus controller responds to an external interrupt signal to commence the transmit command program beginning at instruction address 00. The instruction signals THI, TONE and TLO are generated in that sequence to transmit a command synchronization signal. Then a series of instructions, beginning with instruction address 03, is generated to transmit the terminal address of the remote terminal to which the transmit command is to be communicated. In addition, the message error flip-flop and flip-flops F1 and F2 are reset. Then, at instruction address 08, the T/R bit is stored in the B register before the program proceeds to the test of the B register to determine whether the transmit/receive bit is a ONE or a ZERO. If the B register contains a ONE, the program proceeds in sequence to instruction address 0D where the data word count for the transmission to follow is stored in the data word counter. As shown in Table IX, this process involves five instructions, namely, at instruction address 0E, a load data word count instruction, followed by three flag instructions and a terminating load data word counter instruction at instruction address 12. Then a parity bit is transmitted and the control output signals are set to zero. Thereafter, a 3-bit time delay is generated by use of three flag instructions before the status synchronization window is opened by the setting of flip-flop F1. At instruction address 18 the status synchronization window is closed. With no status signal received during the open window period, the control output signals are set to the code corresponding to a no status indication at instruction address 1C and then the program proceeds to a HALT instruction at instruction 1D.

TABLE IX

| IA | I | BC Transmit Command |
|---|---|---|
| 00 | THI | ⎫ |
| 01 | TONE | ⎬ Transmit Command Sync (Enter from External Interrupt) |
| 02 | TLO | ⎭ |
| 03 | RME | ⎫ |
| 04 | FLG A | ⎬ Start transmit TA. Reset Message Error flip-flop. |
| 05 | FLG F | ⎬ Reset F1 and F2 flip-flops |
| 06 | FLG F | ⎭ Transmit terminal address |
| 07 | FLG F | |

TABLE IX-continued

| | | |
|---|---|---|
| 08 | HB | Store T/R bit in B ff: T = 1, R = 0 |
| 09 | FLG F | |
| 0A | FLG F | |
| 0B | FLG F | |
| 0C | BRNB(B) | Branch if B = 0 to loc (BD) |
| 0D | FLG F | |
| 0E | LDWC | ⎫ |
| 0F | FLG F | ⎬ Store data word count |
| 10 | FLG F | ⎭ |
| 11 | FLG F | ⎫ Entry point from BR intrn in loc (B5) |
| 12 | LDWC | ⎭ |
| 13 | PTY 0 | Transmit parity bit. Set CO's = 0 |
| 14 | FLG F | |
| 15 | FLG F | |
| 16 | FLG F | |
| 17 | FLG 7 | Set F1. Begin Status Sync window |
| 18 | FLG F | |
| 19 | FLG F | |
| 1A | FLG F | |
| 1B | FLG B | Reset F1. Status Sync not received. |
| 1C | SCOR(7) | Set CO's = 0111: "No Status" exception. |
| 1D | HLT | Halt. Status word not received. |
| IA | I | BC - Transmit Command, Transmit Data |

| | | Enter by branch from loc (OC) |
|---|---|---|
| BD | BRS | Branch on Sense = 1 to loc (AO) for RT1 → command. |
| BE | LDWC | Sense = 0 for BC → RT data transfer |
| BF | FLG F | ⎫ |
| C0 | FLG F | ⎬ Load word counter |
| C1 | FLG F | ⎭ |
| C2 | LDWC | |
| C3 | PTY 0 | Transmit parity bit Set CO's = 0 |
| C4 | TLO 3 | ⎫ |
| C5 | TZRO | ⎬ Set CO'S = 3: begin transmit data word |
| C6 | THI | ⎭ Transmit Data Sync |
| C7 | FLG F | 1 Start Transmit 16 bit data word |
| C8 | FLG F | 2 |
| C9 | FLG F | 3 |
| CA | FLG F | 4 |
| CB | FLG F | 5 |
| CC | FLG F | 6 |
| CD | FLG F | 7 |
| CE | FLG F | 8 |
| CF | FLG F | 9 |
| D0 | FLG F | 10 Entry Point from BR instruction in loc (7C) |
| D1 | FLG F | 11 |
| D2 | FLG F | 12 |
| D3 | FLG F | 13 |
| D4 | FLG F | 14 |
| D5 | DWC | 15 Decrement Word Count |
| D6 | BCNZ 7 | 16 If word count is not zero, branch to loc (70) |
| D7 | PTY 2 | Word Count = 0; transmit parity bit. Set CO's = 0010. |
| D8 | FLG F | ⎫ |
| D9 | FLG F | ⎬ Time to beginning of Status Sync window |
| DA | FLG F | ⎭ |
| DB | FLG F | Set F1 |
| DC | FLG F | ⎫ |
| DD | FLG F | ⎬ Time to end of Status Sync window |
| DE | FLG F | ⎭ |
| DF | FLG B | Reset F1. Status Sync not received |
| E0 | SCOR 7 | Set CO's = 0111: "No Status" exception |
| E1 | HLT | Halt. Status word not received. |
| IA | I | RT1 → RT2 |

| | | Enter from BRS in loc (BD) |
|---|---|---|
| A0 | LDWC | ⎫ |
| A1 | FLG F | ⎬ |
| A2 | FLG F | Load Word Counter |
| A3 | FLG F | ⎬ |
| A4 | LDWC | ⎭ |
| A5 | PTY 0 | Transmit parity bit. Set CO'S = 0 |
| A6 | THI 5 | ⎫ |
| A7 | TONE | ⎬ Set CO'S = 0101 |
| A8 | TLO | ⎭ Transmit Command Sync |
| A9 | FLG F | ⎫ |
| AA | ↓ | ⎬ Transmit address of remote terminal that is to |
| AB | | transmit data |
| AC | | ⎬ |
| AD | FLG F | ⎭ |
| AE | HB | Store T/R bit in B flip-flop. T = 1, R = 0. |

TABLE IX-continued

| AF | FLG D | 1 | Set F2. |
| BO | FLG F | 2 | |
| B1 | ↓ | 3 | Transmit subaddress/mode |
| B2 | ↓ | 4 | |
| B3 | FLG F | 5 | |
| B4 | LDWC | | Begin load word count |
| B5 | BR (1) | | Unconditional branch loc (10) to complete transmission of this command and to await status sync. |

Returning now to the test of the B register at instruction address OC and assuming the B register is reset, the program branches to instruction address BD where it tests the SENSE line to determine whether the transmit command was to initiate a terminal to terminal transfer or a controller to terminal transfer. If the SENSE line is ZERO, the program branches to instruction address 80 to commence a terminal to terminal transfer by first loading the word counter indicative of the number of words to be transferred to the receiving terminal. The program then transmits a parity bit and sets the control output signals to zero. Control output signals are then set to the code that corresponds to the transmit command synchronization signal. Then the terminal address of the remote terminal that is to transmit data is transmitted over the serial data bus bringing the program to instruction address AE at which point a transmit/receive bit is stored in the B flip-flop. The F2 flip-flop is then set and the sub-address/mode information is transferred over the serial data bus to the addressed remote terminal. The word count of the data being transferred is then loaded into the word counter at instruction address B4 while the program sequences to instruction address B5. The operation corresponding to instruction address B5 is an unconditional branch to instruction address 10 to complete transmission of the transmit command and to await the status synchronization signal indicative of a status word from the transmitting terminal. At this point in the program, the bus controller has transmitted a receive command to a receiving remote terminal and a transmit command to a transmitting remote terminal for a terminal-to-terminal information transfer.

Figure 35:
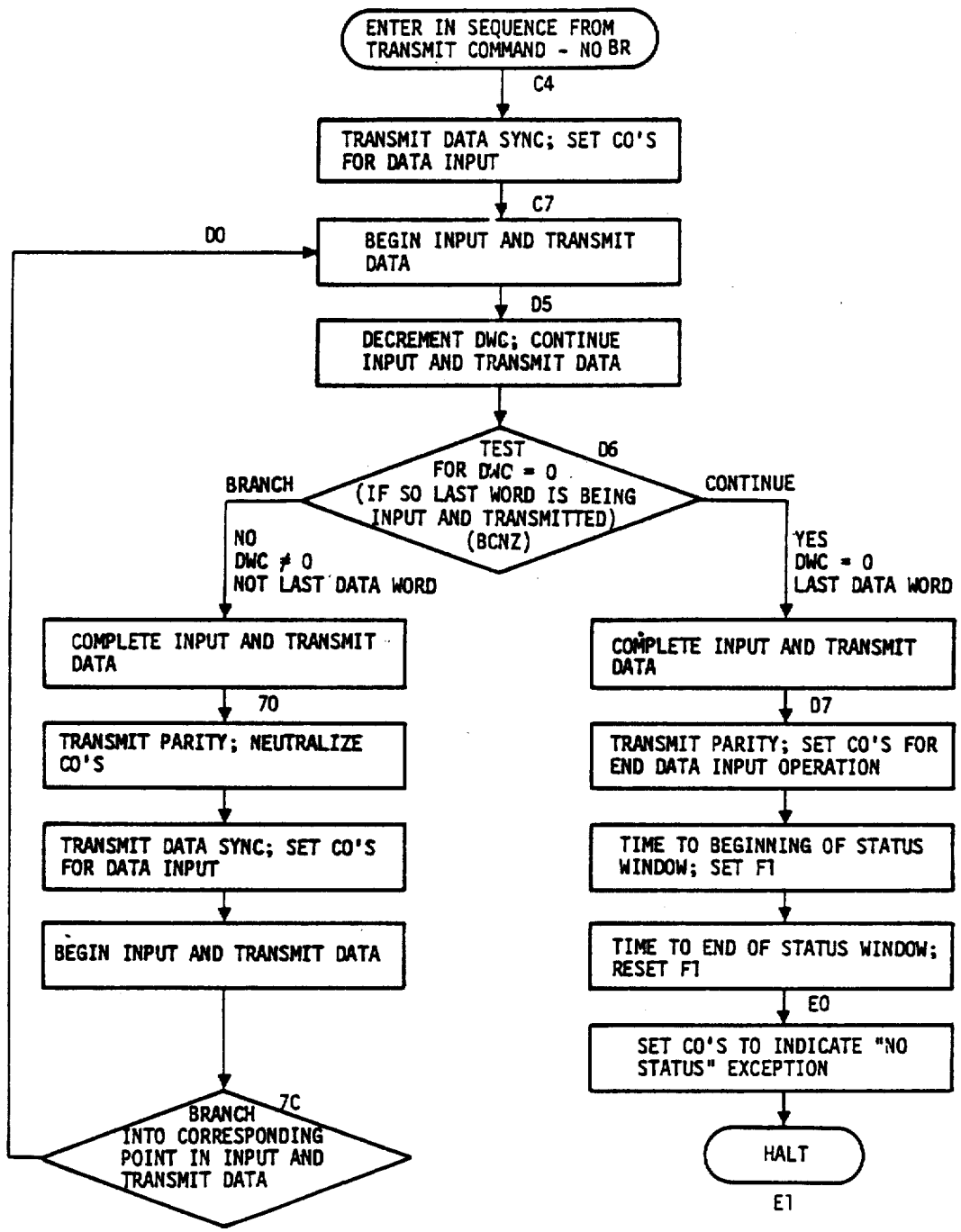

Returning now to the branch-on-sense-test instruction at address BD, if it is assumed instead that the SENSE signal was set, instead of branching as indicated previously for a terminal-to-terminal transfer, the program continues in sequence to instruction address BE wherein it loads the word counter for a controller-to-terminal data transfer, transmits a parity bit, resets the control output signals and then sequences to the transmit data routine which is described in conjunction with FIG. 35, a flow chart of the bus controller transmit data routine, and Table X.

Referring now to FIG. 35, as indicated at the uppermost portion thereof, the routine commences when the sequence is entered from the transmit command at instruction address C4. The first operation in the controller transmit data sequence occurs beginning at instruction address C4 at which the corresponding sequence of instructions result in the setting of the control output signals to the appropriate code for transmission of a data word and results in the transmission of a data synchronization signal. Thereafter, commencing with instruction address C7, a 16-bit data word is transmitted until the data word counter is decremented at instruction address D5 and a word-count-equal-to-zero test is performed at instruction address D6.

Assuming that the data word counter has reached zero, indicating that the last data word in the current data block has been transmitted, the program proceeds to transmit a parity bit and set the control output signals to the code corresponding to end of data transmit message at instruction address D7. Then, using a series of flag instructions, the program delays a given period of time to account for the intermessage gap, before the beginning of the status synchronization time window. F1 flip-flop is then set indicating that the time window of the anticipated status synchronization signal window is open and thereafter reset at the close of that window. Finally, the program performs the operation to set the control output signals to the code corresponding to a no status indication at instruction address EO and then the operation is halted at instruction address E1.

Returning now to the data word counter test at instruction address D6 and assuming that the data word count has not reached zero, the program branches to instruction address 70 as indicated in Table X. It first transmits a parity bit and sets the control output signals to zero. It then sets the control output signals to the code corresponding to the begin data word indication and transmits the data synchronization signal by means of instructions, TLO, TZRO and THI. The first 9 bits of the data word are then transmitted as a result of a series of flag instructions beginning at instruction address 74 and ending in an unconditional branch to location BO where the remaining bits of the data word are transmitted and the program is recycled.

TABLE X

| IA | I | | BC - Transmit Data |
|----|---|---|-------------------|
| | | | Enter from BCNZ in loc (D6) (See Table IX) |
| 70 | PTY 0 | | Transmit parity bit. Set CO's = 0 |
| 71 | TLO 3 | | Set CO's = 0011; begin data word |
| 72 | TZRO | | Transmit data sync |
| 73 | THI | | |
| 74 | FLG F | 1 | |
| 75 | FLG F | 2 | |
| 76 | FLG F | 3 | |
| 77 | FLG F | 4 | |
| 78 | FLG F | 5 | Transmit first 9 bits of data word |
| 79 | FLG F | 6 | |
| 7A | FLG F | 7 | |
| 7B | FLG F | 8 | |
| 7C | BR D | 9 | Unconditional branch to loc (DO) |

Figure 36:
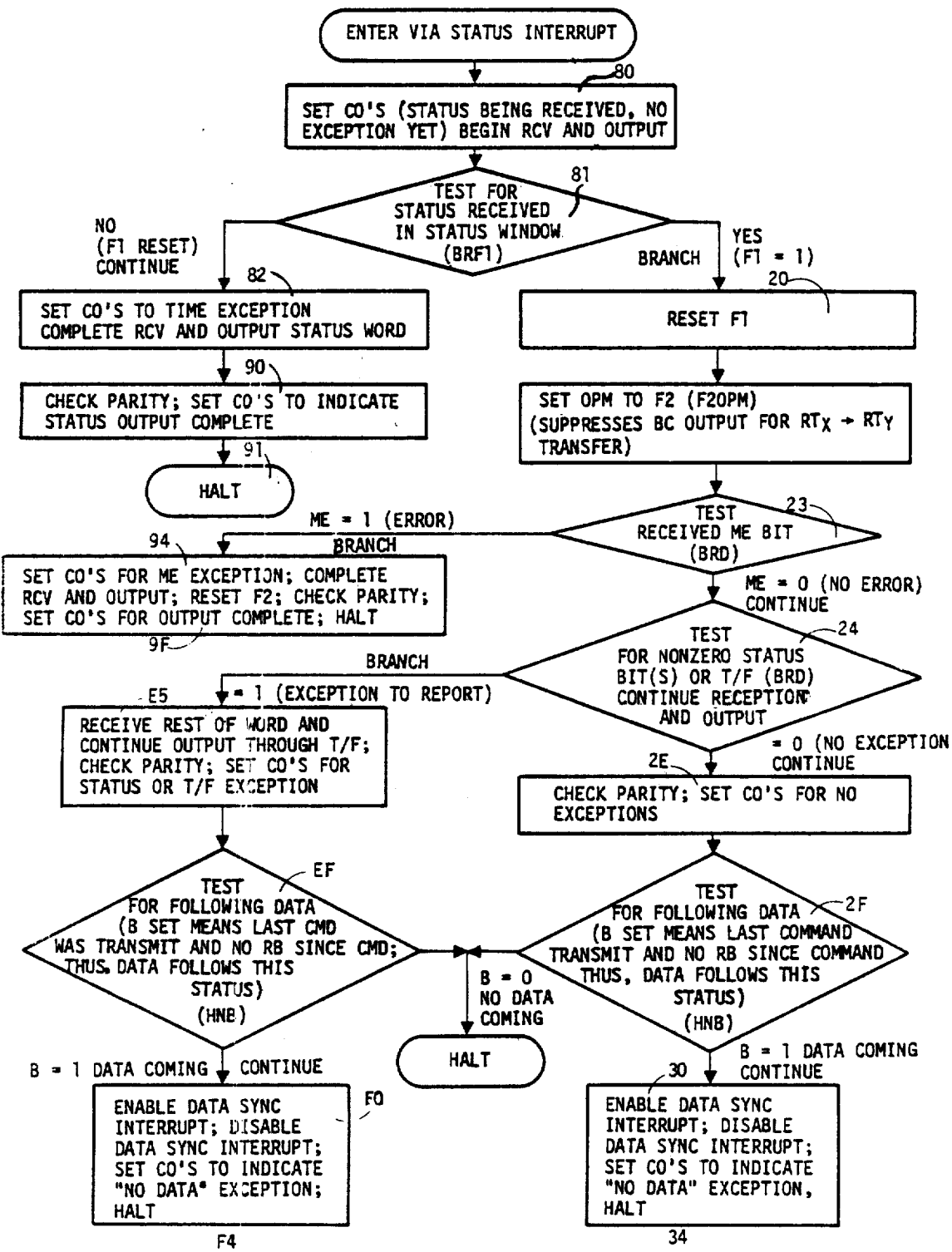

Proceeding now to a discussion of bus controller mode reception of status information and reporting of exceptions, referring to FIG. 36 and Table XI it will be observed that the first operation to be performed in the program for the reception of status information by the bus controller in response to a status synchronization interrupt signal occurs at instruction address 80 wherein the control output signals are set for reception of a status signal. This operation is followed by a test for whether the status signal was received inside or outside of the time window established for the receipt of status signals. This is accomplished at instruction address 81 and the corresponding instruction is branch if the F1 flag is set.

Assuming the status information was not received only within the status reception time window, F1 will be in a reset condition and the program will continue in sequence to instruction address 82 where the control output signals are set to the code corresponding to an exception in the time of the received signals. Thereafter, the bus controller continues to receive data through instruction address 8F. Then at instruction address 90, the parity of the received status word is tested and the control output signals are altered to correspond to the code indicating that the status output signal has been completed. Finally, at instruction address 91, the halt instruction is generated and operation is terminated because the status word has been received outside the proper time limit for its reception.

TABLE XI

| IA | I | BC - Receive Status and Report Exceptions |
|---|---|---|
| | | Enter via Status Interrupt |
| 80 | SC0 5 | 1 Enable data transfer to subsystem. Set CO's = 0101 |
| 81 | BRF1(2) | 2 If flag F1 = 1, branch to loc 20: Status rc'd in window |
| 82 | SCO (7) | 3 Set CO's = 0111: Time exception for Status Sync |
| 83 | FLG F | 4 |
| 84 | FLG F | 5 |
| 85 | FLG F | 6 |
| 86 | FLG F | 7 |
| 87 | FLG F | 8 |
| 88 | FLG F | 9 |
| 89 | FLG F | 10 Continue to transfer received data to subsystem. |
| 8A | FLG F | 11 |
| 8B | FLG F | 12 |
| 8C | FLG F | 13 |
| 8D | FLG F | 14 |
| 8E | FLG F | 15 |
| 8F | FLG F | 16 |
| 90 | PTY (4) | Test parity of received Status word. Set CO's = 0100 |
| 91 | HLT | Halt. Status Word received outside of proper time limits. |
| | | Enter from BFF1 in loc 81 with F1 = 1 in receive Status Interrupt |
| 20 | FLG B | 3 Reset F1 |
| 21 | F20 PM | 4 Set OPM to F2 to suppress output to subsystem for RT1 → RT2 |
| 22 | FLG F | 5 |
| 23 | BRD (9) | 6 If received ME bit = 1, branch to loc (94) |
| 24 | BRD (9) | 7 |
| 25 | BRD (9) | 8 |
| 26 | BRD (9) | 9 Test for non-zero status bits. Upon first bit = 1, branch to loc (9Y) where Y is a number greater by one than present value of location counter. |
| 27 | BRD (9) | 10 |
| 28 | BRD (9) | 11 |
| 29 | BRD (9) | 12 |
| 2A | BRD (9) | 13 |
| 2B | BRD (9) | 14 Test for non-zero status bits. Upon first bit = 1, branch to loc (9Y) where Y is a number greater by one than present value of location counter. |
| 2C | BRD (9) | 15 |
| 2D | BRD (9) | 16 |
| 2E | PTY (10) | Test parity of Status Word. Set CO's = 1010: ME exception |
| 2F | HNB | Halt if B = 0. Transmission complete. |
| 30 | FLG F | B = 1. Data words follow. |
| 31 | EDI | Enable data interrupt. Will cause branch to loc (40). |
| 32 | DDI | Disable data interrupt. Data sync not received. |
| 33 | SCOR(C) | Set CO's = 1100: part of data missing. |
| 34 | HLT | Halt. Data not complete. |
| | | Enter by BRD from loc 23: Message Error |
| 94 | SC0 (A) | Set CO's = 1010: Message Error exception. |
| 95 | FLG F | |
| 96 | FLG F | |
| 97 | FLG F | |
| 98 | FLG F | |
| | | Receive Status Codes |
| 99 | FLG F | |
| 9A | FLG F | |
| 9B | FLG F | |
| 9C | FLG F | |
| 9D | FLG E | Reset F2. Receive T/F flag. |
| 9E | PTY (E) | Test parity of received status word. Set CO's = 1100: output complete |
| 9F | HLT | Halt. Remote terminal reports Message Error. |
| | | Enter from BRD to loc (24) to (2D) |
| E5 | FLG F | |
| E6 | FLG F | |
| E7 | FLG F | |
| E8 | FLG F | |
| | | Receive Status Codes |
| E9 | FLG F | |
| EA | FLG F | |
| EB | FLG F | |
| EC | FLG F | |
| ED | FLG F | Enter from BRD in loc 2D if T/F flag bit = 1 |
| EE | PTY (B) | Test parity of received status word. Set CO's = 1011: Status or T/F exception |
| EF | HNB | Halt if B = 0. Transmission complete |
| F0 | FLG F | B = 1: Data Words follow |
| F1 | EDI | Enable data interrupt. Will cause branch to loc (40) |
| F2 | DDI | Disable data interrupt Data sync not received. |
| F3 | SCOR (C) | Set CO's = 1100: part of data missing. |

TABLE XI-continued

| IA | I | BC - Receive Status and Report Exceptions |
|---|---|---|
| F4 | HLT | Halt. Data not complete. |

Returning now to the test for status reception within the appropriate time window limits at instruction address 81 and assuming that the F1 flag flip-flop is set, indicating that the status signal has been received within the limits of the time window for reception, the program branches to instruction address 20 resulting in the resetting of the F1 flag flip-flop. Then the program continues in sequence at instruction address 21 resulting in the setting of the OPM flip-flop to the F2 state to suppress the output of the bus controller to the subsystem during the terminal to terminal transfer.

In the next operation, the message error bit of the receive signal is tested. This occurs at instruction address 23. If the received memory error bit is set, indicating the extence of an error, the program branches to instruction address 94 where, as shown in the corresponding portion of Table XI, the control output signals are set to a code representative of a message error exception, reception of the status codes is completed, the F2 flag flip-flop is reset and the parity of the received status word is tested. Then the control output signals are set to the code indicating that the output has been completed and that the remote terminal has reported the existence of the message error.

Returning now to instruction address 23 in the test for a receive memory error bit, if the memory error bit is ZERO, indicating that no error exists, the program continues in sequence to instruction address 24 where it sequences bit by bit through a test for non-zero status bits. Assuming that all the status bits are zero, and thus no exceptions need be reported, the program continues in sequence to instruction address 2E to test the parity of the status word and to set the control output signals for the code that corresponds to no exceptions.

The program then continues to instruction address 2F where it tests the B register for an indication of whether or not any data will follow the receipt of the status bits. If B is equal to ZERO the transmission has been completed and the program branches to halt. On the other hand if B is set, this is an indication that additional data signals will be following the receive status signals. Accordingly, the program generates an EDI instruction at instruction address 31 to enable the data interrupt window and then generates a DDI instruction at instruction address 32 to disable the data interrupt. If the data synchronization signal has not been received during the period that the data interrupt window is open, the program sets the control output signals to the code corresponding to the indication of data missing and proceeds to terminate operation by means of a HALT instruction.

Returning now to the test for non-zero status bit, and instruction address 24, if during the test of these status bits one or more such bits is set to a ONE state, this indicates an exception to the report and the program branches to location E5 to receive the remaining status bits, to test the T/F flag bit, to check parity, and to set the control output signals to indicate an exception in the received status or T/F bits. The program then sequences to instruction address EF in which the B flip-flop is tested to determine whether or not transmission is complete. If B is equal to ZERO, operation is terminated by a branch to a halt instruction. On the other hand, if B is set, this indicates that data will now follow the status word and the program continues in sequence to enable and disable the data interrupt window. If data is missing within the window, the program proceeds to set the control output signals to indicate that fact and to terminate the program operation with a halt instruction.

Figure 37:
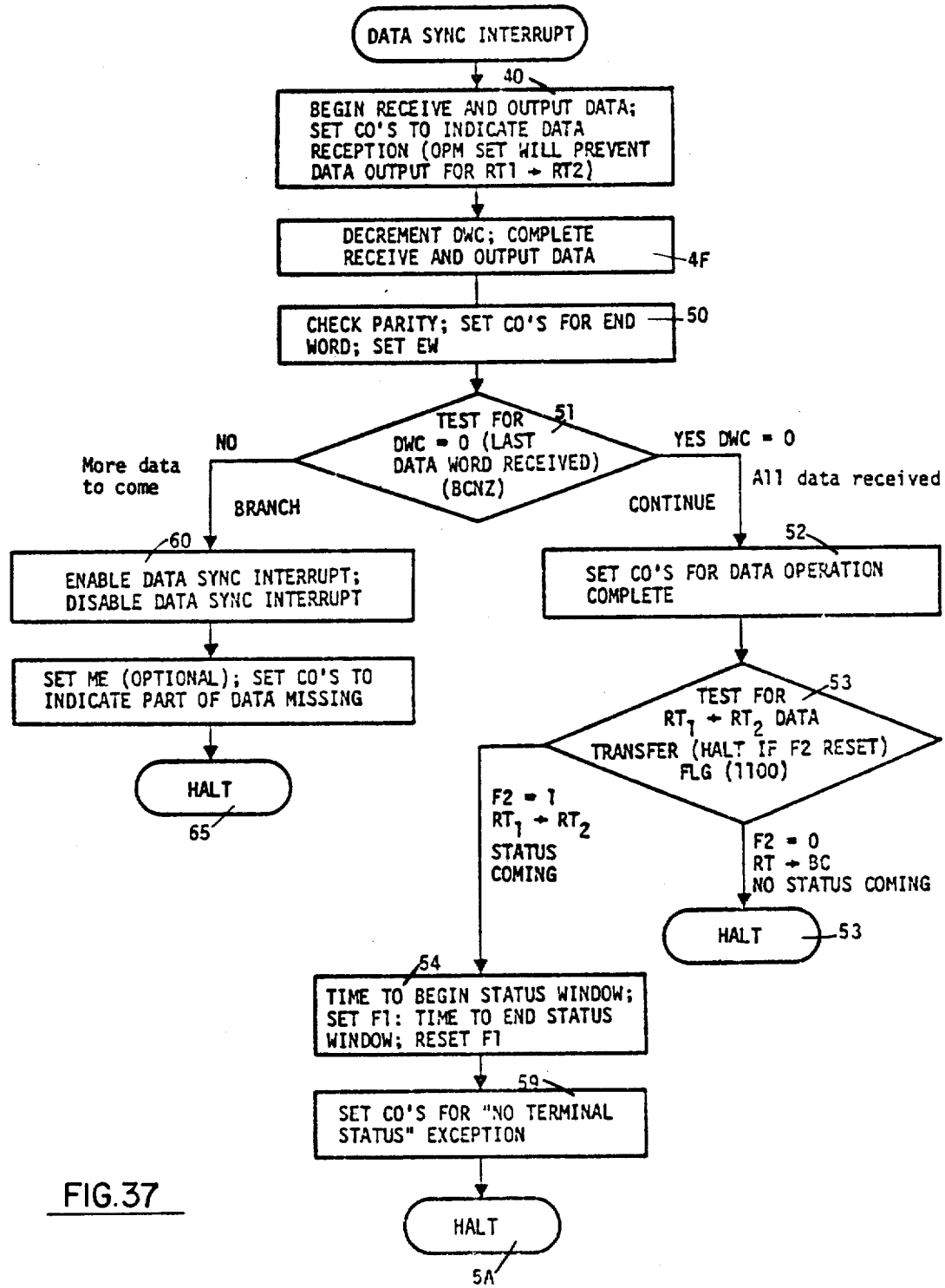

Proceeding now to a discussion of reception of data by a bus controller, referring to FIG. 37 and Table XII, it will be observed that the first operation to be performed in the program for the reception of data by a bus controller occurs at instruction address 40.

At instruction address 40 the control output signals are set to the code corresponding to the enablement of data transfer to the subsystem by the bus controller and the 16-bit data word is transferred to the subsystem. The next operation at instruction address 4F is a decrement of the word counter to account for the received word and then the system sequences to the instruction address 50 for a test of the parity of the received word. In operation corresponding to instruction address 50, the control output signals are set for an end of word indication and in addition the end of word flip-flop is set. Next the program tests for a zero word count to determine whether or not the last word received was the final word in the data block currently being transferred to the bus controller. If the word count is not zero, this indicates that more data will be transferred to the bus controller and the program branches to instruction address 60 to open up the data synchronization interrupt window, between the instructions EDI and DDI as previously mentioned.

TABLE XII

| IA | I | | BC Receive Data |
|---|---|---|---|
| | | Enter from Data Sync interrupt | |
| 40 | SCO (9) | 1 | Enable data transfer to subsystem. Set CO's = 1001. |
| 41 | FLG F | 2 | |
| 42 | FLG F | 3 | |
| 43 | FLG F | 4 | |
| 44 | FLG F | 5 | |
| 45 | FLG F | 6 | |
| 46 | FLG F | 7 | |
| 47 | FLG F | 8 | |
| | | | Transfer 16 bit data word to subsystem |
| 48 | FLG F | 9 | |
| 49 | FLG F | 10 | |
| 4A | FLG F | 11 | |
| 4B | FLG F | 12 | |
| 4C | FLG F | 13 | |
| 4D | FLG F | 14 | |
| 4E | FLG F | 15 | |
| 4F | DWC | 16 | Decrement Word Counter |
| 50 | PTY (8) | | Test parity of received word. Set CO's = 1000 |

TABLE XII-continued

| IA | I | BC Receive Data |
|---|---|---|
| 51 | BCNZ (6) | If word count is not zero, branch to loc (60) |
| 52 | SCOR (E) | Word Count = 0. Set CO's = 1110: data operation complete |
| 53 | FLG (C) | Halt if F2 is reset: indicates RT → BC and no status coming. |
| 54 | FLG (7) | Set F1. Begin Status Sync window (F2 = 1) |
| 55 | FLG F | |
| 56 | FLG F | |
| 57 | FLG F | |
| 58 | FLG (B) | Reset F1. Status Sync not received. |
| 59 | SCOR(7) | Set CO's = 0111: time exception for Status Sync. |
| 5A | HLT | Halt. Status Word not received. Enter from BCNZ in loc (51) |
| 60 | FLG F | |
| 61 | EDI | Enable Data Interrupt |
| 62 | DDI | Disable Data Interrupt: Data Sync not received |
| 63 | SME | Set Message Error flip flop |
| 64 | SCOR (6) | Set CO's = 0110: "No data" exception |
| 65 | HLT | Halt. Data not complete. |

Assuming the data synchronization signal is not received during this open window period, the message error flip-flop is set at instruction address 63 and the control output signals are set to represent a no-data exception. The program then proceeds to the halt operation at instruction address 65 to terminate operation because of incomplete incoming data.

Returning now to instruction address 51 and assuming that the data word counter has reached zero, the program continues to sequence to instruction address 52 with the zero word count indicating that the total data to be transferred in the current data block has been transferred to the bus controller. At instruction address 52, the control output signals are set to indicate that the data operation is complete and then the program continues to instruction address 53 where a test is made to determine whether the current data transfer is a terminal to terminal transfer or a terminal to controller transfer. If it is a terminal to controller transfer, then as previously indicated in FIG. 4, no status word is transferred after the last data word is transferred. This test is accomplished by determining the state of the F2 flip-flop. If the F2 flip-flop is reset, it indicates that the current transfer is a terminal to controller transfer and the program halts. On the other hand, if F2 is set, this indicates a terminal to terminal transfer and the controller continues in sequence in anticipation of the upcoming status signal. It does this commencing at instruction address 54 where it sets the F1 flip-flop to begin the status synchronization window and keep the window open until it resets the F1 flip-flop at the end of the appropriate time period. If the synchronization signal is not received during this window the control output signals are set to a code indicative of a no-terminal status exception and the program proceeds to instruction address 5A where operation is halted.

SUMMARY

It will now be understood that what has been described herein is a micro-programmable data terminal for use as a bus controller and as a remote terminal in a time-division multiplex serial data bus system. The specific embodiment described is a hardened LSI/CMOS/SOS single chip device capable of satisfying all the requirements of Military Standard 1553A, which relates to such serial data bus systems. It will be understood, however that the invention, by utilizing a programmable microprocessor organization, by using synchronization signals to generate program interrupt signals, by operating on a one bit per instruction basis, by employing programmable control output signals, and by being easily adaptable to program counter and instruction memory capacity expansion, provides capability and flexibility to meet real time serial data bus requirements that are far more stringent and varied than those of the applicable Military Standard.

It will also be understood by providing an invention having flexibility to perform both bus controller and remote terminal functions in a single 200 mil × 200 mil chip, costly duplication, interface circuitry and interconnections are obviated thereby reducing the overall cost and complexity of the serial data bus system.

Having thus described a preferred embodiment of the invention, what is claimed is:

1. A single chip programmable data terminal circuit device for use in a time-division multiplex serial data bus system, comprising:
   means for control of information transfer between a subsystem and said data bus, in a remote terminal mode; and
   means for control of information transfer between a subsystem and said data bus, in a bus controller mode.

2. A micro-programmable data terminal apparatus for interconnecting a plurality of subsystems as a remote terminal and as a bus controller in a time-division multiplex serial data bus system, said terminal apparatus comprising a unitary large scale integrated circuit chip and a memory device, said memory device being programmed to store a plurality of instructions signals and said circuit chip having circuits to address said instruction signals in accordance with the information being transferred on said data bus and to respond to said instruction signals for control of said information transfer.

3. A data terminal apparatus as defined in claim 2 wherein said circuit chip comprises:
   a signal format conversion means for converting signals received from said data bus in a first format to signals in a second format for transfer to said subsystem and for converting signals received from said subsystem in said second format to signals in said first format for transfer to said data bus.

4. A data terminal apparatus as defined in claim 2 wherein said circuit chip further comprises:
   means for detecting and distinguishing between synchronization signals of at least two different forms of information being transferred to said subsystem, and for responding thereto by generating corresponding interrupt signals.

5. A data terminal apparatus as defined in claim 2 wherein said circuit chip further comprises:
   means for detecting and comparing received first address signals with second address signals corresponding to said subsystem and for generating an address compare signal indicative of whether or not said first and second address signals are equal.

6. A data terminal apparatus as defined in claim 2 wherein said circuit chip further comprises:
means for receiving a signal indicative of the number of words to be transferred in a message, for loading a word counter with a count corresponding to said number of words, and decrementing said count in said word counter as each word is transferred from said data bus to said subsystem.

7. A data terminal apparatus as defined in claim 2 wherein said circuit chip further comprises:
means for generating control output signals for transfer to said subsystem for mode control thereof said control output signals being indicative of the current status of the information transfer taking place.

8. A data terminal apparatus as defined in claim 2 wherein said circuit further comprises:
means for detecting errors in the information transferred between subsystems that include said subsystem and for generating a signal indicative of the occurence of such an error.

9. A data terminal apparatus as defined in claim 2 wherein said circuit chip further comprises:
address logic and instruction decode means adapted for connection to said memory device for selecting and receiving instruction signals for control of information transfer on said data bus system.

10. A data terminal apparatus as defined in claim 2 wherein said circuit chip is a complementary metal oxide semiconductor silicon or sapphire device that is hardened to resist the effect of nuclear radiation.

11. In a time-division multiplex serial data bus system interconnecting a plurality of digital data processing subsystems for information transfer therebetween, a single chip, large scale integrated programmable data terminal apparatus adapted for use as a bus controller and as a remote terminal and connected to said data bus system and to a subsystem, the data terminal apparatus comprising:
a. signal format conversion means for converting signals received from said data bus in a first format to signals in a second format for transfer to said subsystem, and for converting signals received from said subsystem in said second format to signals in said first format for transfer to said data bus;
b. means for detecting and distinguishing between synchronization signals of at least two different forms of information being transferred to said subsystem, and for responding thereto by generating corresponding interrupt signals;
c. means for detecting and comparing received first address signals with second address signals corresponding to said subsystem and for generating an address compare signal indicative of whether or not said first and second address signals are equal;
d. means for receiving a signal indicative of the number of words to be transferred in a message, for loading a word counter with a count corresponding to said number of words, and for decrementing said count in said word counter as each word is transferred from said data bus to said subsystem;
e. means for generating control output signals for transfer to said subsystem for mode control thereof, said control ouput signals being indicative of the current status of the information transfer taking place;
f. means for detecting errors in the information transferred between subsystems that include said subsystem, and for generating a signal indicative of the occurrence of such an error; and
g. address logic and instruction decode means adapted for connection to an external read-only memory device and for selecting and receiving instruction signals for control of each of the aforementioned means.

12. A programmable data terminal circuit device for use in a time-division multiplex serial data bus system, comprising:
means for control of information transfer between a subsystem and said data bus; and
means for detecting and distinguishing between synchronization signals of at least two different forms of information being transferred to a subsystem, and for responding to said synchronization signals by generating corresponding interrupt signals.

* * * * *